(12) United States Patent
Milstein

(10) Patent No.: US 9,049,459 B2
(45) Date of Patent: Jun. 2, 2015

(54) VIDEO MULTI-CODEC ENCODERS

(75) Inventor: Jaime Milstein, Los Angeles, CA (US)

(73) Assignee: Exaimage Corporation, Los Angeles, CA (US)

( * ) Notice: Subject to any disclaimer, the term of this patent is extended or adjusted under 35 U.S.C. 154(b) by 509 days.

(21) Appl. No.: 13/275,292

(22) Filed: Oct. 17, 2011

(65) Prior Publication Data

US 2013/0094566 A1    Apr. 18, 2013

(51) Int. Cl.
| | |
|---|---|
| H04N 7/26 | (2006.01) |
| H04N 19/625 | (2014.01) |
| H04N 19/63 | (2014.01) |
| H04N 19/61 | (2014.01) |
| H04N 19/86 | (2014.01) |
| H04N 19/42 | (2014.01) |
| H04N 21/2343 | (2011.01) |
| H04N 19/597 | (2014.01) |

(52) U.S. Cl.
CPC ...... *H04N 19/625* (2014.11); *H04N 21/234309* (2013.01); *H04N 19/597* (2014.11); *H04N 19/63* (2014.11); *H04N 19/61* (2014.11); *H04N 19/86* (2014.11); *H04N 19/439* (2014.11)

(58) Field of Classification Search
CPC ............................................. H04N 21/234309
USPC ............................................. 375/240–240.1
See application file for complete search history.

(56) References Cited

U.S. PATENT DOCUMENTS

| | | | |
|---|---|---|---|
| 7,349,029 B1 * | 3/2008 | Chou | 348/448 |
| 7,457,359 B2 | 11/2008 | Mabey et al. | |
| 7,657,651 B2 | 2/2010 | Amini et al. | |
| 7,920,633 B2 | 4/2011 | Mohsenian | |
| 2002/0186769 A1 | 12/2002 | O'Brien | |
| 2004/0013193 A1 | 1/2004 | Narita | |
| 2004/0057521 A1 * | 3/2004 | Brown et al. | 375/240.25 |
| 2006/0002613 A1 * | 1/2006 | Zurov et al. | 382/240 |
| 2010/0034257 A1 | 2/2010 | Sedeffow | |
| 2011/0235702 A1 | 9/2011 | O'Connell et al. | |

OTHER PUBLICATIONS

Youssef et al. "Hybrid Wavelet Transform and MPEG-1 Video Coding System", Fifteenth national Radio Science Conference, Feb. 24-26, 1998, 9 pages.

Muijs et al. "A No-Reference Blocking Artifact Measure for Adaptive Video Processing" Philips Research Laboratories, 4 pages.

* cited by examiner

*Primary Examiner* — Christopher S Kelley
*Assistant Examiner* — Jonathan Messmore
(74) *Attorney, Agent, or Firm* — Cotman IP Law Group, PLC

(57) ABSTRACT

Systems and methods for a video multi-codec encoder are provided. Video input data including a plurality of video frames is accepted. At least one codec Y subsystem is applied to frame data that includes at least one video frame of the plurality of video frames, where the frame data includes at least an unencoded portion of the plurality of video frames before one or more of the at least one codec Y subsystem is applied. The at least one codec Y subsystem includes at least partial $Y_i$ codec functionality. $Y_i$ is a codec selected from video codecs $\mathcal{Y} = \{Y_1, \ldots, Y_n\}$. At least one codec Z subsystem is applied to the frame data, where the at least one codec Z subsystem includes at least partial Z codec functionality. Video output data is generated including simple Z-encoded video data of the at least one video frame using the frame data.

55 Claims, 33 Drawing Sheets

VIDEO MULTI-CODEC ENCODERS

BACKGROUND OF THE INVENTION

1. Field of the Invention

Embodiments of the invention described herein pertain to the field of computer systems. More particularly, but not by way of limitation, one or more embodiments of the invention enable video multi-encoders.

2. Description of the Related Art

Encoding and decoding are essential to representing video in digital form. Compression is a practical necessity for transmitting and storing digitized video efficiently and economically. This is true of both display-size extremes of today's video. Standard high definition video and emerging extra-high definition video require challenging trade-offs between compression (to satisfy storage or bandwidth limitations), decoder computational requirements, and viewing quality. At the opposite extreme, a proliferating mobile customer base competes for essentially fixed total bandwidth resources.

Many video codecs have arisen to address these needs, culminating in such codecs and codec standards as, MPEG-2, JPEG 2000 Video, VC-1, MPEG-4, H.264, and WebM. Video codecs are typically designed to offer new or improved features even when they are based on previous codecs or an assortment of ideas found in previous codecs. Nonetheless, each individual codec is intended to be complete in itself and to work independently of all other video codecs. This is also true of codecs satisfying codec standards, including JPEG 2000 Video, MPEG-2, MPEG-4, H.264, and the emerging H.265. As a result, a choice of codec typically involves a trade-off among desired features, for example, frame rate and display resolution versus content encryption, compression versus final video quality, real time video capture versus display and transmission bandwidth requirements, or any other feature.

There have been many successful efforts to develop products that involve multiple codecs, but the great majority address the problem of converting encoded video from one codec to another. In order to convert encoded video from codec Y to codec Z, the converter, or transcoder, behaves as if it were a two-stage serial device, the first stage of which is a Y-decoder, followed by a Z-encoder as the second stage. The features of the video product of such devices are usually typical of video products of the output encoder alone.

A few efforts have incorporated multiple codecs into a single system, allowing the system to behave like any one of them, as needed. The codecs in these systems seldom interact except by way of synchronizing, sharing resources, or transcoding, and are usually limited to audio codecs.

U.S. Pat. No. 7,457,359 recites systems and methods for securely distributing highly-compressed multimedia where, for each segment of video, a codec that best satisfies some set of criteria is selected from a pre-specified collection of codecs. Thus, each competing encoder operates individually on each segment, in parallel with its competitors. The encoding selected for a segment is the one that best endows that segment with the desired features, sacrificing features possessed by other encodings. In other words, feature trade-offs occur segment-by-segment instead of once, for the full video—but the features are still sacrificed. Furthermore, every segment in the video must be tested and compared using every codec in the codec set, adding to encoding time accordingly. Also, to decode the video, each viewer must have access to a decoder for each pre-specified codec. This method may also pose segment transition quality maintenance problems, synchronization issues, and other problems involving visually noticeable transitions between various codecs. Moreover, many features (e.g., scalability) must apply to the entire video to be of value. In short, this approach does not provide much practical relief from having to select a single video encoder and decoder to the exclusion of other codecs.

U.S. Pat. No. 7,657,651 recites a similar idea—multiple encodings that allow the system to stream the encoding that best serves the individual client among a clientele with heterogeneous needs. This patent postulates a network over which broadcaster streams live media to a heterogeneous clientele. The broadcaster is prepared with multiple alternative data streams. Based on varying clientele needs and preferences, each client receives one suitable data stream at any one time although the selection can vary from one data stream to another over time. As in the previous patent, there is no concept of merging multiple same-frame encodings into a single frame. If multiple encodings are involved, each is used by itself, with no direct interaction at any time with any other encoding. Moreover, all applications within the scope of this patent involve live broadcast, a plurality of users, and user feedback that determines which encoding from the predetermined set of alternate encodings will be received, none of which addresses the need for codec systems that combine, frame-by-frame, the best features of multiple codecs.

U.S. Pat. No. 7,920,633 recites a method for parallel processing that sets compression parameters for a group of pictures (GOP) to be processed by a third encoder based on those used to process a first GOP by a first encoder and those used to process a second GOP by a second encoder. This patent claims to reduce encoding time and encourages better compression-quality trade-offs both by making compression comparisons easier and by using the best choice of two or three encoders. However, this patent does not suggest non-parallel applications, non-compression/quality applications, multiple codecs with interacting subsystems, same-frame encodings by multiple codecs to be merged into a single frame, or other features of video multi-codec encoders.

To overcome the problems and limitations described above, there is a need for video multi-codec encoders, including video multi-codec encoders that synergize advantageous features of multiple codecs into a single system, the encoded video products of which have critical advantages over those of the simple existing encoder applied to the same video input data.

BRIEF SUMMARY OF THE INVENTION

One or more embodiments of video multi-codec encoders described herein enable integrated subsystems of multiple video codecs that encode at least one frame of a video. The output of one or more embodiments of a video multi-codec encoder is that of a single codec Z that interacts with at least one subsystem of another codec Y in processes that lead to that Z-encoded output. Such a multi-codec encoder is an interacting video encoder, called a Y-to-Z encoder, with output codec Z and auxiliary codec Y.

One or more embodiments of multi-codec encoders described herein produce video streams of encoded data that encode multiple distinct semblances of at least one frame of a video. Such multi-codec encoders are called multiplex encoders.

Multi-codec encoder systems may include interacting encoder systems, multiplex encoder systems, multi-codec encoders that are both interacting encoders and multiplex encoders, and other systems in which subsystems of two or more codecs produce one or more data streams of encoded video, each of which can be decoded by a single-codec decoder. Multi-codec encoder systems include interacting encoders, multiplex encoders, and combinations of these, in conjunction with multi-codec encoder subsystems that integrate or enhance their functions.

Multi-codec encoders may be classified in various ways, including: by the number and kind of distinct video inputs, of output codecs and their auxiliary codecs, and of encoded data streams. In addition, the output and auxiliary codecs of a multi-codec encoder system may be grouped individually or collectively as multiplex encoder systems.

One or more embodiments of multi-codec encoders described herein enable multiplex encoders and describe general design techniques and specific examples of their application. One or more embodiments of multiplex encoders described herein include specific duplex and triplex encoders. These duplex and triplex encoders may be configured to produce data streams that, when decoded, synchronized, and merged, can result in video with quality not achievable by any single component codec. For example, one codec may produce video with excellent color and texture, while another codec produces video with sharp, crisp edges. A multiplex encoder that includes these as output codecs may produce video with excellent color and texture, as well as sharp, crisp edges.

A video multi-codec encoder may use the functionality of multiple video codecs to produce an encoded video data stream that can be decoded by one of the multiple video codecs. If Z is an output codec of a multi-codec encoder, such as a multiplex encoder, then interactions with auxiliary codecs may substantially improve the quality of the Z-encoded data product with features, efficiencies, and other enhancements that are not possible for a simple Z encoder. In one or more embodiments, a video multi-codec encoder adds new or enhanced features to an existing video encoder.

One or more embodiments of video multi-codec encoders described herein enable interacting video encoders and describe general design techniques and specific examples of their application. One or more embodiments enable an encoder that merges desirable features of multiple codecs into an encoded video product decodable by an existing decoder. One or more embodiments combine elements of a first encoder into a preprocessing system for a second encoder. In one or more embodiments, subsystems of multiple codecs interact with each other by exchanging data back and forth among them before finally completing the encoding process.

One or more embodiments of interacting video encoders described herein are a Y-to-Z encoder, involving auxiliary codec Y and output codec Z. Video data that enters the Y-to-Z encoder is processed by one or more subsystems of each of the Y and Z codecs and is output as Z-encoded video data. One or more embodiments of multi-codec encoders enable Y-to-Z encoders.

If codec Z is the decoding codec of a video multi-codec encoder and codecs $Y_1, \ldots, Y_n$, n>0, are auxiliary codecs of codec Z, then the video multi-codec encoder is a $\mathcal{Y}$-to-Z encoder, where $\mathcal{Y} = \{Y_1, \ldots, Y_n\}$. One or more embodiments of a $\mathcal{Y}$-to-Z encoder behave like a Y-to-Z encoder for each codec Y, where auxiliary codec Y varies from one to another codec in $\mathcal{Y}$ as a sequence of video frames is processed. One or more embodiments of a $\mathcal{Y}$-to-Z encoder require, in processing a single frame, the interaction of multiple members of $\mathcal{Y}$. One or more embodiments require the involvement of at least one subsystem of codec Z followed by at least one subsystem of a non-Z member $\mathcal{Y}$ to produce its Z-encoded data.

One or more embodiments of interacting video multi-codec encoders described herein relate to the encoded video products of $\mathcal{Y}$-to-Z encoders, including any data stream produced by an embodiment of an interacting $\mathcal{Y}$-to-Z encoder.

In one or more embodiments, a $\mathcal{Y}$-to-Z encoder in accordance with one or more embodiments of video encoders described herein outputs encoded video through a Z-encoder. In one or more embodiments, the encoded video stream incorporates features or enhancements not otherwise available from the Z encoder alone. The video stream produced by the $\mathcal{Y}$-to-Z encoder can still be decoded for video display by a Z decoder. In one or more embodiments, the $\mathcal{Y}$-to-Z encoder is configured to improve the resulting video quality in one or more ways over that of a simple Z encoder. This gives the user community access to advanced codec technologies and capabilities without the cost and inconvenience of replacing their codec infrastructure, whether resident decoding software, set top boxes, TV chip sets, or other infrastructure and/or equipment.

In one or more embodiments, the video multi-codec encoder is an interacting encoder, and the steps further include generating at least one YZ handoff product by applying one or more of the at least one codec Y subsystem to the at least one selected video frame, where the Z-encoded video data stream is produced by applying at least one codec Z subsystem to the at least one YZ handoff product.

In one or more embodiments, $\{Y_1, \ldots, Y_{n-1}\}$ with output codec Z is an interacting video encoder system Z' and $\{Y_n\}$ with output codec Z' is a video multi-codec encoder system.

In one or more embodiments, $\mathcal{Y}$ includes at least one wavelet-based video codec W, where the at least one codec Y subsystem includes at least one codec W subsystem configured to provide at least partial wavelet-based video codec functionality, and where the at least one YZ handoff product includes at least one WZ handoff product generated by applying the at least one codec W subsystem.

In one or more embodiments, generating the WZ handoff product further includes applying the at least one codec W subsystem to the at least one selected video frame to generate at least one W-processed original. Generating the WZ handoff product may further include generating at least one difference frame between the at least one selected video frame and the at least one W-processed original, and applying a filter operation on the at least one difference frame, where generating the at least one WZ handoff product is based on the at least one difference frame and the at least one W-processed original.

In one or more embodiments, the steps further include generating at least one ZY handoff product by applying the at least one codec Z subsystem to the at least one YZ handoff product, and generating the at least one subsequent YZ handoff product by applying the at least one codec Y subsystem to at least one ZY handoff product. The at least one codec Z subsystem may generate the at least one ZY handoff product for processing by one or more of the at least one codec Y subsystem until at least one target criterion is met.

In one or more embodiments, the at least one encoded video data stream includes two or more related encoded video data streams, where each of the two or more related encoded video data streams includes a semblance of the at least one selected video frame. The two or more related encoded video data streams may encode same-frame images that, together, encode a distinct same-frame image.

The two or more related encoded video data streams may produce an enhanced video stream including the at least one selected video frame when the two or more related encoded video data streams are merged.

One or more embodiments of video multi-codec encoders described herein enable a computer-readable medium including computer-readable instructions for a video multi-codec encoder. Execution of the computer-readable instructions by one or more processors causes the one or more processors to accept video input data including a plurality of video frames.

In one or more embodiments, execution of the computer-readable instructions by one or more processors causes the one or more processors to process the video input data with a channel processor.

In one or more embodiments further include an I/O insert for at least one of the video codecs $\mathcal{Y}$ and Z.

Execution of the computer-readable instructions by one or more processors further causes the one or more processors to apply at least one codec Y subsystem to frame data that includes at least one video frame of the plurality of video frames, where the frame data includes at least an unencoded portion of the plurality of video frames before one or more of the at least one codec Y subsystem is applied. The at least one codec Y subsystem includes at least partial $Y_i$ codec functionality. $Y_i$ is a codec selected from video codecs $\mathcal{Y} = \{Y_1, \ldots, Y_n\}$, where n is an integer greater than or equal to 1.

In one or more embodiments, $\mathcal{Y}$ includes at least one wavelet-based video codec W, where the at least one codec Y subsystem includes at least one codec W subsystem configured to provide at least partial wavelet-based video codec functionality.

Execution of the computer-readable instructions by one or more processors further causes the one or more processors to apply at least one codec Z subsystem to the frame data, where the at least one codec Z subsystem includes at least partial Z codec functionality.

In one or more embodiments, codec Z is a DCT-based codec. Codec Z may be a wavelet-based codec.

Execution of the computer-readable instructions by one or more processors further causes the one or more processors to generate video output data including simple Z-encoded video data of the at least one video frame using the frame data.

In one or more embodiments, the video output data includes at least one encoded video data stream.

In one or more embodiments, execution of the computer-readable instructions by one or more processors further causes the one or more processors to generate Y-encoded video data by applying the at least one codec Y subsystem.

In one or more embodiments, the video multi-codec encoder is an interacting encoder, and execution of the computer-readable instructions by one or more processors further causes the one or more processors to generate at least one YZ handoff product by applying one or more of the at least one codec Y subsystem to the frame data. The Z-encoded video data is generated by applying one or more of the at least one codec Z subsystem to the at least one YZ handoff product.

In one or more embodiments, $\{Y_1, \ldots, Y_{n-1}\}$ and output codec Z include an interacting video encoder system Z' and $\{Y_n\}$ and output codec Z' includes a video multi-codec encoder system.

In one or more embodiments, $\mathcal{Y}$ includes at least one wavelet-based video codec W, where the at least one codec Y subsystem includes at least one codec W subsystem configured to provide at least partial wavelet-based video codec functionality.

In one or more embodiments, $\mathcal{Y}$ includes at least one wavelet-based video codec W, where the at least one codec Y subsystem includes at least one codec W subsystem configured to provide at least partial wavelet-based video codec functionality, and where the at least one YZ handoff product includes at least one WZ handoff product generated by applying the at least one codec W subsystem.

In one or more embodiments, generating the WZ handoff product further includes applying the at least one codec W subsystem to the frame data to generate at least one W-processed original, generating at least one difference frame between the at least one selected video frame and the at least one W-processed original, and applying a filter operation on the at least one difference frame. Generating the at least one WZ handoff product is based on the at least one difference frame and the at least one W-processed original.

In one or more embodiments, the at least one ZY handoff product is generated by applying the at least one codec Z subsystem to the at least one YZ handoff product and generating at least one subsequent YZ handoff product by applying the at least one codec Y subsystem to the at least one ZY handoff product.

In one or more embodiments, the at least one codec Z subsystem generates the at least one ZY handoff product for processing by one or more of the at least one codec Y subsystem until at least one target criterion is met.

In one or more embodiments, the video output data includes two or more related encoded video data streams, where each of the two or more related encoded video data streams includes a semblance of the at least one selected video frame. The two or more related encoded video data streams may encode same-frame images that, together, encode a distinct same-frame image. In one or more embodiments, the two or more related encoded video data streams may be merged to produce an enhanced video stream including enhanced frame data associated with the at least one video frame when the two or more related encoded video data streams are merged.

One or more embodiments of video multi-codec encoders described herein enable a video multi-codec encoder system. The video multi-codec encoder system includes at least one codec Y subsystem. The at least one codec Y subsystem includes at least partial $Y_i$ codec functionality. $Y_i$ is a codec selected from video codecs $\mathcal{Y} = \{Y_1, \ldots, Y_n\}$, where n is an integer greater than or equal to 1.

The video multi-codec encoder system further includes at least one codec Z subsystem, where the at least one codec Z subsystem includes at least partial Z codec functionality.

The at least one codec Y subsystem and the at least one Z codec subsystem are configured to accept video input data including a plurality of video frames and generate video output data including Z-encoded video data by applying the at least one codec Y subsystem to frame data that includes at least one video frame of the plurality of video frames and applying the at least one codec Z subsystem to the frame data associated with the at least one video frame, where the frame data includes at least an unencoded portion of the plurality of video frames before one or more of the at least one codec Y subsystem is applied, and where the video output data includes simple Z-encoded video data of the at least one video frame.

One or more embodiments of the video multi-codec encoder system further include a channel processor.

One or more embodiments of the video multi-codec encoder system further include a frame differencing or summing subsystem.

One or more embodiments of the video multi-codec encoder system further include a de-interlacer.

One or more embodiments of the video multi-codec encoder system further include an iterative feature enhancer.

One or more embodiments of the video multi-codec encoder system further include a merging unit.

In one or more embodiments, at least one of video codecs $\mathcal{Y}$ and Z includes an I/O insert.

In one or more embodiments, Y includes at least one wavelet-based video codec W, where the at least one codec Y subsystem includes at least one codec W subsystem configured to provide at least partial wavelet-based video codec functionality.

In one or more embodiments, Z is a DCT-based codec. Z may be a wavelet-based codec.

In one or more embodiments, the video output data includes at least one encoded video data stream.

In one or more embodiments, the video multi-codec system is further configured to generate Y-encoded video data by applying the at least one codec Y subsystem.

In one or more embodiments, the video multi-codec encoder is an interacting encoder, and the video multi-codec system is further configured to generate at least one YZ handoff product by applying one or more of the at least one codec Y subsystem to the frame data. The Z-encoded video data is generated by applying one or more of the at least one codec Z subsystem to the at least one YZ handoff product.

In one or more embodiments, $\{Y_1, \ldots, Y_{n-1}\}$ and output codec Z includes an interacting video encoder system Z' and $\{Y_n\}$ and output codec Z' includes a video multi-codec encoder system.

In one or more embodiments, $\mathcal{Y}$ includes at least one wavelet-based video codec W, where the at least one codec Y subsystem includes at least one codec W subsystem configured to provide at least partial wavelet-based video codec functionality.

In one or more embodiments, $\mathcal{Y}$ includes at least one wavelet-based video codec W, where the at least one codec Y subsystem includes at least one codec W subsystem configured to provide at least partial wavelet-based video codec functionality, and where the at least one YZ handoff product includes at least one WZ handoff product generated by applying the at least one codec W subsystem.

In one or more embodiments, generating the WZ handoff product further includes applying the at least one codec W subsystem to the at least one video frame to generate at least one W-processed original, generating at least one difference frame between the at least one selected video frame and the at least one W-processed original, and applying a filter operation on the at least one difference frame. Generating the at least one WZ handoff product is based on the at least one difference frame and the at least one W-processed original.

In one or more embodiments, the at least one ZY handoff product is generated by applying the at least one codec Z subsystem to the at least one YZ handoff product, and generating at least one subsequent YZ handoff product by applying the at least one codec Y subsystem to the at least one ZY handoff product.

In one or more embodiments, the at least one codec Z subsystem generates the at least one ZY handoff product for processing by one or more of the at least one codec Y subsystem until at least one target criterion is met.

In one or more embodiments, the video output data includes two or more related encoded video data streams, where each of the two or more related encoded video data streams includes a semblance of the at least one selected video frame. The two or more related encoded video data streams may encode same-frame images that, together, contain a distinct same-frame image.

One or more embodiments of video multi-codec encoders described herein enable a tangible computer-readable medium including Z-encoded video data, where the Z-encoded video data is generated by executing computer-readable instructions using one or more processors. The computer-readable instructions cause the one or more processors to accept video input data including a plurality of video frames.

The computer-readable instructions further causes the one or more processors to apply at least one codec Y subsystem to frame data that includes at least one video frame of the plurality of video frames, where the frame data includes at least an unencoded portion of the plurality of video frames before one or more of the at least one codec Y subsystem is applied. The at least one codec Y subsystem includes at least partial $Y_i$ codec functionality. $Y_i$ is a codec selected from video codecs $\mathcal{Y} = \{Y_1, \ldots, Y_n\}$, where n is an integer greater than or equal to 1.

The computer-readable instructions further causes the one or more processors to apply at least one codec Z subsystem to the frame data, where the at least one codec Z subsystem includes at least partial Z codec functionality.

The computer-readable instructions further causes the one or more processors to generate video output data including Z-encoded video data of the at least one video frame using the frame data.

In one or more embodiments, the computer-readable instructions further causes the one or more processors to generate at least one YZ handoff product by applying one or more of the at least one codec Y subsystem to the frame data. The Z-encoded video data is generated by applying one or more of the at least one codec Z subsystem to the at least one YZ handoff product.

In one or more embodiments, $\{Y_1, \ldots, Y_{n-1}\}$ and output codec Z includes an interacting video encoder system Z' and $\{Y_n\}$ and output codec Z' includes a video multi-codec encoder system.

In one or more embodiments, codec Z is a DCT-based codec. Codec Z may be a wavelet-based codec.

In one or more embodiments, $\mathcal{Y}$ includes at least one wavelet-based video codec W, where the at least one codec Y subsystem includes at least one codec W subsystem configured to provide at least partial wavelet-based video codec functionality.

In one or more embodiments, $\mathcal{Y}$ includes at least one wavelet-based video codec W, where the at least one codec Y subsystem includes at least one codec W subsystem configured to provide at least partial wavelet-based video codec functionality, and the at least one YZ handoff product includes at least one WZ handoff product generated by applying the at least one codec W subsystem.

Generating the WZ handoff product may further include applying the at least one codec W subsystem to the at least one video frame to generate at least one W-processed original, generating at least one difference frame between the at least one selected video frame and the at least one W-processed original, and applying a filter operation on the at least one difference frame. Generating the at least one WZ handoff product may be based on the at least one difference frame and the at least one W-processed original.

In one or more embodiments, the computer-readable instructions further cause the one or more processors to generate at least one ZY handoff product by applying the at least one codec Z subsystem to the at least one YZ handoff product, and generate at least one subsequent YZ handoff product by applying the at least one codec Y subsystem to the at least one ZY handoff product.

In one or more embodiments, the at least one codec Z subsystem generates the at least one ZY handoff product for processing by one or more of the at least one codec Y subsystem until at least one target criterion is met.

In one or more embodiments, the computer-readable instructions further causes the one or more processors to generate Y-encoded video data by applying the at least one codec Y subsystem.

In one or more embodiments, the video output data includes two or more related encoded video data streams, where each of the two or more related encoded video data streams includes a semblance of the at least one selected video frame. The two or more related encoded video data streams may encode same-frame images that, together, encode a distinct same-frame image.

In one or more embodiments, the two or more related encoded video data streams produce an enhanced video stream including enhanced frame data associated with the at least one video frame when the two or more related encoded video data streams are merged.

One or more embodiments of video multi-codec encoders described herein enable a computer-readable medium including computer-readable instructions for a video multi-codec encoder, where execution of the computer-readable instructions by one or more processors causes the one or more processors to carry out steps including accepting video input data including a plurality of video frames.

Execution of the computer-readable instructions by one or more processors further causes the one or more processors to apply at least one codec Z subsystem to frame data associated with the at least one video frame, where the at least one codec Z subsystem includes at least partial Z codec functionality, where the at least one codec Z subsystem comprises an I/O insert.

Execution of the computer-readable instructions by one or more processors further causes the one or more processors to generate video output data including simple Z-encoded video data of the at least one video frame using the frame data.

In one or more embodiments, execution of the computer-readable instructions by one or more processors further causes the one or more processors to process the video input data with a channel processor.

One or more embodiments of video multi-codec encoders described herein enable a video multi-codec encoder system.

The video multi-codec encoder system includes at least one codec Z subsystem, where the at least one codec Z subsystem includes at least partial Z codec functionality, where the at least one video codec Z has an I/O insert. The at least one Z codec subsystem is configured to accept video input data including a plurality of video frames and generate video output data including simple Z-encoded video data by applying the at least one codec Z subsystem to frame data associated with the at least one video frame, where the video output data includes simple Z-encoded video data of the at least one video frame.

In one or more embodiments, the video multi-codec encoder system further includes a channel processor.

In one or more embodiments, the video multi-codec encoder system further includes a frame differencing or summing subsystem.

In one or more embodiments, the video multi-codec encoder system further includes a de-interlacer.

In one or more embodiments, the video multi-codec encoder system further includes an iterative feature enhancer.

In one or more embodiments, the video multi-codec encoder system further includes a merging unit.

One or more embodiments of video multi-codec encoders described herein enable a tangible computer-readable medium including Z-encoded video data, where the Z-encoded video data is generated by executing computer-readable instructions using one or more processors, where the computer-readable instructions causes the one or more processors to carry out steps including accepting video input data including a plurality of video frames.

Execution of the computer-readable instructions by one or more processors further causes the one or more processors to apply at least one codec Z subsystem to frame data associated with the at least one video frame, where the at least one codec Z subsystem includes at least partial Z codec functionality.

Execution of the computer-readable instructions by one or more processors further causes the one or more processors to provide an I/O insert for the at least one video codec Z.

Execution of the computer-readable instructions by one or more processors further causes the one or more processors to generate video output data including simple Z-encoded video data of the at least one video frame using the frame data.

In one or more embodiments, execution of the computer-readable instructions by one or more processors further causes the one or more processors to process the video input data with a channel processor.

BRIEF DESCRIPTION OF THE DRAWINGS

The above and other aspects, features, and advantages of interacting video encoders will be more apparent from the following more particular description thereof, presented in conjunction with the following drawings wherein.

DETAILED DESCRIPTION

Figure 1:
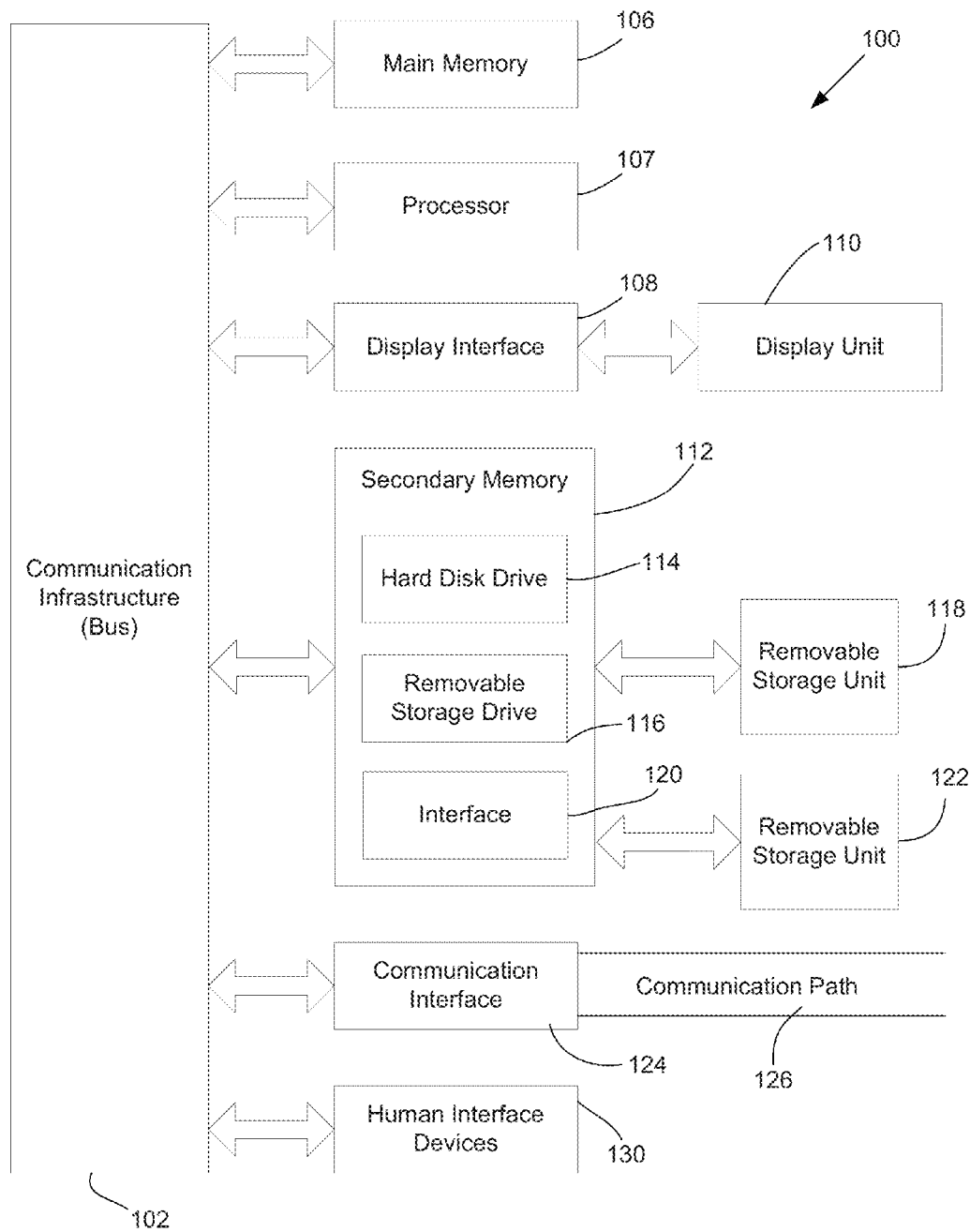
FIG. 1 illustrates a general-purpose computer and peripherals that when programmed as described herein may operate as a specially programmed computer capable of implementing one or more methods, apparatus, and/or systems in accordance with one or more embodiments of video multi-codec encoders.

Exemplary embodiments in accordance with video multi-codec encoders will now be described. In the following description numerous specific details are set forth in order to provide a more thorough understanding of video multi-codec encoders. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although exemplary embodiments are set forth herein, the claims, and the full scope of any equivalents, are what define the metes and bounds of the invention.

As used herein, the term "video frame" or "video image" refers to any frame of a video to be displayed sequentially at a frame rate.

As used herein, the term "original video frame" refers to a video frame originally input to an encoding system, whether that video frame is raw video data such as generated within a video camera, output from a video camera, a partially processed image (as might be generated by a video preprocessing system internal or external to the video camera that captured the image), mezzanine video (i.e., almost losslessly compressed movie master-quality digital video), or decoded video that has been subjected to lossy or lossless compression, whether in accord with a video standard (e.g., H.264) or otherwise.

As used herein, the term "semblance" refers to any processed version of a video frame and/or a plurality of video frames that is recognizable as the original video frame and/or plurality of video frames.

As used herein, the term "encode" refers to the process of a video processing system that generates output data based on input of a plurality of video frames such that a semblance of the input video frames can be reproduced by processing the output data appropriately. Encoding includes lossless or lossy encoding.

As used herein, the term "encoder" refers to any device, software, or combination thereof capable of encoding a plurality of video frames.

As used herein, the term "decoder" refers to any device, software, or combination thereof capable of generating a plurality of video frames from encoded data.

As used herein, the term "decode" refers to generating a plurality of video frames from output data of a video encoder by a video decoder.

As used herein, the term "codec" refers to any system that implements an encoder together with a system that implements a decoder of the video data produced by that encoder, and one or more processes that may facilitate the efficiency or effectiveness of the codec, whether hardware, firmware, software, or any combination thereof.

Codecs include any existing or future codec, including codecs conforming to any proprietary format and/or video coding standard, such as H.264, VC1, MPEG-4, MPEG-2, or any other video coding standard.

As used herein, the term "DCT-based codec" refers to any codec that applies at least one discrete cosine transform (DCT) to encode data and/or applies at least one inverse DCT (IDCT) to decode data.

As used herein, the term "wavelet-based codec" refers to any codec that applies at least one wavelet transform (WT) to encode data and/or applies at least one inverse WT (IWT) to decode data. As used herein, the terms "W codec", "codec W", and "W" when representing a codec refer to a wavelet-based codec.

A video codec includes a video encoder and video decoder such that the product of the encoder can be decoded for display by the decoder. If Z is a video decoder then, as used herein, the term "Z decoder" refers to any decoder functionally equivalent to decoder Z. As used herein, expression "Z-encoded video" refers to encoded video that can be decoded by a Z decoder. As used herein, the term "Z encoder" is any encoder the product of which can be decoded for display by a Z decoder. Thus, the product of a Z encoder includes Z-encoded video.

If X is an encoder, then as used herein, the expression "subsystem of codec X" refers to any system that is functionally equivalent to a subsystem of an implementation of codec X, which includes the encoder X and its subsystems, an X decoder and its subsystems, and other processes of codec X, whether implemented in software, firmware, computer hardware, or by any other method.

As used herein, the expression "codec X subsystems" refers to one or more subsystems of codec X.

As used herein, the term "I/O insert" refers to an input and/or output datapath that extends the functionality of a video codec by enabling the communication of data between a subsystem of that video codec and another video codec.

As used herein, the expression "multi-codec encoder" refers to a system that can be configured to encode each of one or more digitized video frames using subsystems of at least two different video codecs.

Multi-codec encoders can be classified in various ways, including: the number and kinds of video frame input streams, the number and kinds of output encoders, the kind of output architecture used to convert output encoder data streams to multi-codec encoder output data streams, as well as, for each output codec, the auxiliary codecs used with the output codec, and other classifications.

A multi-codec encoder has at least one input stream of digitized video frames capable of being viewed as a video at a suitable frame rate. This input stream could arise from raw, mezzanine, losslessly compressed, lossy compressed, or any source of uncoded or decoded video frame data. This data could come from a camera, transmission, or any kind of storage device.

A multi-codec encoder can have multiple such input streams. For example, one or more embodiments of a multi-codec encoder have multiple video frame input streams that are components of a 3-D video. In one or more embodiments, multiple video input streams to a multi-codec encoder are unrelated to one another. For example, all the feeds for a digital multi-screen public theater could be sent to a single multi-input multi-codec encoder for encoding and storage or transmission to the theater. Another example would be that of assembling a video feed for a collocated group of consumers, such as multiple members of a household or multiple apartments in a complex. A third example would be military applications, where a soldier may have to switch between multiple live feeds, enabled by a single multi-input multi-codec encoder. Still another example is that of a single video clip that has been partitioned into segments; each multi-codec encoder input is allocated to a segment, enabling segments to be processed independently and in parallel.

For simplicity, multi-codec encoders with a single video frame input data stream are now discussed. One familiar with the art will understand that concepts and embodiments described for multi-codec encoders with a single input data stream are readily extended to multi-codec encoders with multiple input data streams. Unless otherwise noted, for easier reading and, without limitation, multi-codec encoders are discussed herein as having a single video input frame data stream.

A multi-codec encoder produces one or more output streams of video data, each stream of which is an encoded version of the single video input frame data stream. Thus, each output stream of video data may carry a different encoding of the same input frame. Consider one of these encoded output streams. This output stream is decodable by decoders of one or more codecs. Two different segments of the output stream may require two different decoders to decode them. Even if the entire output stream is decodable by a single decoder Z, the output stream may have been produced by multiple encoders, for example, encoders Z1 and Z2 for functionally distinct codecs, <Z1, Z> and <Z2, Z>, which have the same decoder Z. It is also possible for multiple encoders, say encoders Z3 and Z4, to encode the same frame and combine the data in the encoded output data stream such that a decoder Z5 decodes and reproduces a semblance of the original frame.

U.S. patent application Ser. No. 13/007,670, entitled "SYSTEMS AND METHODS FOR WAVELET AND CHANNEL-BASED HIGH DEFINITION VIDEO ENCODING", filed on Jan. 17, 2011, describes systems and methods compatible with one or more embodiments of video multi-codec encoders described herein, and is hereby incorporated by reference in its entirety for completeness of disclosure.

In accord with the teaching of "SYSTEMS AND METHODS FOR WAVELET AND CHANNEL-BASED HIGH DEFINITION VIDEO ENCODING", a digital frame of video may be viewed as a pixel array, each pixel of which is a K-dimensional vector of real numbers, K a positive integer. Thus, in the case of two-dimensional rectangular pixel array, $\{<p_1(i, j), \ldots, p_K(i, j)>: i=1, \ldots, n, j=1, \ldots, m\}$, each value $p_k(i, j)$ is a real number, and $<p_1(i, j), \ldots, p_K(i, j)>$ is a K-dimensional representation of pixel p(i, j).

As used herein, the term "data channel" refers to a single-component data array that describes a frame of video.

A video frame sequence may be described both as a sequence of pixel arrays for which each pixel is a K-dimensional vector, and as K single-data-channel frame sequences, each of which describes the video frame sequence in terms of one of its K components.

Several kinds of channels may be used to describe a video frame sequence. For example, full-color video may be represented as three-channel video, each channel of which represents spatial color intensity with respect to a primary, or basis, color. RGB and YCbCr are two common such color bases. For another example, a data channel may carry spatial infra-red data, ultra-violet data, or that of any frequency, frequency range, of set of frequencies in the electromagnetic spectrum. For a third example, in 3-D and related applications, a data channel can carry depth or depth-related data. The foregoing examples are to be understood as completely non-limiting, inasmuch as many other examples could be cited.

As used herein, the expression "channel processor" refers to any hardware and/or software device that accepts a sequence of video frames as input and performs such data channel-related processes as: selecting and outputting a particular data channel, selecting and outputting a subset of data channels, transforming video data represented in terms of one set of data channels to video data represented in terms of another set of data channels, or any other data channel-based operation.

Non-limiting examples of channel processing include: separating the luminance (Y) channel from YCbCr data, separating the chroma (Cb and Cr) channels from YCbCr data, transforming RGB representation of video frame to YCbCr representation or any other color space, and modifying two-dimensional spatial positioning of three-channel (e.g., three color) video in accord with data from a fourth, depth, channel in order to provide two distinct views of each frame, as for 3-D viewing.

As used herein, the term "sequencing data" refers to data or signals used to sequence, synchronize, time, or otherwise coordinate the video data flow of two or more video codec subsystems.

As used herein, the term "handoff product" refers to a dataset that does not include sequencing data, and is generated by one or more subsystems of one or more codecs and input to another codec for further processing or to affect processing. Although the handoff product does not include sequencing data, the storage and/or transfer of sequencing data along with a handoff product may occur in one or more embodiments.

In one or more embodiments of a multi-codec encoder, a handoff product includes any or all of the following: data involving one or more frames of video, processing instructions, control signals, or any other video-related data. Thus, a handoff product may include additional data that affects a product of a multi-codec encoder.

As used herein, the term "frame data" refers to any data that represents, encodes, or encrypts a complete or partial video frame or subset of video frames, or results from any sequence of processes applied to a complete or partial video frame or subset of video frames, and encompasses any input, handoff product, or output that arises from processing a complete or partial video frame or subset of video frames. Unless otherwise specified, an instance of frame data may refer to any data that represents, encodes, or encrypts a complete or partial video frame or subset of video frames at any stage of processing, including input data, output data, as well as data that is processed or otherwise modified.

As used herein, the term "YZ handoff product" refers to a handoff product, conveyed over a path from codec Y subsystems to codec Z subsystems of a multi-codec encoder. As used herein, the term "ZY handoff product" refers to a handoff product conveyed over a path from the codec Z subsystems to the codec Y subsystems of a multi-codec encoder. A handoff path may represent any method of communicating data, whether electronic, electromagnetic, biological, acoustic, optical, time-lapse storage, or any other path over which data may be communicated.

As used herein, the expressions "$\mathcal{Y}$-to-Z encoder," "output encoder Z" for multi-codec encoder M, and "auxiliary codecs $\mathcal{Y}$" for output encoder Z refer to a multi-codec encoder M, codec Z, and non-empty set of codecs $\mathcal{Y} = \{Y_1, \ldots, Y_n\}$ such that multi-codec encoder M can be configured such that for codec Z and some codec Y selected from codecs $\mathcal{Y}$, multi-codec encoder M accepts video input data representing a plurality of video frames; generates at least one YZ handoff product by applying at least one subsystem of codec Y to at least one selected video frame of the video input data, where the at least one subsystem of codec Y includes at least partial Y codec functionality; and applies at least one subsystem of codec Z to the at least one YZ handoff product of codec Y subsystems to generate Z-encoded video data, where the at least one subsystem of codec Z includes at least partial Z codec functionality. Multi-codec encoder M may include one or more data preparation subsystems that interact with or otherwise preprocess data for one or more codecs of multi-codec encoder M.

As used herein, the expression "interacting encoder" refers to a multi-codec encoder that includes a $\mathcal{Y}$-to-Z encoder for some codec Z and a non-empty set of codecs $\mathcal{Y}$.

The processing and use of sequencing data in a system involving multiple data streams does not, in itself, cause the system to be considered an interacting video encoder.

As used herein, the expression "Y-to-Z encoder" refers to an interacting $\mathcal{Y}$-to-Z encoder, where $\mathcal{Y}$ includes just one codec, Y.

As used herein, the expression "simple Z encoder" refers to a Z encoder that is not a multi-codec encoder.

As used herein, the expression "simple Z decoder" refers to a decoder for a simple Z encoder. A multi-codec decoder is a simple decoder if it is also a decoder for a simple encoder.

As used herein, the expression "simple Z-encoded video data" refers to data from which a semblance of part or all of one or more video frames can be obtained by applying a simple Z decoder.

One or more non-Z codecs may be involved in producing a Z-encoded video data stream. For example, the Z-encoded video stream may be produced at least in part by the interaction of one or more subsystems of codec Y with one or more subsystems of codec Z. If a subsystem of codec Y is applied to the video frame and produces a YZ handoff used by codec Z, then the frame was encoded by an interacting encoder, specifically, by a Y-to-Z encoder. Thus, even for an encoding system with a single Z-encoded video data output stream, if at least one frame is encoded with the help of a YZ handoff, then that encoding system is a multi-codec encoder and includes a Y-to-Z encoder.

A Y-to-Z encoder includes one or more subsystems of a Y codec, one or more subsystems of a Z codec, an input path to the Y-to-Z encoder for video frame data, an output path from the Y-to-Z encoder for Z-encoded video data, and one or more handoff paths between the set of subsystems of the Z codec and the set of subsystems of the Y codec, each of which may convey one or more handoff products.

As used herein, the expression "Y subsystems of a Y-to-Z encoder" refers to the set of one or more subsystems of codec Y that are present in the Y-to-Z encoder. As used herein, the expression "Z subsystems of a Y-to-Z encoder" refers to the set of one or more subsystems of codec Z that are present in the Y-to-Z encoder.

In one or more embodiments of a Y-to-Z encoder, the Z-encoded video product has some feature or enhancement in the video product that could not have been produced by the simple Z encoder alone. If the Z-encoded video product can be decoded by a simple Z decoder, then it is simple Z-encoded video data.

In one or more embodiments of a Y-to-Z encoder, a Z-decoder is able to decode the output of the Y-to-Z decoder for display.

In one or more embodiments of a Y-to-Z encoder, the product of the Y-to-Z encoder differs from encoded products of the simple-Z encoder in some way that requires the application of a subsystem of a Y-codec to produce it, and the functionality of one or more subsystems of a Y-codec are used in the production process and therefore enable the Y-to-Z encoder to produce its distinctive product.

A Z encoder is an encoder whose output is decodable by a Z decoder. Z encoders may be functionally different from one another. In one or more embodiments, Z1 and Z2 are functionally different Z encoders, each configured to produce encoded video that can be decoded by a Z decoder. Because a codec includes both an encoder and a decoder, if Z1 and Z2 are functionally different Z encoders, then the <Z1 encoder, Z decoder> codec is functionally a different codec from that of the <Z2 encoder, Z decoder> codec. Moreover, the Z-encoded video stream produced by Z1 may, after decoding, display video that differs qualitatively, quantitatively, and/or in other features from the Z-encoded video stream produced by Z2. There may be several codecs that use the same Z decoder. Thus, all may be called Z codecs although the codecs involve functionally different encoders, all of which are Z encoders. Therefore, codecs that share a common decoder are the same codec only if their encoders are functionally the same. For that reason, we are careful to characterize a Y-to-Z encoder by its specific Z encoder functionality. For example, the output encoder of a particular Y-to-Z1 encoder may be an H.264 encoder in the sense that any H.264 decoder can decode its output video stream. Both the functionality of this particular Y-to-Z1 encoder and its Z-encoded video product may differ significantly from those of a Y-to-Z2 encoder, where Z2 is a functionally different H.264 encoder.

In one or more embodiments, a Z1-to-Z2 encoder system satisfies the definition of an interacting encoder because Z1 is a non-Z2 encoder.

In one or more embodiments of an interacting video encoder, a Y-to-Z encoder also outputs a Y-encoded video product, encoding one or more frames of the same video as that of its Z-encoded video product.

In one or more embodiments, a Y-to-Z encoder includes a simple Y encoder.

In one or more embodiments, a Y-to-Z encoder includes a Z-to-Y encoder.

Figure 8:
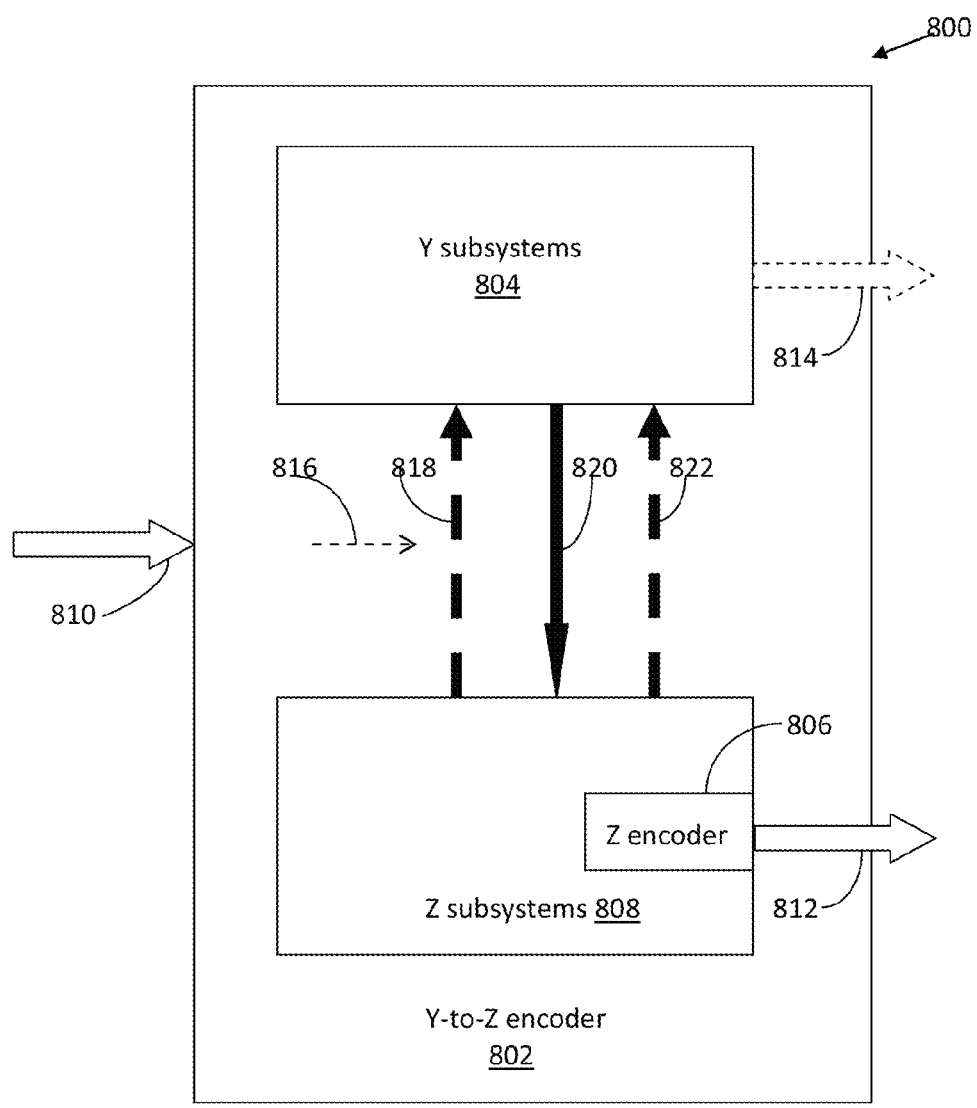
FIG. 8 illustrates exemplary systems for a Y-to-Z encoder in accordance with one or more embodiments of interacting video encoders.

FIG. 8 (later discussed in further detail) is a generic representation of a Y-to-Z encoder and symbolizes a variety of Y-to-Z encoder handoff arrangements in the course of processing input video data until the processed video data is output as a Z-encoded video data stream. Vertical arrows represent data handoff paths arranged from left to right according to when they occur in the order of video data processing. Optional handoff paths are represented by dashed thick arrows. Each handoff path arises from one or more subsystems of the source codec that contribute data to the handoff product delivered on that path. Each path terminates in one or more subsystems of the other codec, where handoff data is delivered. There is at least one YZ handoff path that carries processed data from Y to Z. (Otherwise, this system would only be a simple Z-encoder.) If y represents YZ handoffs and z represents ZY handoffs, let (y) represent any nonempty sequence of YZ handoffs and (z) represent any nonempty sequence of ZY handoffs. Any sequence of YZ and ZY handoffs that starts and ends with a YZ handoff can be represented in the form:

$$(y)_0, (z)_1, (y)_1, (z)_2, (y)_2, \ldots (z)_m, (y)_m, \quad (1)$$

where $m \geq 0$. Then FIG. 8 represents any sequence (left-to-right) of data exchanges between codec Y subsystems and codec Z subsystems, optionally followed by a final set or sequence of ZY handoffs.

As used herein, the expression "one-way Y-to-Z encoder" refers to a Y-to-Z encoder with no ZY handoff paths.

Thus, a one-way Y-to-Z encoder is a Y-to-Z encoder such that the value of m for the sequence of data exchanges shown in Eq. (1) is zero, i.e., where the only handoff paths are the one or more YZ handoff paths represented by $(y)_0$.

As used herein, the expression "basic Y-to-Z encoder" refers to a one-way Y-to-Z encoder with only one handoff path from codec Y subsystems to codec Z subsystems.

While the underlying functional structure of a basic Y-to-Z encoder follows that of FIG. 4 (further discussed below), the underlying functional structure of basic Y-to-Z encoders may vary greatly from one to another. Z-encoded video with different properties may be produced by functionally different Y-to-Z encoders, one-way Y-to-Z encoders, and the basic Y-to-Z encoders described in FIG. 4, even when the same Z encoder is used in all cases.

The more general class of interacting encoders, the $\mathcal{Y}$-to-Z encoders, is now discussed that includes Y-to-Z encoders as special cases. This class of interacting encoders allows for multiple auxiliary codecs interacting with each other as well as an output codec Z in the process of creating Z-encoded video.

It follows from the definition of a $\mathcal{Y}$-to-Z encoder that if $\mathcal{Y} = \{Y_1, \ldots, Y_n\}$ is a set of one or more codecs, then a $\mathcal{Y}$-to-Z encoder is a Z encoder that uses a subsystem of at least one codec in $\mathcal{Y}$ in the course of producing its Z-encoded video data product. This precludes a simple Z encoder from being considered a $\mathcal{Y}$-to-Z encoder (i.e., where $\mathcal{Y}$ is the empty set). In one or more embodiments of a $\mathcal{Y}$-to-Z encoder, for each Y in $\mathcal{Y}$, some part of the Z-encoded product involves a subsystem of codec Y. If $\mathcal{Y} = \{Y\}$, then the definition of a $\mathcal{Y}$-to-Z encoder reduces to that of a Y-to-Z encoder. Every $\mathcal{Y}$-to-Z encoder is an interacting video encoder as defined above.

This definition does not preclude a Z-to-Z encoder as an interacting encoder if a pair of distinct codecs with the same decoder Z to interact with each other. In one or more embodiments of interacting video encoders, $\mathcal{Y}$-to-Z, Y-to-Z, and Z-to-Z encoders encode 3-D video. In one or more embodiments of interacting video encoders, a {Y, Z}-to-Z encoder enables higher compression without loss of viewing quality than is possible for a simple Z encoder.

There is no requirement that every frame of the Z-encoded product of a $\mathcal{Y}$-to-Z encoder involves some element of $\mathcal{Y}$. All but a plurality of frames of the encoded product may be that of simple Z-encoding.

As used herein, the expression "serial $Y_1$- ... -to-$Y_n$-to-Z encoder" refers to $\mathcal{Y}$-to-Z interacting video encoder, $Y_1$-to-($Y_2$-to-( ... -to-($Y_n$-to-Z) ... ), where $\mathcal{Y} = \{Y_1, \ldots, Y_n\}$, $n > 1$.

If Z is a simple decoder, then the video data that serial encoder $Y_1$- ... -to-$Y_n$-to-Z encoder encodes is simple Z-encoded video data.

In one or more embodiments of a serial $Y_1$-to-$Y_2$-to- ... -$Y_n$-to-Z encoder, $Y_i$ is a Z encoder for one or more values of i, $1 \leq i \leq n$.

As used herein, the term "multiplex encoder" refers to a multi-codec encoder the encoded output of which encodes two or more semblances of each of a plurality of input video frames. The encoded output of a multiplex encoder may be a single output data stream, synchronized multiple output data streams, unsynchronized multiple output data streams, or any other data stream or data streams that can be decoded to provide simultaneous, combined, or interleaved video display of the multiple semblances.

As used herein, the term "k-plea encoder" refers to a multiplex encoder that encodes k semblances of each of a plurality of input video frames. As used herein, the term "duplex encoder" refers to a two-plex encoder, the term "triplex encoder" refers to a three-plex encoder, etc.

Various video multi-codec encoders are now described. In the following description, numerous specific details are set forth in order to provide a more thorough understanding of embodiments of the invention. It will be apparent, however, to one of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims and the full scope of any equivalents are what define the metes and bounds of the invention.

Codecs and Encoders

FIG. 1 diagrams an exemplary general-purpose computer and peripherals that, when programmed as described herein, may operate as a specially programmed computer capable of implementing one or more methods, apparatus, and/or systems of the solution described in this disclosure. The computer may have various configurations, combinations, subsets, etc., of the aspects described below and other aspects, and may include one or more integrated circuit devices. Processor 107 may be coupled to bi-directional communication infrastructure 102 such as communication infrastructure system bus 102. Communication infrastructure 102 may generally be a system bus that provides an interface to the other components in the general-purpose computer system such as processor 107, main memory 106, display interface 108, secondary memory 112 and/or communication interface 124.

Main memory 106 may provide a computer readable medium for reading, writing, and storing data and applications. Display interface 108 may communicate with display unit 110 that may be utilized to display outputs to the user of the specially-programmed computer system. Display unit 110 may include one or more monitors that may visually depict aspects of the computer program to the user. Main memory 106 and display interface 108 may be coupled to communication infrastructure 102, which may serve as the interface point to secondary memory 112 and communication interface 124. Secondary memory 112 may provide additional memory resources beyond main memory 106, and may generally function as a storage location for computer programs to be executed by processor 107. Either fixed or removable computer-readable media may serve as secondary memory 112. Secondary memory 112 may include, for example, hard disk 114 and removable storage drive 116 that may have an associated removable storage unit 118. There may be multiple sources of secondary memory 112 and systems implementing the solutions described in this disclosure may be configured as needed to support the data storage requirements of the user and the methods described herein. Secondary memory 112 may also include interface 120 that serves as an interface point to additional storage such as removable storage unit 122. Numerous types of data storage devices may serve as repositories for data utilized by the specially programmed computer system. For example, magnetic, optical or magnetic-optical storage systems, or any other available mass storage technology that provides a repository for digital information may be used.

Communication interface 124 may be coupled to communication infrastructure 102 and may serve as a conduit for data destined for or received from communication path 126. A network interface card (NIC) is an example of the type of device that once coupled to communication infrastructure 102 may provide a mechanism for transporting data to communication path 126. Computer networks such Local Area Networks (LAN), Wide Area Networks (WAN), Wireless networks, optical networks, distributed networks, the Internet or any combination thereof are some examples of the type of communication paths that may be utilized by the specially programmed computer system. Communication path 126 may include any type of telecommunication network or interconnection fabric that can transport data to and from communication interface 124.

To facilitate user interaction with the specially programmed computer system, one or more human interface devices (HID) 130 may be provided. Some examples of HIDs that are within the scope of the system disclosed herein enable users to input commands or data to the specially programmed computer and may include a keyboard, mouse, touch screen devices, microphones, or other audio interface devices, motion sensors or the like, as well as any other device able to accept any kind of human input and in turn communicate that input to processor 107 to trigger one or more responses from the specially programmed computer.

While FIG. 1 depicts a physical device, the scope of the system may also encompass a virtual device, virtual machine or simulator embodied in one or more computer programs executing on a computer or computer system and acting or providing a computer system environment compatible with the methods and processes of this disclosure. In one or more embodiments, the system may also encompass a cloud computing system or any other system where shared resources, such as hardware, applications, data, or any other resource are made available on demand over the Internet or any other network. In one or more embodiments, the system may also encompass parallel systems, multi-processor systems, multi-core processors, and/or any combination thereof. Where a virtual machine, process, device or otherwise performs substantially similarly to that of a physical computer system, such a virtual platform will also fall within the scope of disclosure provided herein, notwithstanding the description herein of a physical system such as that in FIG. 1.

One or more embodiments are configured to enable the specially programmed computer to take the input data given and transform it into a web-based user interface (UI) by applying one or more of the methods and/or processes described herein. Thus the methods described herein are able to transform a stored component into a web UI, using the solution disclosed here to result in an output of the system as a web UI design support tool, using the specially programmed computer as described herein.

Figure 2A:
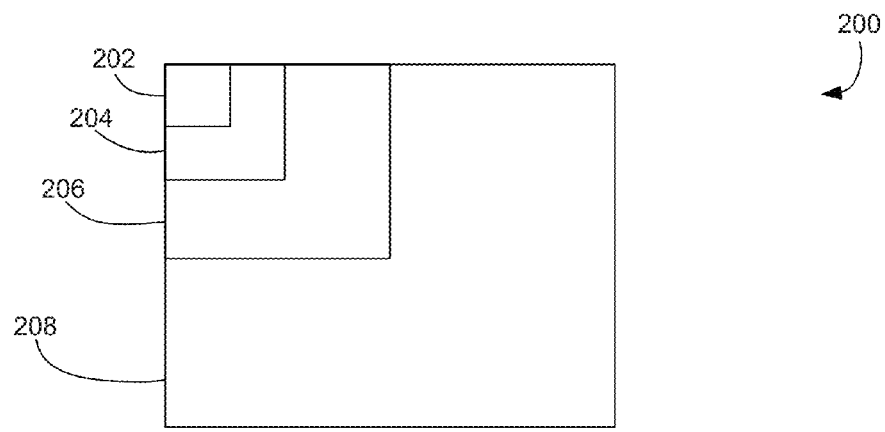
FIGS. 2A-2B illustrate exemplary wavelet-based processing of a video frame in accordance with one or more embodiments of video multi-codec encoders.
Figure 2B:
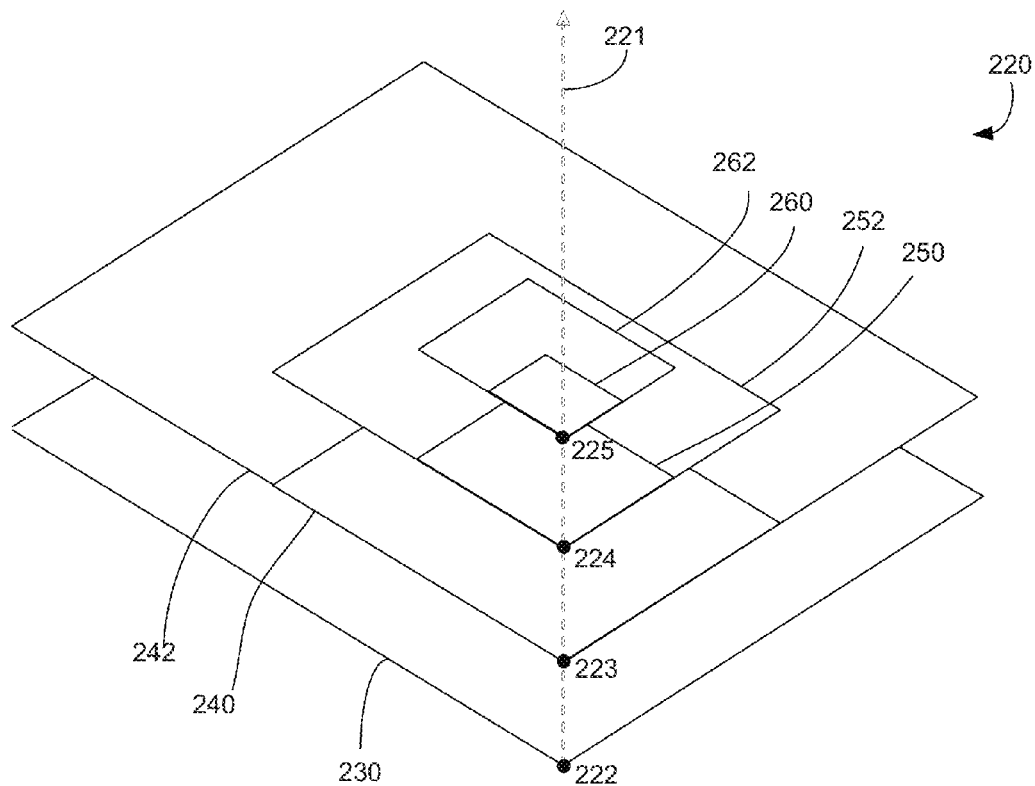

FIGS. 2A-2B illustrate exemplary wavelet-based processing of a video frame in accordance with one or more embodiments of a wavelet based codec and video multi-codec encoders. In one or more wavelet-based codecs, a wavelet transform (WT) is applied to a video frame to generate preview data and support data. The WT is applied iteratively to each successive preview to generate the next level of preview data and support data. The original video frame is the level 0 preview data. The encoded video includes the highest-level preview data together with support data from each level.

The decoding process begins with the highest-level preview data and the highest level support data. The IWT is applied iteratively to the level n preview data and the level n support data to generate the level n−1 preview data until the approximation of the original image is created. Without preview data to start with, only an extremely poor image could be produced. Although the WT and the IWT may be performed in a lossless manner, the WT may be configured to concentrate essential data in preview data such that support data may be more highly compressed while minimizing negative effects on perceived video quality in decoded data.

For example, applying the WT may involve combining two filter operations. One filter is a low pass filter, the other a high pass filter. Each filter is applied in both the horizontal direction of the image and in the vertical direction of the image. The preview results from applying the low pass filter in both horizontal and vertical directions. The relative position of the four quadrants is arbitrary, but in those depictions, the quadrants are placed adjacent to the preview result from applying the low pass filter in one direction and the high pass filter in the other direction, while the quadrant placed diagonally opposite the preview results from applying the high pass filter in both directions.

FIG. 2A illustrates a representation of exemplary data required to decode a video frame using the IWT. Although FIG. 2A shows the IWT data 200 required to decode a video frame after encoding as involving three iterations of the WT, one of ordinary skill in the art will recognize that the number of iterations can be varied without departing from the spirit or the scope of the invention.

IWT data 200 includes level 1 support data 208 generated by applying the WT on the level 0 preview data (e.g., the video frame). IWT data 200 further includes level 2 support data 206 generated by applying the WT on the level 1 preview data. IWT data 200 further includes level 3 support data 204 generated by applying the WT on the level 2 preview data. IWT data 200 further includes level 3 preview data 202, also generated by applying the WT on the level 2 preview data. In exemplary IWT data 200, level 3 preview data 202 is the highest level preview data generated by applying the WT iteratively by a video encoder.

In one or more embodiments, the video encoder uses lossy compression on at least a portion of IWT data 200.

FIG. 2B illustrates the generation of support data in preview data over multiple iterations of applying the WT. Although three iterations of the WT are shown, one of ordinary skill in the art will recognize that the number of iterations can be varied without departing from the spirit or the scope of the invention.

Iterative process 220 illustrates data generated by applying the WT at steps 222-225, where direction 221 shows the order of operation. At step 222, input data is obtained. The input data corresponds to the level 0 preview data 230 (e.g., the video frame). At step 223, after a first WT is applied to the level 0 preview data 230, level 1 preview data 240 and level 1 support data 242 is generated. At step 224, after a second WT is applied to the level 1 preview data 240, level 2 preview data 250 and level 2 support data 252 is generated. At step 225, after a third WT is applied to the level 2 preview data 250, level 3 preview data 260 and level 3 support data 262 is generated. In exemplary iterative process 220, level 3 preview data 260 is the highest level preview data generated by applying the WT iteratively.

Figure 3A:
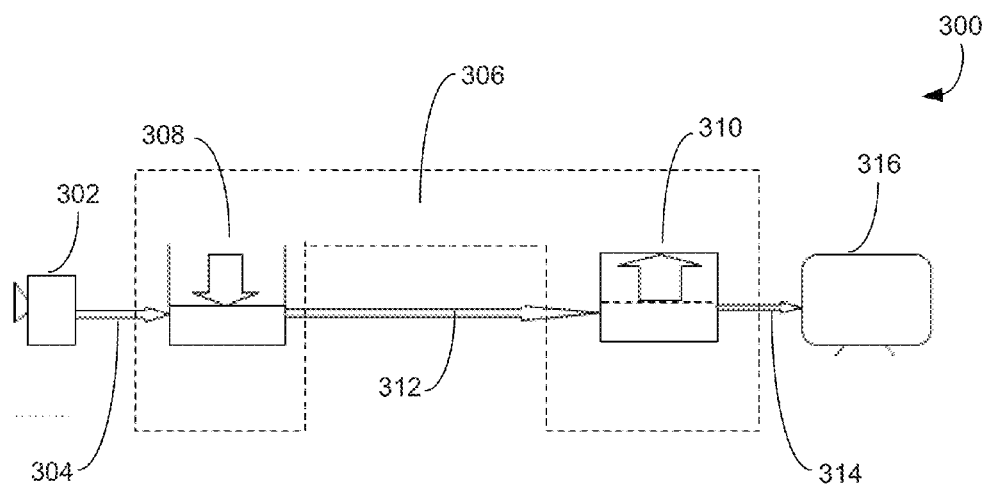
FIGS. 3A-3B illustrate exemplary codec operation in accordance with one or more embodiments of video multi-codec encoders.
Figure 3B:
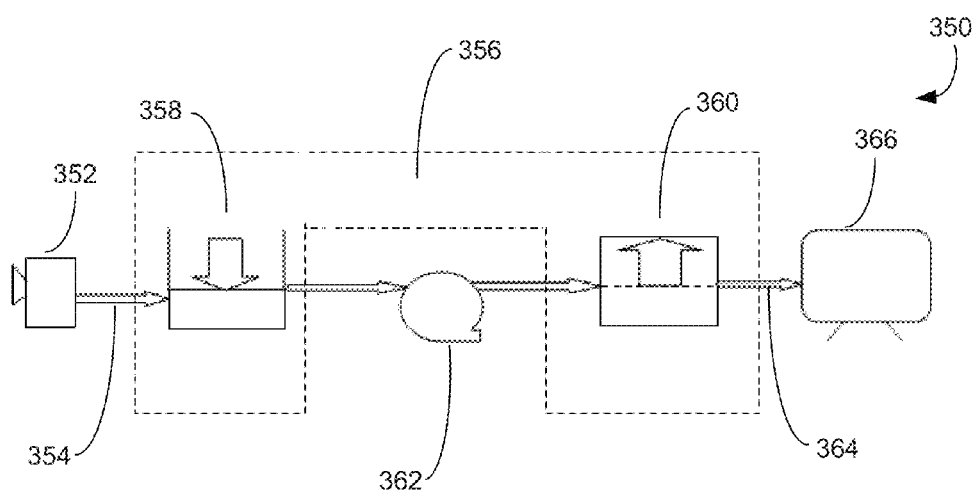

FIGS. 3A-3B illustrate exemplary codec operation in accordance with one or more embodiments of video multi-codec encoders.

FIG. 3A illustrates a system overview of exemplary codec operation for providing a video stream. In codec system 300, digitized video on path 304 is obtained from a video source 302. Video source 302 may be, for example, digital video stored on any computer-readable medium, such as any magnetic disk, card, tape, drum, optical disk, flash memory, any other medium capable of storing digital data, or any combination thereof. Video source 302 may also be a video recording device. In one or more embodiments, digitized video on path 304 is configured for 2-D, stereo, or 3-D display. Digitized video on path 304 serves as the input for video codec 306. Video codec 306 includes video encoder 308 and video decoder 310. Digital video on path 304 is encoded by video encoder 308 and transmitted as an encoded video data stream on path 312. Encoded video data stream on path 312 may be transmitted over any circuit, communication medium, or network, including a cable network, a wired network, a wireless network, a fiber optic network, any computer network including a local access network (LAN), a wide area network (WAN), any other wired or wireless network, the Internet, any other digital network, or any combination thereof. Video decoder 310 is configured to receive and decode encoded video data stream on path 312 to produce and convey decoded video data on path 314. In one or more embodiments, decoded video data on path 314 is a video stream. Decoded video data on path 314 may conform to any video standard for video display, including any existing, future, or proprietary standard. Decoded video data on path 314 may be any video stream displayable on any video display device 316, such as a projector, a television set, a monitor, any other LCD screen, any other 2-D or other 3-D display, a mobile device, a cellular device, a Smartphone, a computer, a laptop, or any other device capable of displaying decoded video data on path 314.

FIG. 3B illustrates a system overview of exemplary codec operation for providing a video stream. In codec system 350, digitized video on path 354 is obtained from a video source 352. Video source 352 may be, for example, digital video stored on any computer-readable medium, such as any magnetic disk, card, tape, drum, optical disk, flash memory, any other medium capable of storing digital data, or any combination thereof. Video source 352 may also be a video recording device. In one or more embodiments, digitized video on path 354 is configured for 2-D or 3-D display. Digitized video on path 354 serves as the input for video codec 356. Video codec 356 includes video encoder 358 and video decoder 360. Digital video on path 354 is encoded by video encoder 358, transmitted or otherwise communicated as encoded video data, and placed on storage media 362. Storage media 362 may include any magnetic disk, card, tape, drum, optical disk, flash memory, any other medium capable of storing digital data, or any combination thereof. Video decoder 360 is configured to decode the encoded data that is stored on storage media 362 to produce and convey decoded video data on path 364. In one or more embodiments, decoded video data on path 364 is a video stream. Decoded video data on path 364 may conform to any video standard for video display, including any existing, future, or proprietary standard. Decoded video data on path 364 may be displayed on video display device 366, such as a projector, a television set, a monitor, any other LCD screen, any other 2-D or other 3-D display, a mobile device, a cellular device, a Smartphone, a computer, a laptop, or any other device capable of displaying decoded video data on path 364.

One or more embodiments of video multi-codec encoders are configured to process video frames to significantly improve the features, performance, or output quality of a codec without significantly degrading other desirable features, performance, or output qualities. The processing includes the use of additional steps in conjunction with a Z codec system to generate improved Z-encoded video data. The additional steps include the use of at least partial Y codec functionality, where Y is any other codec. In one or more embodiments, the additional steps include the use of wavelet-based codec functionality.

One or more embodiments of video multi-codec encoders are configured to process video frames by multiple codecs, each of which generates an encoded semblance of the same frame. The processing includes the use of additional steps that allocate frame data to individual encoders for processing. One or more of the multiple codecs may be wavelet based.

In one or more embodiments, wavelet-based codec functionality is used to generate a processed product as input to a codec Z subsystem, where the Z encoder may be an H.264 encoder or to any other video encoder. The processed input may include a wavelet preview, a further processed wavelet preview, or any other highly compressed or feature enhanced or quality enhanced manifestation of the original video input data. The wavelet-based codec may be tailored to improve visual quality, improve compression, increase security, facilitate codec format adaptation and/or for any other purpose.

Interacting Encoders

An interacting encoder may engender superior features and/or viewing quality than ordinarily possible for a simple encoder by using one or more subsystems of the auxiliary codec not available to the output codec. As a result, the encoded video product of an interacting encoder may be nontrivially specialized, simplified, optimized, or otherwise tailored to generate an encoded product with enhanced or additional features not available to that of a simple encoder.

FIG. 8 illustrates exemplary systems for a Y-to-Z encoder in accordance with one or more embodiments of interacting video encoders. System 800 may be implemented in any hardware, firmware, or software system or any combination thereof.

System 800 includes Y-to-Z encoder 802. Y-to-Z encoder 802 may be any video encoding system that accepts video frame input data, applies at least one subsystem of codec Y in the process of generating Z-encoded video, and outputs a Z-encoded video product.

Y-to-Z encoder 802 may be a W-to-Z encoder including a W subsystem configured to develop a Z-encoded product using the functionality of wavelet-based video codec W. In one or more embodiments, W is a wavelet and channel-based high definition video codec. In one or more embodiments, Z is any H.264 codec, MPEG-2 codec, MPEG-4 codec, WebM, H.265, or any other DCT-based codec. In one or more embodiments, Y is any DCT-based codec. In one or more embodiments, Y is any H.264 codec, MPEG-2 codec, MPEG-4 codec, WebM, H.265, or any other DCT codec. In one or more embodiments, Z is any wavelet-based codec. In one or more embodiments, Z is a wavelet and channel-based high definition video codec.

Y-to-Z encoder 802 includes one or more subsystems of codec Y subsystems 804 of a Y codec. The use of one or more subsystems of codec Y may provide enhancements and processes that permit desired interactions between codec Y subsystems and codec Z subsystems or otherwise contribute to the desired Z-encoded video product. Y-to-Z encoder 802 also includes codec Z subsystems 808. Codec Z subsystems 808 include encoder subsystem 806. In one or more embodiments, codec Z subsystems 808 also include one or more additional subsystems of the Z codec. If Y-to-Z encoder 802 is a basic Y-to-Z encoder, then codec Y subsystems 804 is configured to accept video frame data from video frame data input path 810. Input path 810 conveys video frame data to one or both of codec Y subsystems 804 and codec Z subsystems 808. Video input data includes but is not limited to raw video frame data, mezzanine video frame data, decoded video, or decoded compressed video data. The final output of codec Z subsystems 808 is Z-encoded video data. Z-encoded video data includes at least one Z-encoded video frame. Z-encoded video data is conveyed on output path 812 and may be transmitted or stored as Z-encoded video. In one or more embodiments, Z-encoded video data is any video data that can be decoded by a Z decoder.

In one or more embodiments, the final output of codec Y subsystems 804 is Y-encoded video data conveyed on optional Y-encoded data output path 814, in which case subsystems 804 may include a simple Y encoder or system 800 may be both a Y-to-Z encoder and a Z-to-Y encoder. If system 800 outputs both Y-encoded video data and Z-encoded video data, then these two encoded video data streams may be uncoordinated or may be synchronized by timing and other signals not shown in FIG. 8.

Input path 810 carries video frame data into Y-to-Z encoder 802. Output path 812 carries Z-encoded video data. In one or more embodiments, optional Y-encoded data output path 814 conveys Y-encoded video data. YZ handoff path 820 carries YZ handoff data from codec Y subsystems 804 to codec Z subsystems 808. In one or more embodiments, optional ZY handoff path 818 carries ZY handoff data from codec Z subsystems 808 to codec Y subsystems 804. In one or more embodiments, optional ZY handoff path 822 conveys a ZY handoff product from codec Z subsystems 808 to codec Y subsystems 804. Arrow 816 represents the sequencing of handoffs over any number or combination of additional paths that may be present in Y-to-Z encoder 802, carrying YZ handoff data from codec Y subsystems 804 to codec Z subsystem set 808 and/or ZY handoff data from codec Z subsystems 808 to codec Y subsystems 804.

If Y-to-Z encoder 802 is a basic Y-to-Z encoder, then for at least one video frame from input path 810, input frame data is first processed by codec Y subsystems 804, and a YZ handoff product is prepared for handoff path 820 from codec Y subsystems 804 to codec Z subsystems 808. The handoff product includes video image data suitable for codec Z subsystems 808 to process and output Z-encoded video data on path 812. In one or more embodiments, YZ handoff path 820 is the only handoff path required for a basic Y-to-Z encoder. Optional handoff paths 818 and 822 and handoff paths represented by horizontal dashed arrow 816 are not present. In one or more embodiments, YZ handoff path 820 carries all handoff data from codec Y subsystems 804 to codec Z subsystems 808. Handoff data includes video image data, instructions and control data, and any other data usable by codec Z subsystems to encode video data.

If Y-to-Z encoder 802 is not a basic Y-to-Z encoder, then many other possibilities exist. Paths represented by 816-822 symbolize any ordered sequence of data handoffs back and forth between codec Y subsystems and codec Z subsystems in the course of processing video data. Each path may represent the transfer of image data, control data, process instructions, or other data. Because Y-to-Z encoder 802 is not a basic Y-to-Z encoder, at least one video frame may require processing involving codec Z subsystems 808 followed by processing involving codec Y subsystems 804. This pair of required data transfers may then be represented by paths 818-820. In one or more embodiments, there may be many additional data transfers between codec Y subsystems 804 and codec Z subsystems 808, as represented by dashed arrow 816. Each path represented by arrows 816 and paths 818-822 conveys a handoff product that may variously represent video image data, Y or Z-encoded data (for example, wavelet preview and/or support data), partially encoded data, process instructions, control data, any other video data, or any combination thereof. The data transferred on various paths may differ in kind from one path to another and from one instance to another.

In one or more embodiments, a control input of Y-to-Z encoder 802 instructs at least one subsystem of codec Y subsystems 804 and codec Z subsystems 808 regarding the amount of compression (or, equivalently, the video bit rate) desired, or any other quantifiable feature of an intermediate product of codec Y subsystems 804 or codec Z subsystems 808 or any final video product, such as Y-encoded video data on optional output path 814 and Z-encoded video data on output path 812. A control parameter may include one or more parameters, variables, configuration files, user inputs, or any other inputs capable of instructing at least one subsystem of codec Y subsystems 804 and codec Z subsystems 808 as described.

A control input may control at least one of a codec Y subsystem and a codec Z subsystem to monitor and affect the amount of compression or, equivalently, the video bit rate desired as output from codec Z subsystem. A control input may control at least one of a codec Y subsystem and a codec Z subsystem to affect resolution and/or scalability of the Z-encoded video product. A control input may control at least one of a codec Y subsystem and a codec Z subsystem to affect blocking. A control input may control at least one of a codec Y subsystem and a codec Z subsystem to affect channel characteristics such as luminance and chroma encoding. A control input may control at least one of a codec Y subsystem and a codec Z subsystem to affect resizing. A control input may control at least one of a codec Y subsystem and a codec Z subsystem to affect geolocation sensitivity. A control input may control at least one of a codec Y subsystem and a codec Z subsystem to impart video content protection and/or encryption.

In one or more embodiments of Y-to-Z encoder 802, transfers of data (e.g. between codec Y subsystems 804 and codec Z subsystems 808) may be repeated until a condition is met. Examples of this include but are not limited to: achieving a compression requirement, achieving a quality requirement, satisfying a maximum blocking requirement, satisfying an edge preservation or enhancement requirement, satisfying a combination of requirements, and any other condition.

One or more embodiments of Y-to-Z encoder 802 outputs Y-encoded video data on path 814. This Y-encoded video data includes at least one Y-encoded video frame. One or more embodiments of Y-to-Z encoder 802 convey Z-encoded video data on output path 812. Z-encoded video data on output path 812 includes at least one Z-encoded video frame.

Y-encoded video data on output path 814 and Z-encoded video data on output path 812 may include timing or synchronization data that enable Y and Z decoders to synchronize their video outputs or even interleave their outputs, or for 3-D applications or for any other purpose. Synchronization and timing data exchanges between subsystems of codec Y subsystems 804 and codec Z subsystems 808 are not shown and do not prevent Y-to-Z encoder 802 from being a basic Y-to-Z encoder. Z-encoded video data on output path 812 and/or Y-encoded video data on output path 814 may be generated independently, concurrently, sequentially, in synchrony, or in any other interrelationship and implemented on any combination of software, firmware, and hardware.

In one or more embodiments, Y-to-Z encoder 802 is a W-to-Z encoder configured to enhance Z-encoded video data using W-based video processing, where the W-to-Z encoder is configurable to produce Z-encoded video data on output path 812 and, optionally, W-encoded video data on output path 814. The Z-encoded video data and/or W-encoded video data may be generated independently, concurrently, sequentially, in synchrony, or in any other interrelationship or software or hardware implementation.

In one or more embodiments, Y-to-Z encoder 802 is a Y-to-W encoder, where Y is a wavelet-based codec, a DCT-based codec a fractal-based codec, or any other kind of video codec and the Y-to-W encoder is configured to enhance W-encoded video data and where the Y-to-W encoder is configurable to produce W-encoded video data on output path 812 and, optionally, Y-encoded video data on output path 814. The W-encoded video data and/or Y-encoded video data may be generated independently, concurrently, sequentially, in synchrony, or in any other interrelationship or software or hardware implementation.

In one or more embodiments of Y-to-Z encoder 802, a sequence of input video frames on input path 810 may be processed collectively prior to final encoding.

In one or more embodiments, system 800 may include any partial or complete hardware, firmware, or software implementation of any W encoder, W decoder, Y-to-Z encoder, W-to-Z encoder, or Y-to-W encoder, whether in single chip, multichip, or other device. The single chip, multichip, or other device may be provided in a TV set, set-top box, or any other equipment for home entertainment, public entertainment industry use, business use, medical use, or any other purpose.

In one or more embodiments of a Y-to-Z encoder, a product of a codec Y subsystem and a product of a codec Z subsystem are compared, added, differenced, or otherwise subjected to a process found in a codec Y subsystem, a process found in a codec Z subsystem, or an enhancement incorporated by a handoff from codec Y subsystems 804 to codec Z subsystems 808.

FIGS. 9A-9D illustrate exemplary architectures in accordance with one or more embodiments of interacting video encoders. These non-limiting figures are intended to provide exemplary embodiments of the variety of system architectures compatible with interacting video encoders described herein.

Figure 9A:
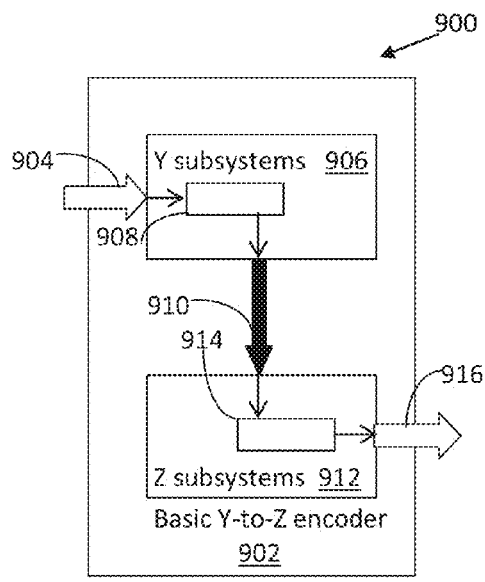
FIGS. 9A-9D illustrate exemplary architectures in accordance with one or more embodiments of interacting video encoders.

The simplest Y-to-Z encoder architecture is the basic Y-to-Z encoder architecture shown in FIG. 9A. System architecture 900 includes basic Y-to-Z encoder 902. Basic Y-to-Z encoder 902 includes codec Y subsystems 906 and codec Z subsystems 912. Codec Y subsystems 906 include subsystem 908 that is configured to process and modify video frame data. In one or more embodiments, subsystem 908 is configured to Y encode input video data from path 904, further process, and Y decode video image data from input path 904, and/or incorporate control signals and other processing signals that affect later processing by codec Z subsystems 912, or apply any other partial functionality of a Y codec. Codec Z subsystems 912 include codec Z subsystem 914. Codec Z subsystem 914 is configured to process video and other data and produce Z-encoded video data.

Input video frame data on path 904 is first conveyed to subsystem 908 of codec Y subsystems 906. Input video frame data is processed by subsystem 908. Video image data and possibly other data required to modify the final Z-encoded video data product are handed off from codec Y subsystems 906 over YZ handoff path 910 to codec Z subsystems 912. All video image data and other data needed by codec Z subsystem 914 are included in the handoff product conveyed to codec Z subsystems 912. Codec Z subsystems 914 accordingly complete the processing of input video frame data introduced on input path 904 and output Z-encoded data on output path 916.

Figure 9B:
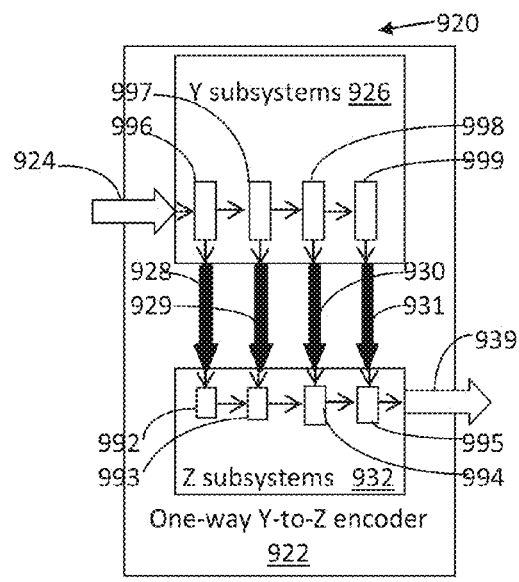

FIG. 9B illustrates an exemplary one-way Y-to-Z encoder architecture. In this example, video input data 924 is progressively processed by codec Y subsystems 996-999 of codec Y subsystems 926. Although four codec Y subsystems are shown in exemplary system architecture 920, one of ordinary skill in the art would recognize that any number of codec Y subsystems may be implemented without departing from the spirit and scope of the invention. At each of four points in the processing sequence associated with codec Y subsystems 996-999, a handoff product is conveyed across a YZ handoff path 928-931 to codec Z subsystems 992-995 and becomes part of the cumulative video processing occurring in codec Z subsystems 932. At a final stage of Z-processing by codec Z subsystems 932, data required for Z encoding is collected from subsystems 992-994 of codec Z subsystems 932 and the final codec Y subsystem handoff product is conveyed over path 931 and contributes to the Z-encoded data output on path 939.

System architecture 920 includes one way Y-to-Z encoder 922. One-way Y-to-Z encoder 922 includes codec Y subsystems 926, codec Z subsystems 932, frame data input path 924 and encoded data output path 939. Codec Y subsystems 926 include subsystems 996-999, and codec Z subsystems 932 include subsystems 992-995.

In this example, codec Y subsystems 996-999 process input video data from path 924 sequentially. In one or more embodiments, at least one of codec Y subsystems 996-999 itself contains two or more codec Y subsystems. On completion of processing, each of codec Y subsystems 996-999 transmits a handoff product on handoff paths 928-931, respectively, to codec Z subsystems 992-995 for further processing.

Subsystem 996 of codec Y subsystems 926 transmits its handoff product over handoff path 928 to the first involved codec Z subsystem, subsystem 992 in codec Z subsystems 932. Subsystem 992 further processes the handoff product from handoff path 928 and sends the resulting data to subsystem 993 of codec Z subsystems 932. Separately, subsystem 996 of codec Y subsystems 926 completes its processing and sends the processed data to subsystem 997 for further processing.

Codec Y subsystem 997 processes this data and creates a second handoff product conveyed over YZ handoff path 929 which, along with the output from codec Z subsystem 992 of codec Z subsystems 932, is further processed in codec Z subsystem 993. Codec Y subsystem 997 completes its processing and sends data on to codec Y subsystem 998.

Codec Y subsystem 998 sends its handoff product over YZ handoff path 930 to codec Z subsystem 994. This data, together with the output of codec Z subsystem 993 is further processed in the subsystem 994. Codec Y subsystem 998 completes its processing and sends the resulting data to the final codec Y subsystem, subsystem 999.

Codec Y subsystem 999 processes the data into its handoff product, which is conveyed over YZ handoff path 931 to final codec Z subsystem 995. This data, together with the output of codec Z subsystem 994, are processed by codec Z subsystem 995 for final Z encoding. One-way Y-to-Z encoder 922 outputs the resulting Z-encoded data over output path 939.

One of ordinary skill can discern numerous variants, extensions, and simplifications of FIG. 9B, each of which would constitute a Y-to-Z encoder. These variants include but are not limited to: any system architectures with two or more subsystems of codec Y feeding two or more subsystems of codec Z; simplifications of the architectures in which two or more of the codec Y subsystems of codec Y are combined into a single subsystem of codec Y; handoff products from subsystems of codec Y that are permuted before being input to subsystems of codec Z; two or more subsystems of codec Z that are combined into a single subsystem of codec Z; or any other variant. It will also be recognized by one of ordinary skill that Y-encoded video data may be generated by codec Y subsystems and output from codec Y subsystems (for example, as suggested in FIG. 8).

FIG. 9B illustrates that there is a wide variety of non-trivial variant system architectures, even for Y-to-Z encoders with no ZY handoffs. While FIGS. 9A and 9B illustrate one or more embodiments of Y-to-Z encoders with no ZY handoffs, one of ordinary skill in the art will recognize that there is a host of other architectures for one-way Y-to-Z encoders.

Figure 9C:
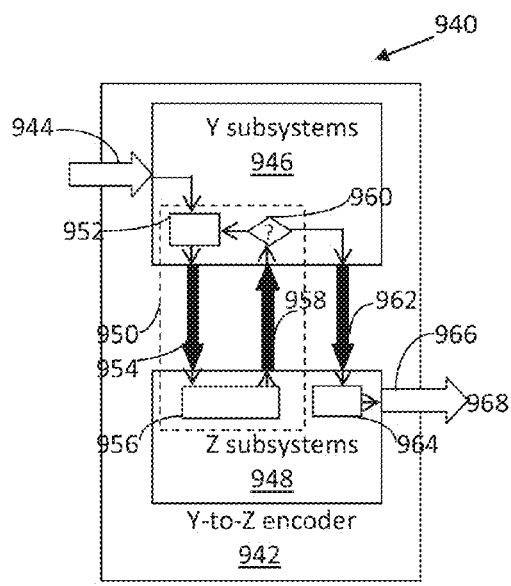

FIG. 9C illustrates an exemplary Y-to-Z encoder that involves ZY handoffs and includes iterative exchange of data between Y and codec Z subsystems. In one or more embodiments, codec Y subsystem processes may be invoked an unspecified number of times in the course of developing the output (e.g., Z-encoded data). System architecture 940 includes Y-to-Z encoder 942. Y-to-Z encoder 942 includes codec Y subsystems 946, codec Z subsystems 948, control loop subsystem 950, frame data input path 944, and encoded data output path 966. Codec Y subsystems 946 include control loop 950, which is a DO-UNTIL style iterated control loop involving subsystem 952 and subsystem 960 of codec Y, and subsystem 956 of codec Z.

Codec Y subsystems 946 include subsystems 952 and 960. Subsystem 952 is configured to process video frame data and compute data that improves Z processing in some measurable way. Subsystem 960 is configured to process ZY handoff data to determine whether Z processing has achieved some measurable goal.

Codec Z subsystems 948 include subsystem 956 and 964. Subsystem 956 is configured to process YZ handoff data as instructed and generate a test product. Subsystem 964 is configured to perform further processing on ZY handoff data and output Z-encoded video data.

Codec Y subsystems 946 accept input video frame data on input path 944. Input video frame data from input path 944 is first processed by subsystem 952, and a first handoff product is transmitted over YZ handoff path 954 to subsystem 956 of codec Z subsystems 948. The first handoff product transmitted over YZ handoff path 954 is processed by subsystem 956, which develops a second handoff product that is returned to codec Y subsystems 946 over ZY handoff path 958. The second handoff product transmitted over ZY handoff path 958 includes data that is tested against one or more criteria by subsystem 960. If these criteria (and possibly other criteria, such as a limit on the number of iterations) are not yet met, the data is reprocessed by subsystem 952 and another handoff product is developed for transmission to subsystem 956 over YZ handoff path 954. This sequence of processes is repeated until subsystem 960 determines that the target criteria are met or otherwise terminate the iteration. When the termination criteria are met, codec Y subsystem 960 develops a final handoff product and sends it over YZ handoff path 962 to subsystem 964 of codec Z. The final YZ handoff product includes video data required for Z encoding. Subsystem 964 of codec Z encodes this video data and conveys Z-encoded data on output path 968.

One skilled in the art will recognize numerous variants and extensions of this Y-to-Z encoder architecture in which a conditional loop spans codec Y and codec Z subsystems as part of the overall Y-to-Z encoder architecture. For example, almost any combination of a Y-to-Z encoder architecture like that of FIG. 9B or its variants with a conditional subsystem like subsystem 950 of FIG. 9C or any of its variants would constitute a Y-to-Z encoder.

Figure 9D:
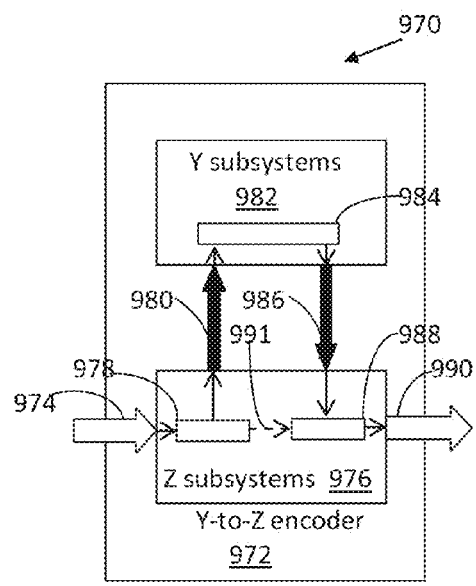

FIG. 9D illustrates an exemplary Y-to-Z encoder architecture configured to process video data by codec Z subsystems before any involvement with codec Y subsystems. Thus, input video data to a Y-to-Z encoder might not enter a codec Y subsystem prior to some Z processing. This exemplary architecture highlights the fact that the entrance point for input video data to a Y-to-Z encoder may be almost anywhere in the Y-to-Z encoder system.

System architecture 970 includes Y-to-Z encoder 972. Y-to-Z encoder 972 includes codec Z subsystems 976, codec Y subsystems 982, video frame data input path 974, and encoded data path 990. Codec Z subsystems 986 include at least one of subsystems 978 and 988. Codec Y subsystems 982 include at least one subsystem 984.

Input video frame data is conveyed over input path 974 enters Y-to-Z encoder 972. Input video data is first processed by subsystem 978 of codec Z subsystems 976. Codec Z subsystem 978 creates a handoff product conveyed over ZY handoff path 980 and sent to codec Y subsystem 984. Codec Y subsystem 984 further processes the handoff product conveyed over ZY handoff path 980 and develops handoff product for delivery over YZ handoff path 986 to subsystem 988 of codec Z. In one or more embodiments, subsystem 988 is a Z encoder. Codec Z subsystem 988 processes this handoff product from handoff path 986 and creates Z-encoded video data that is conveyed on output path 990.

As described, for Y-to-Z encoder 972 to produce Z-encoded video data output on path 990, large amounts of video data must be carried through the entire process presented above. At every point, adequate video data must be present in order for the video to ultimately be encoded. One or more embodiments of system architecture 970 include optional path 991. In that case, nearly all video data may be passed from Z-subsystem 978 along path 991 to Z-subsystem 988.

In one or more embodiments, only a small amount of data, such as control signals or a measurement data, is sent to subsystem 984 over ZY handoff path 980. Based on a limited amount of data handed off by codec Z subsystem 978 to codec Y subsystem 984, the final data entering codec Z subsystem 988 may include instructions from codec Y subsystem 984 that causes codec Z subsystem 988 to encode a higher quality video product. This example illustrates how a slight change in the architecture of a Y-to-Z encoder can substantially improve its performance, its efficiency, or even its practicality.

Again, one skilled in the art would recognize that numerous variants, iterations, combinations, and extensions of architectures suggested in FIGS. 9A through 9D can be defined and applied to the creation of Y-to-Z encoders without departing from the spirit and intended scope of this invention.

Consider now the addition to any Y-to-Z encoder of an output path from codec Y subsystems such as that of optional output path 814 for Y-encoded video data. A multi-codec encoder that includes the Y-to-Z encoder then may also include a duplex encoder (with the trivial output architecture described later).

Figure 4:
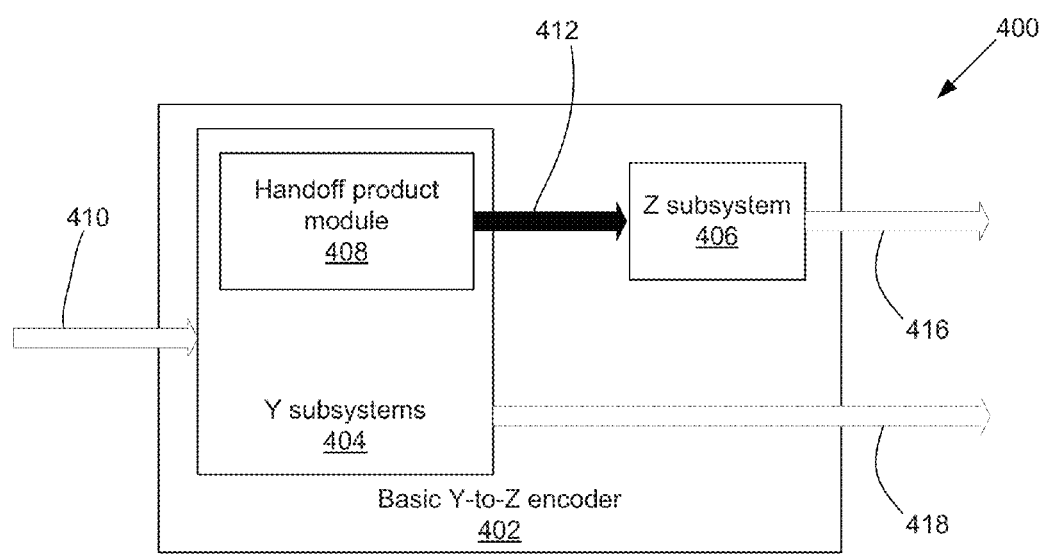
FIG. 4 illustrates exemplary systems for a basic Y-to-Z encoder in accordance with one or more embodiments of video multi-codec encoders.

FIG. 4 illustrates exemplary systems in accord with one or more embodiments of video multi-codec encoders. System 400 is an exemplary basic Y-to-Z encoder. System 400 may be implemented in any hardware, firmware, or software system, or combination thereof.

System 400 includes basic Y-to-Z encoder 402. Basic Y-to-Z encoder 402 may be any video encoding and/or decoding system including at least partial Y codec functionality and Z codec functionality, where Z is the codec of the output encoder and Y is the auxiliary codec.

Basic Y-to-Z encoder 402 may be a basic W-to-Z encoder including a W subsystem configured to provide wavelet-based video codec functionality. In one or more embodiments, W is any wavelet and channel-based high definition video codec. In one or more embodiments, Z is any discrete cosine transform (DCT)-based codec. In one or more embodiments, Z is any H.264 codec, MPEG-2 codec, MPEG-4 codec, H.265, WebM, or any high definition (HD) DCT codec. In one or more embodiments, Y is any DCT-based codec. In one or more embodiments, Y is any H.264 codec, H.265 codec, MPEG-2 codec, MPEG-4 codec, WebM, or any other DCT codec. In one or more embodiments, Z is any wavelet-based codec. In one or more embodiments, Z is any wavelet and channel-based high definition video codec.

Basic Y-to-Z encoder 402 includes codec Y subsystems 404. Codec Y subsystems 404 include at least partial Y codec functionality. Codec Y subsystems 404 include at least one codec Y subsystem. In one or more embodiments, codec Y is W codec and codec Y subsystems 404 is a W codec system configured to provide wavelet-based video codec functionality via at least one codec W subsystem.

The at least one codec Y subsystem of codec Y subsystems 404 is configured to accept input video data on input path 410 as input. Input video data may include any video frame data, including but not limited to raw video data, mezzanine video data, or previously encoded and decoded video data. In one or more embodiments, input video data on input path 410 includes at least one video frame.

Codec Y subsystems 404 include handoff product module 408. Handoff product module 408 is configured to implement data handoff including video image data. Handoff product module 408 may include at least one routine, algorithm, heuristic, or any other method for generating handoff image data. In one or more embodiments, for each video frame input to codec Y subsystems 404, handoff product module 408 generates a handoff image and passes it over handoff path 412 to codec Z subsystems 406. Codec Z subsystems 406 include at least one Z encoder. In one or more embodiments, for each video frame input to codec Y subsystems 404, at least one subsystem of codec Y subsystems 404 produces an image recognizable as the same or similar image, although possibly differing in attributes such as pixel dimensions, visual quality, or other video data attributes. This image is passed to the encoder of another image or video system, encoding system, or codec Z. The YZ handoff product on handoff path 412 includes the image data provided to a codec Z subsystem of codec Z subsystems 406 by handoff product module 408 of codec Y subsystems 404. In one or more embodiments, the handoff product may also include data used by codec Z subsystems 406 when processing the handoff image data.

In one or more embodiments, handoff product on YZ handoff path 412 may include data that result from Y processes applied to multiple video frames. In one or more embodiments, handoff product on handoff path 412 includes video image data from a plurality of video frames and/or other data accessed by codec Z subsystems 406 when processing the handoff image data. In one or more embodiments, there is not a frame-for-frame correspondence between input video frames and individual handoff products. In one or more embodiments, taken together, the handoff products include, for each input video frame, handoff data sufficient to reconstruct a semblance of that video frame.

In one or more embodiments, the handoff product on YZ handoff path 412 includes a level k preview generated in part by performing one or more WTs and/or IWTs using Y codec functionality, where Y is a wavelet-based codec.

In one or more embodiments, handoff product module 408 is configured to perform video data handoff with nontrivial involvement of at least one subsystem of codec Y subsystems 404, such that the handoff image on YZ handoff path 412 is not identical to the original video frame from video input path 410.

The handoff product on YZ handoff path 412 may be generated by codec Y subsystems 404 and handoff image module 408 to engender superior features and/or viewing quality and/or some other desirable quality than ordinarily available to codec Z. For example, the YZ handoff product may be nontrivially specialized, simplified, optimized, or otherwise tailored to produce a superior video product and features after Z-encoding and Z-decoding compared to that of a combination of a simple Z encoder and Z decoder.

Basic Y-to-Z encoder 402 further includes codec Z subsystems 406. Codec Z subsystems 406 are configured to process YZ handoff products and to generate at least one Z-encoded video frame. Codec Z subsystems 406 generate Z-encoded video data on output path 416. Z-encoded video data output on path 416 includes at least one Z-encoded video frame. Z-encoded video data on output path 416 may be transmitted or stored as Z-encoded video. Z-encoded video data may be decoded by any Z decoder.

In one or more embodiments, a control input of basic Y-to-Z encoder 402 may instruct at least one of codec Y subsystems 404 and codec Z subsystems 406 and/or their corresponding subsystems regarding the amount of compression or, equivalently, the video bit rate desired as output from codec Z subsystems 406.

In one or more embodiments, a control input controls at least one of the codec Y subsystems and the codec Z subsystems to affect resolution and/or scalability of the Z-encoded video product.

In one or more embodiments, a control input controls at least one of the codec Y subsystems and the codec Z subsystems to affect blocking. Blocking reduction may be iterated and data exchanged between Y subsystems and codec Z subsystems until blocking present in encoded Z-imagery is absent or reduced to a satisfactory minimum.

In one or more embodiments, a control input may control at least one of the codec Y subsystems and the codec Z subsystems to affect channel characteristics such as luminance and chroma encoding.

In one or more embodiments, a control input may control at least one of the codec Y subsystems and the codec Z subsystems to affect resizing.

In one or more embodiments, a control input may control at least one of the codec Y subsystems and the codec Z subsystem to affect geolocation sensitivity.

In one or more embodiments, a control input may control at least one of the codec Y subsystems and the codec Z subsystems to impart video content protection and/or encryption.

In one or more embodiments, codec Y subsystems 404 are further configured to generate Y-encoded video data on output path 418. Y-encoded video data includes at least one Y-encoded video frame.

The modules of Y-to-Z encoder 402 outputs Z-encoded video data on output path 416 and, optionally, Y-encoded video data on output path 418. Z-encoded video data on output path 416 and/or Y-encoded video data on output path 418 may be generated independently, concurrently, sequentially, in synchrony, or in any other interrelationship or software or hardware implementation.

In one or more embodiments, Y-to-Z encoder 402 is a basic W-to-Z encoder configured to apply wavelet-based video encoding functionality, where the W-to-Z encoder is configurable to produce Z-encoded video data on path 416 and, optionally, W-encoded video data on path 418. The Z-encoded video data on path 416 and possibly W-encoded video data may be generated independently, concurrently, sequentially, in synchrony, or in any other interrelationship or software or hardware implementation.

One or more embodiments of interacting video encoders are configured to automatically convert interlaced video formats to same-resolution non-interlaced video formats without additional processing or loss of visual quality. In one or more embodiments, a W-to-Z encoder, W subsystems are configured to accept video input data of interlaced video with a video frame size of 1920×1080 (1080i), and handoff full video data non-interlaced 1920×1080 (1080p) high definition (HD) to codec Z subsystems 406.

System 400 may include any partial or complete hardware or firmware implementation of any Y encoder, W encoder, W decoder, basic Y-to-Z encoder, basic W-to-Z encoder, or basic Y-to-W encoder, whether in single chip, multichip, or other device. The single chip, multichip, or other device may be provided in a TV set, set-top box, or any other home entertainment equipment, or any other equipment.

Figure 5:
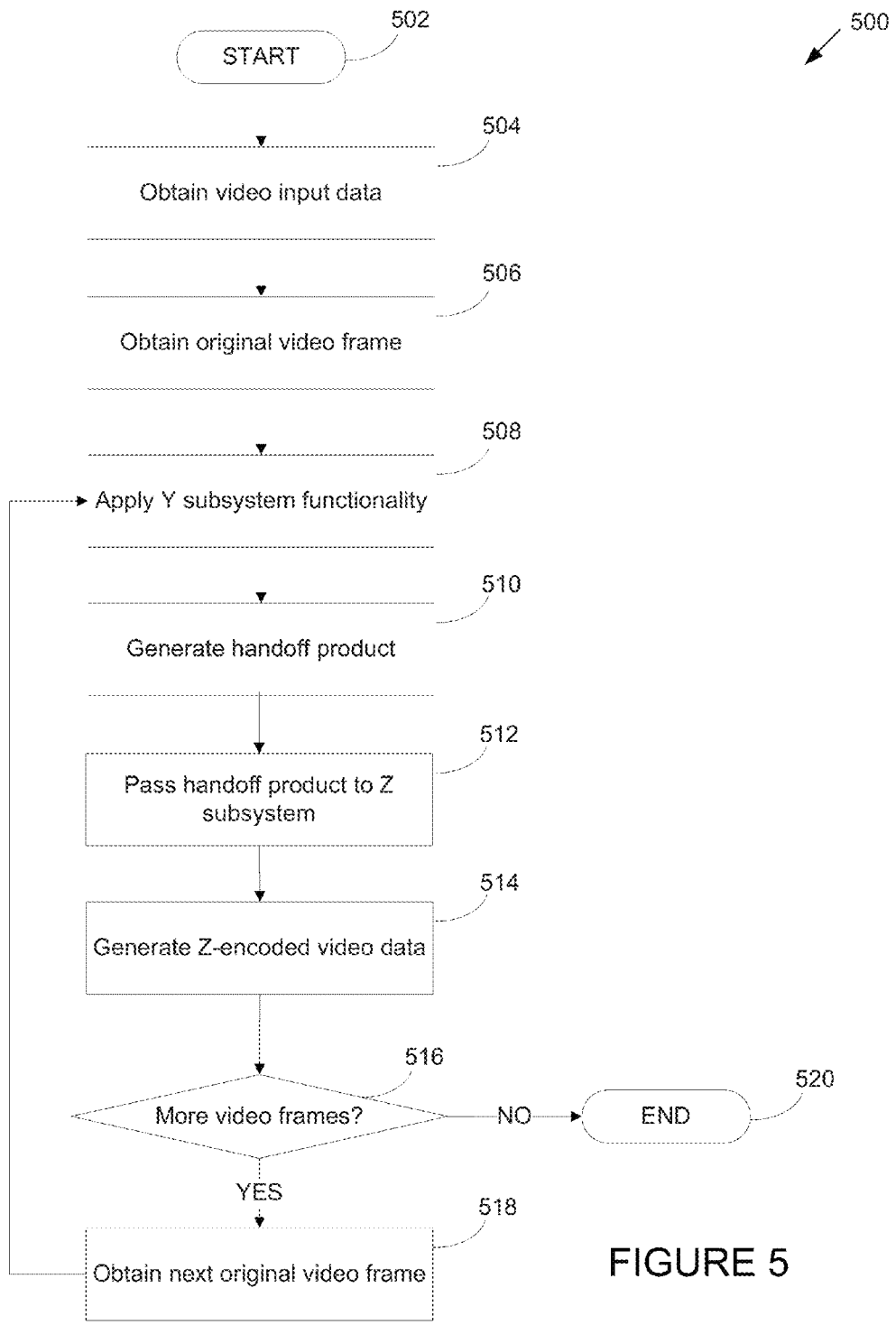
FIG. 5 is a flowchart of one or more exemplary methods for generating Z-encoded video data in a basic Y-to-Z encoder in accordance with one or more embodiments of video multi-codec encoders.

FIG. 5 is a flowchart of one or more methods for generating Z-encoded video data in a basic Y-to-Z encoder in accordance with one or more embodiments of video multi-codec encoders. In one or more embodiments, Z is any discrete cosine transform (DCT)-based codec, such as, for example, any H.264 codec. In one or more embodiments, Z is any wavelet-based codec. In one or more embodiments, Y is any wavelet-based codec. Process 500 begins at step 502.

Processing continues to step 504, where video input data is obtained. The video input data may include any video input data, including but not limited to raw video data.

Processing continues to step 506, where an original video frame of the video input data is obtained.

Processing continues to step 508, where codec Y subsystem functionality is applied to the original video frame. Codec Y subsystem functionality includes at least partial Y codec functionality.

Processing continues to step 510, where a handoff product is generated. Product handoff may be performed using at least one routine, algorithm, heuristic or any other method for generating a handoff product. In one or more embodiments, the handoff product is a level k preview generated by performing one or more WT and/or IWT using W codec functionality, where W is a wavelet-based codec. The handoff product may be nontrivially specialized, simplified, optimized, or otherwise tailored to produce a superior product and features compared to that of a simple Z encoder. Processing continues to step 512, the handoff product is passed to a codec Z subsystem. The codec Z subsystem is configured to perform at least partial Z codec functionality. In one or more embodiments, Z is any wavelet-based or discrete cosine transform (DCT)-based codec. In one or more embodiments, Z is any H.264 codec, H.265 codec, MPEG-2 codec, MPEG-4 codec, or any other HD DCT codec corresponding to the Z encoder of subsystem Z.

Processing continues to step 514, where Z-encoded video data is generated.

Processing continues to decision step 516, where it is determined whether more video frames remain to be processed from the video input data. If more video frames remain to be processed, processing continues to step 518, where the next original video frame is obtained. Processing continues to step 508, where steps 508-516 are repeated on the next original video frame.

In one or more embodiments, a control input may control at least one of the codec Y subsystem and the codec Z subsystem to monitor and affect the amount of compression or, equivalently, the video bit rate desired as output from codec Z subsystem. Z-encoded video data may be transmitted or stored as Z-encoded video that is decodable by any Z decoder.

If no more video frames remain to be processed, processing continues to step 520, where process 500 terminates.

In one or more embodiments, multiple video frames may be obtained in step 506 as a group and processed in step 508, from which one or more handoff products may be generated in step 510 and passed to the codec Z subsystem in step 512, where the generated Z-encoded data may include that of the multiple frames.

Figure 6:
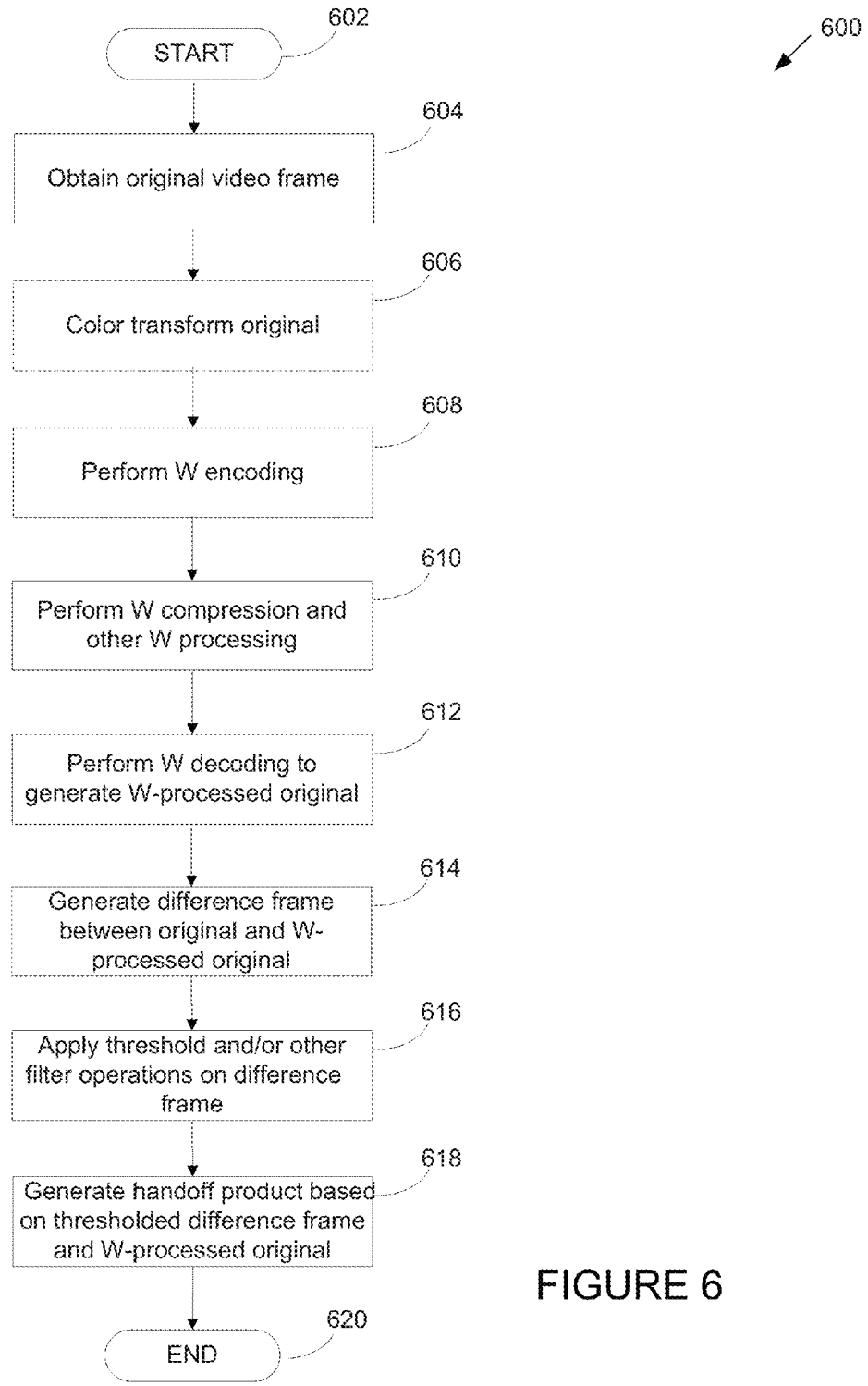
FIG. 6 is a flowchart of one or more exemplary methods for generating a handoff image readable by a Z encoder using at least partial W codec functionality in a W-to-Z encoder in accordance with one or more embodiments of video multi-codec encoders.

FIG. 6 is a flowchart of one or more methods for generating a handoff product readable by a Z encoder using at least partial W codec functionality in a W-to-Z encoder in accordance with one or more embodiments of video multi-codec encoders. In one or more embodiments, Z is any discrete cosine transform (DCT)-based codec, such as, for example, WebM or any H.264 codec. Process 600 begins at step 602.

Processing continues to step 604, where an original video frame is obtained. The video frame may be obtained from video input data. The video input data may include any frame-based video input data, including but not limited to raw video data.

Processing continues to optional step 606, where a color transform may be applied to at least one original video frame. The inclusion of applying the color transformation may depend on the requirements of the Z codec. In one or more embodiments, the Z codec is an H.264 codec, which requires video data in the YCbCr color space.

Processing continues to step 608, where W encoding is performed on the original video frame to generate a W-encoded video frame. W encoding may include at least partial W codec functionality performed in a W subsystem.

Processing continues to step 610, where W processing is performed on the W-encoded video frame. In one or more embodiments, W processing may be included the application of thresholding, substitution, and/or other data compression processes.

Processing continues to step 612, where W decoding is performed on the W-processed encoded video frame to generate a W-processed original.

Processing continues to step 614, where a difference frame is generated by taking the difference between the original video frame and the W-processed original.

Processing continues to step 616, where edge-preserving noise reduction processes are applied to the difference frame.

In one or more embodiments, a control input is accepted or otherwise obtained to monitor and/or control at least one aspect of process 600. For example, the control input may control at least one of the W subsystem and the codec Z subsystem to monitor and affect the amount of compression, or, equivalently, the video bit rate desired as output from codec Z subsystem. In one or more embodiments, a control input controls at least one of the W subsystem and the codec Z subsystem to affect resolution and/or scalability of the Z-encoded video product. In one or more embodiments, a control input controls at least one of the W subsystem and the codec Z subsystem to affect blocking. Blocking reduction may be iterated and data exchanged between W subsystems and codec Z subsystems until blocking present in encoded Z-imagery is absent or reduced to a satisfactory minimum. In one or more embodiments, a control input may control at least one of the W subsystem and the codec Z subsystem to affect channel characteristics such as luminance and chroma encoding. In one or more embodiments, a control input may control at least one of the W subsystem and the codec Z subsystem to affect resizing. In one or more embodiments, a control input may control at least one of the W subsystem and the codec Z subsystem to affect geolocation sensitivity. In one or more embodiments, a control input may control at least one of the W subsystem and the codec Z subsystem to impart video content protection and/or encryption. The control input may also be used to monitor and/or control any other aspect of process 600.

Processing continues to step 618, where a handoff product is generated based on the modified difference frame and the W-processed original. Product handoff may be performed using at least one routine, algorithm, heuristic or any other method for generating a handoff product, including but not limited to one or more of steps 606-616. In one or more embodiments, the handoff product includes a level k preview generated by performing one or more WT and/or IWT using W codec functionality. The handoff product may be nontrivially specialized, simplified, optimized, or otherwise tailored to produce a superior Z-encoded product and features compared to that of the simple Z encoder.

Processing continues to step 620, where process 600 terminates. Process 600 may be repeated on each original video frame in video input data to generate a plurality of handoff images readable by the Z encoder to generate Z-encoded video data. The Z encoder may be a codec Z subsystem configured to perform at least partial Z codec functionality. In one or more embodiments, Z is any discrete cosine transform (DCT)-based, wavelet-based, fractal-based, or other codec. In one or more embodiments, Z encoder is any H.264-standard codec, MPEG-2 encoder, MPEG-4 encoder, or any other DCT encoder. In one or more embodiments, colors may be transformed to the YCbCr color space in preparation for encoding by an H.264 codec. Z-encoded video data may be transmitted or stored as Z-encoded video that is decodable by any Z decoder.

Step 604 may be modified to read 'Obtain a sequence of video frames'. In that case, in one or more embodiments, steps 606 through 614 are understood to apply to multiple frames, and the handoff product of step 618 may include a sequence of encoded video images.

Figure 7:
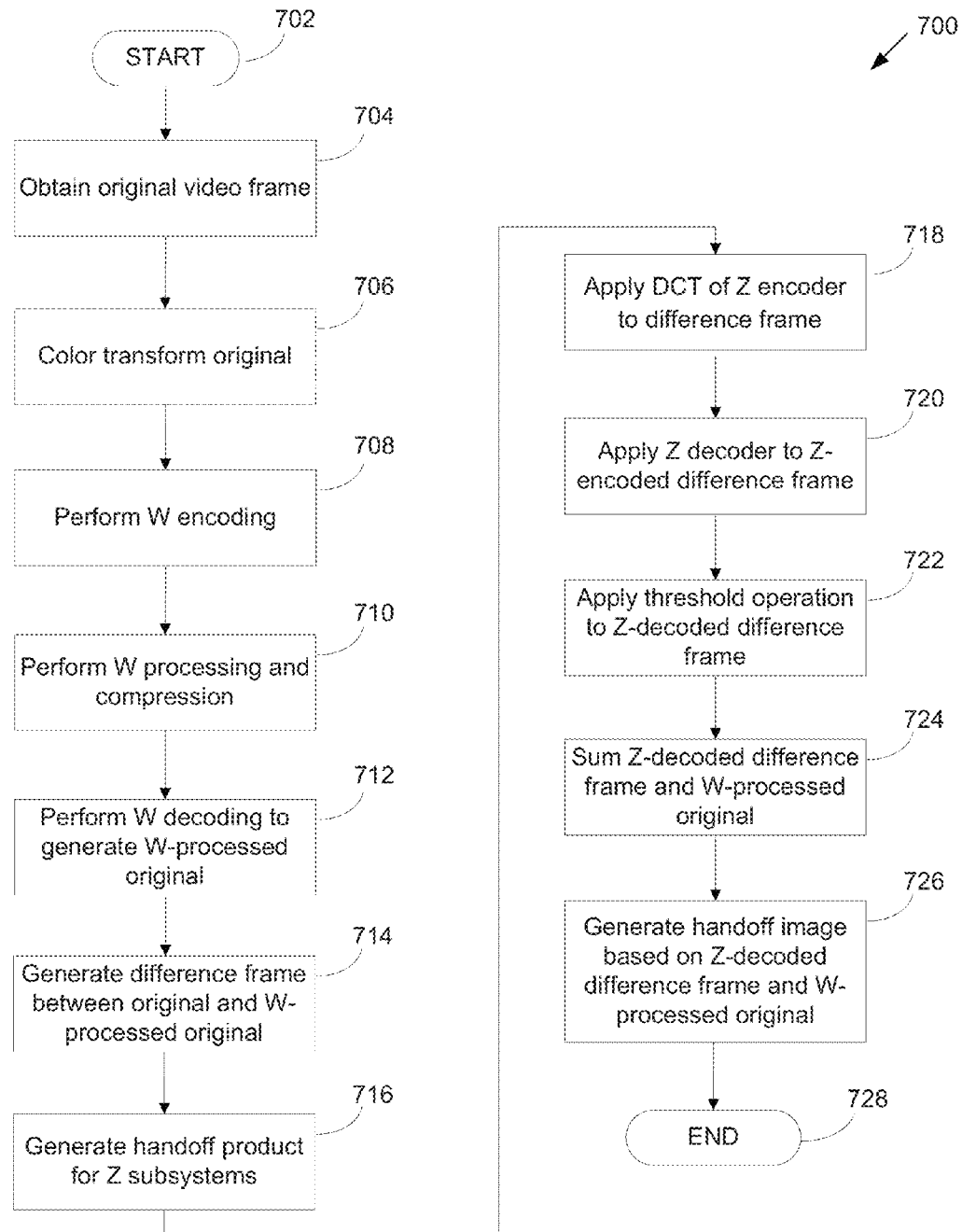
FIG. 7 is a flowchart of one or more exemplary interacting methods for generating a handoff image readable by a Z encoder using at least partial W codec functionality in a W-to-Z encoder in accordance with one or more embodiments of video multi-codec encoders.

FIG. 7 is a flowchart of one or more methods for generating a handoff product readable by a Z encoder using at least partial W codec functionality in a W-to-Z encoder in accordance with one or more embodiments of video multi-codec encoders. In one or more embodiments, the Z encoder and corresponding Z codec are any discrete cosine transform (DCT)-based encoder and corresponding codec, such as, for example, an H.264 encoder and its corresponding codec. Process 700 begins at step 702.

Processing continues to step 704, where an original video frame is obtained. The video frame may be obtained from video input data. The video input data may include any video frame-based input data, including but not limited to raw video data.

Processing continues to optional step 706, where an optional color transformation is applied to the original video frame. The inclusion of applying the color transformation may depend on the requirements of the Z codec. In one or more embodiments, the Z codec is an H.264 codec, which requires video data represented in the YCbCr color space.

Processing continues to step 708, where W encoding is performed on the original video frame to generate a W-encoded video frame. W encoding may include at least partial W codec functionality performed in a W subsystem.

Processing continues to step 710, where W processing is performed on the W-encoded video frame. In one or more embodiments, W processing may include the application of thresholding, substitution, and/or other data compression, especially high frequency compression processes.

Processing continues to step 712, where W decoding is performed on the W-encoded video frame to generate a W-processed video frame of the same size and resolution as the (possibly color transformed) original.

Processing continues to step 714, where a difference frame between the (possibly color-transformed) original video frame and the W-processed video frame is generated.

Processing continues to step 716, where a handoff product including the difference frame of step 714 is sent to codec Z subsystems for further processing.

Processing continues to step 718, where a Z encoder is applied to the difference frame to generate a Z-encoded difference frame.

Processing continues to step 720, where a Z decoder is applied to the Z-encoded difference frame to generate a Z-decoded edge-enhanced difference frame.

Processing continues to step 722, where thresholding and/or other filter operations may be applied to the Z-decoded edge-enhanced difference frame.

Processing continues to step 724, where the Z-decoded difference frame of step 722 is summed with the W-processed (possibly color-transformed) original video frame of step 712.

Processing continues to step 726, where the W-processed video frame includes a handoff product from W-subsystems to Z-subsystems. Product handoff may be performed using at least one routine, algorithm, heuristic or any other method for generating a handoff image, including but not limited to one or more of steps 706-724. In one or more embodiments, the handoff product is a level k preview generated by performing one or more WTs and/or IWTs using W codec functionality. The handoff image may be further specialized, simplified, optimized, or otherwise tailored to produce a superior product and features compared to that of the simple Z encoder.

Processing continues to step 728, where process 700 terminates. Process 700 may be repeated on each original video frame or sequence of video frames in video input data to generate a plurality of handoff images readable by a Z encoder to generate Z-encoded video data. In one or more embodiments, Z is any discrete cosine transform (DCT)-based codec. In one or more embodiments, encoder Z is any H.264 encoder, MPEG-2 encoder, MPEG-4 codec, WebM codec, or any other HD DCT codec. Z-encoded video data may be transmitted or stored as Z-encoded video that is decodable by any Z decoder.

In one or more embodiments, a control input may control at least one of the W subsystem and the codec Z subsystem to monitor and affect the amount of compression or, equivalently, the video bit rate desired as output from codec Z subsystem. In one or more embodiments, a control input may control at least one of the W subsystem and the codec Z subsystem to monitor and affect the amount of compression or, equivalently, the video bit rate desired as output from codec Z subsystem. In one or more embodiments, a control input may control at least one of the W subsystem and the codec Z subsystem to affect resolution and/or scalability of the Z-encoded video product. In one or more embodiments, a control input may control at least one of the W subsystem and the codec Z subsystem to affect blocking. In one or more embodiments, a control input may control at least one of the W subsystem and the codec Z subsystem to affect channel characteristics such as luminance and chroma encoding. In one or more embodiments, a control input may control at least one of the W subsystem and the codec Z subsystem to affect resizing. In one or more embodiments, a control input may control at least one of the W subsystem and the codec Z subsystem to affect geolocation sensitivity. In one or more embodiments, a control input may control at least one of the W subsystem and the codec Z subsystem to impart video content protection and/or encryption. The control input may also be used to monitor and/or control any other aspect of process 700.

Step 704 may be modified to read 'Obtain a sequence of video frames'. In that case, in one or more embodiments, steps 706 through 724 are understood to apply to multiple frames, and the handoff product of step 726 may include a sequence of encoded video images.

Multiplex Encoders

Multiplex encoding supports a per-frame viewing experience that can be superior to what is practical using any one, simple codec. For example, a wavelet-based codec may produce higher quality overall imagery with better color and fewer artifacts but with soft edges, while a DCT-based codec may reproduce the same frame with crisp, sharp edges but 'flat' facial features and inferior texture. The overlay or interleaving of two such semblances presents images with crisp, sharp edges, superior texture, better color, and greater color 'depth'.

An encoded output of a multiplex encoder may be that of one or more interacting encoders. For example, in one or more embodiments of a multiplex encoder, a Z-encoded output is that of a Y-to-Z encoder.

For simplicity and clarity, the discussion below is focused on duplex encoders. One of ordinary skill in the art will readily see that principles and embodiments presented here also apply to k-plex encoders for k>2 without departing from the spirit or the scope of the invention. The metes and bounds of this invention are the full generality of multi-codec encoders and all of their embodiments.

As a stream of video input frame data is processed by a multi-codec encoder and emerges as one or more encoded data streams, various kinds of processing may occur and in various orders. Understanding that in one or more embodiments, the processing varies in number, order, and kind of processes, one may exemplify the sequence of processing steps as: (a) video frame input, (b) multi-codec encoder data preparation, (c) auxiliary codec processing, (d) output codec processing, (e) multi-codec encoder output preparation. In one or more embodiments, step (b) processes are absent. In one or more embodiments, one or more step (b) processes occur in conjunction with or after one or more step (c) or step (d) processes. In one or more embodiments, one or more step (c) processes occur in conjunction with or after one or more step (d) processes. Having noted such variations, a few example architectures of duplex encoders are illustrated for step (e) processes. Although steps (a)-(e) are listed in a sequence for explanation, one of ordinary skill in the art would recognize that the steps listed may be performed concurrently and in any other order, and that the identification of steps (a)-(e) does not imply a limiting order.

For single stream video frame input, step (a) is similar to that of other encoders. Step (b), multi-encoder data preparation, includes processes applied to input video frames to condition video data in some way that enables or enhances the efficiency or results of multi-codec encoding. Steps (c) and (d), auxiliary codec processing and output codec processing, have been discussed at length. In the context of multi-codec encoders in general and duplex encoders in particular, one or more embodiments involve output codecs, each with its own set of auxiliary codecs, output codecs with one or more auxiliary codecs in common, output codecs that are members of each other's set of auxiliary codecs, and other output codecs. Step (e), multi-codec encoder output processing, merits some attention and may be implemented in various ways. A few exemplary output architectures serve to illustrate this feature of a duplex encoder and multi-codec encoders in general.

Let Y and Z be the output codecs of a duplex encoder. The function of the duplex encoder is to accept unencoded video frames, encode video frames into two data streams, Y-encoded video data and Z-encoded video data, and output these data streams such that they can stored or transmitted and later decoded into a sequence of video frames for display. In one or more embodiments, the Y-encoded video data is simple Y-encoded video data and/or the Z-encoded video data is simple Z-encoded video data. These duplex encoder data streams can be suitably output in various ways, some of which are now described.

FIG. 20A-20D illustrate exemplary step (e) multi-encoder output architectures in accordance with one or more embodiments of a duplex encoder. These non-limiting figures are intended to provide exemplary embodiments of the variety of output architectures compatible with duplex encoders described herein.

As used herein, the expression "trivial output architecture" in reference to a k-plex encoder, k>1, refers to a k-plex encoder output architecture with k unsynchronized encoded output streams.

As used herein, the expression "merged output architecture" in reference to a k-plex encoder, k>1, refers to a k-plex encoder output architecture with a single output stream of data from which each of the up to k encoded semblances can be decoded.

Figure 20A:
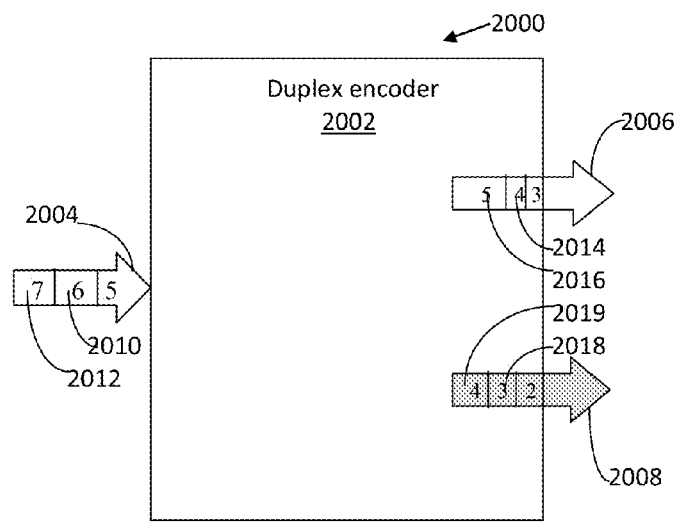
FIGS. 20A-20D illustrates exemplary duplex encoder output architectures in accordance with one or more embodiments of video multi-codec encoders.
Figure 20B:
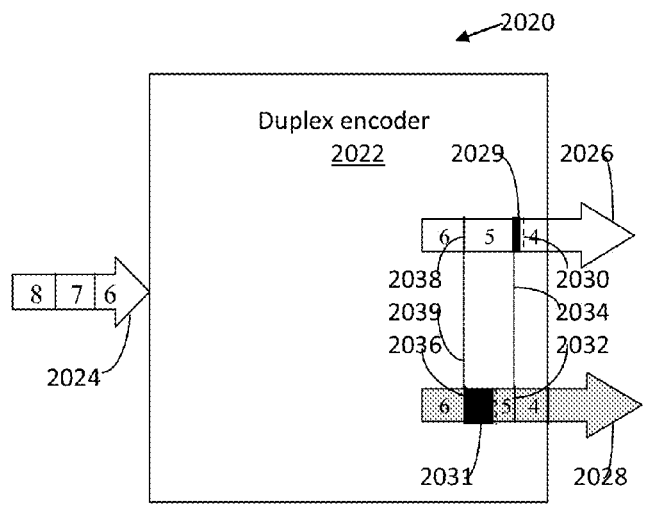
Figure 20C:
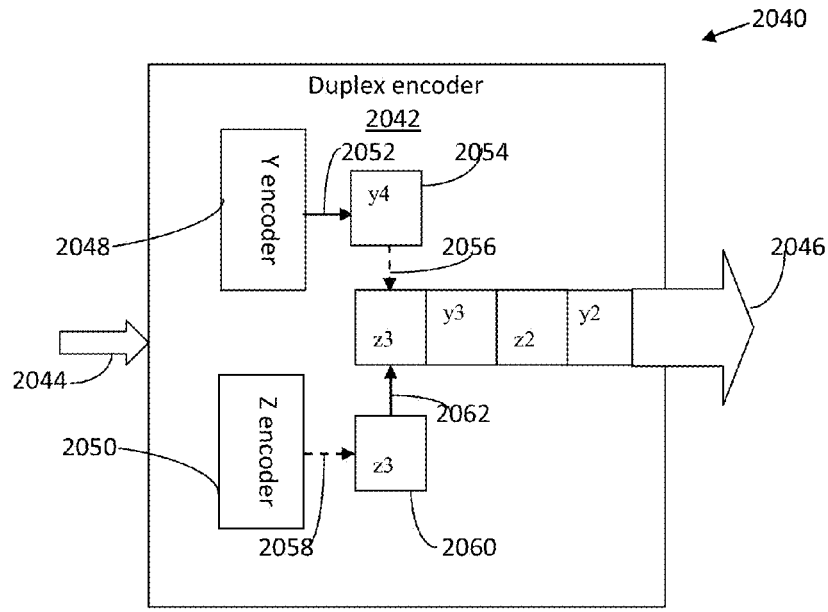
Figure 20D:
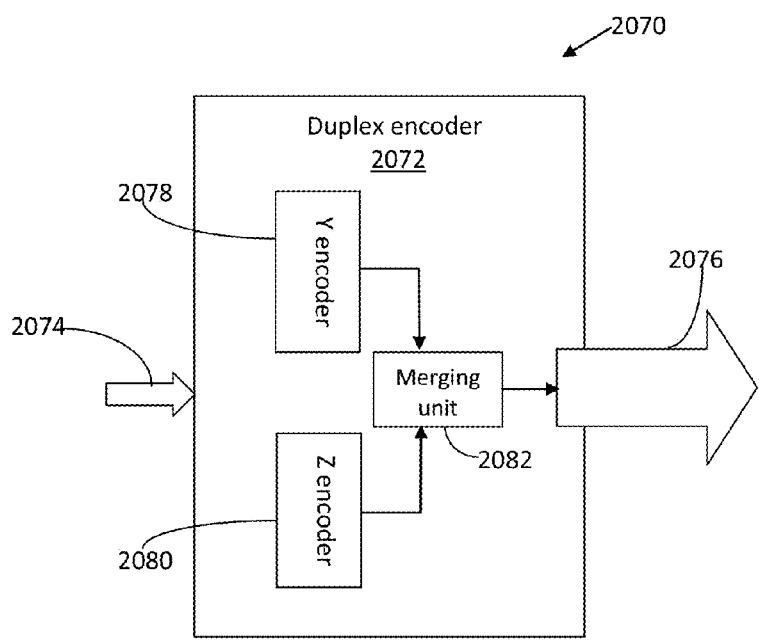

FIG. 20A illustrates an exemplary duplex encoder with two encoded, unsynchronized output streams. This multiplex encoder output architecture exemplifies the trivial, output architecture, which outputs encoded data streams as they are produced. FIG. 20B illustrates an exemplary duplex encoder with two encoded, synchronized output streams. This multi-codec output architecture is an example of a synchronized output architecture. FIG. 20C illustrates an exemplary duplex encoder with a single stream of pairs of same-frame encodings, one member of each pair encoded by one encoder, the other member encoded by the other encoder. This multiplex encoder output architecture is an example of an interleaved output architecture. FIG. 20D illustrates an exemplary duplex encoder with a single stream of encoded data that results from merging multiple semblances or their encodings. This multiplex encoder output architecture is an example of a merged output architecture.

In each case, operational descriptions may refer to the processing of individual frames and their encoded data. In one or more embodiments, frames are grouped and processed as a group by one or more processes of one or more encoder systems. It is a matter for the decoder to properly allocate decoded data to a frame and to properly sequence frames for display. Exemplary duplex encoding architectures presented here are non-limiting in this and all other respects.

FIG. 20A illustrates a duplex output architecture with output data streams occurring on two separate paths, without synchronization of the data flow on the two paths. Architecture 2000 illustrates one or more embodiments of a duplex encoder with unsynchronized output streams. Architecture 2000 includes duplex encoder 2002, frame data input path 2004, Y-encoded data path 2006, and Z-encoded data path 2008.

Duplex encoder 2002 processes and encodes video frame data using subsystems of at least two video codecs, Y and Z, and produces a Y-encoded data stream and a Z-encoded data stream, each encoding the same sequence of video frames. Frame data input path 2004 conveys video frame data. Y-encoded data path 2006 conveys Y-encoded data representing a sequence of video frames. Z-encoded data path 2008 conveys Z-encoded data representing a sequence of video frames.

Frame data input path 2004 conveys video frame data to duplex encoder 2002. In the time period shown in FIG. 20A, frame data input path 2004 is represented as conveying a data stream representing frame 6 data 2010, frame 7 data 2012, etc., in sequence. In a corresponding time period, duplex encoder 2002 processes frame data from frame data input path 2004 in each of two ways. The varying placement of frame transition boundaries correspond to processing times that differ from frame to frame and from one data stream to another. Y-encoded data stream 2006 is outputting Y-encoded frame 3 data and has prepared for output, Y-encoded frame 4 data 2014, Y-encoded frame 5 data 2016, etc. Z-encoded data stream 2008 is outputting frame 2 data and has prepared for output, Z-encoded frame 3 data 2018, Z-encoded frame 4 data 2019, etc.

These two encoded data streams are shown as separately transmitted in FIG. 20A, but in one or more embodiments, the two data streams may be carried by a single physical transmitting device or stored in the same physical memory device. Synchronization of frame data for display, whether it occurs before or after decoding, does not occur at the encoder in this example. Some advantages possessed by this output architecture are that there is no requirement for encoded frame buffering in the duplex encoder to satisfy synchronization requirements and no resulting waste of bandwidth during transmission.

This trivial (i.e., unsynchronized) duplex encoder output architecture is also readily extended to a trivial (i.e., unsynchronized) triplex encoder architecture and generalized to trivial (i.e., unsynchronized) multi-stream encoder architectures for other multiplex encoders.

FIG. 20B illustrates an architecture with output data streams conveyed on two separate paths, with synchronized data flow on the two paths. Architecture 2020 illustrates one or more embodiments of a duplex encoder with synchronized output streams. Architecture 2020 includes duplex encoder 2022, frame data input path 2024, Y-encoded data path 2026, and Z-encoded data path 2028.

Duplex encoder 2022 processes and encodes video frame data using subsystems of at least two video codecs, Y and Z, and produces a Y-encoded data stream and a Z-encoded data stream, each encoding the same sequence of video frames. Frame data input path 2024 conveys video frame data. Y-encoded data path 2026 conveys Y-encoded frame data in order of video frame sequence. Z-encoded data path 2028 conveys Z-encoded frame data representing the same sequence of frames, also in order of video frame sequence. Vertical line segments 2030-2039 represent points on a horizontal timeline marking data transmission starting or stopping events.

Frame data input path 2024 conveys video frame data to duplex encoder 2022. Frame data input path 2024 is represented as conveying a stream of frame 6 data and as about to convey frame 7 data. Duplex encoder 2022 processes frame 6 data from frame input path 2024, producing a Y-encoded frame 6 data stream on Y-encoded data path 2026 and Z-encoded frame 6 data on Z-encoded data path 2028. Encoded frame data of Y-encoded and Z-encoded output streams are synchronized to ensure that, for each frame, Y-encoded frame data and Z-encoded frame data are transmitted simultaneously on their separate paths. Thus, encoded frame 4 data is transmitted simultaneously on Y-encoded frame data path 2026 and Z-encoded frame data path 2028, even if one data release must be delayed until the other is ready. In this example, Y-encoded frame 4 data is represented as completing its transmission by endpoint 2030, while Z-encoded frame 4 data transmission is not complete till endpoint 2032. For that reason, Y-encoded frame 5 data transmission does not begin until Z-encoded frame 5 data transmission can begin, that is, at start time 2034. Similarly, transmission of Z-encoded frame 6 data is postponed from Z-encoded frame 5 data transmission end time 2036 to Y-encoded frame 5 data transmission end time 2038. Frame 6 data transmission for both frame 6 Y-encoded data and Z-encoded data is synchronized to start at time 2039. Non-transmission periods are represented as black transmission blocks 2029 and 2031.

In one or more embodiments of a synchronizing duplex output architecture, an encoder that does not require than the greater encoded transmission time is configured to take advantage of its smaller transmission time requirements in one or more ways, including for example, generating or sending a reduced bit-rate transmission over a longer period, reducing frame compression to increase frame quality, and any other improvement.

As in FIG. 20A, Y-encoded data and Z-encoded data may be physically carried on separate data paths or transmitted on a single physical path. Their data remains separate and independent except for synchronization. A possible advantage of the output architecture shown in FIG. 20B is a reduced buffering requirement for the decoder system.

This merged synchronized multi-stream output architecture is also readily extended to a synchronized triplex encoder architecture and generalized to synchronized multi-stream output architectures for other multiplex encoders.

FIG. 20C illustrates an exemplary architecture for a duplex encoder with a single encoded data output stream. The output architecture of FIG. 20C alternates Y-encoded data with Z-encoded data such that the block of Y-encoded data for a given frame is followed by the block of Z-encoded data for the same frame. When decoded for display, the two versions of the original frame may be superimposed or otherwise digitally combined or may be displayed in succession or otherwise visually combined, or presented in any other suitable way.

Architecture 2040 includes duplex encoder 2042, frame data input path 2044, encoded data output path 2046, Y encoder system 2048, Z encoder system 2050, Y-encoded frame buffer 2054, and Z-encoded frame buffer 2060.

Duplex encoder 2042 processes and encodes video frame data using subsystems of at least two video codecs and produces a Y-encoded data stream and a Z-encoded data stream, each encoding the same sequence of video frames. Frame data input path 2044 conveys video frame data. Encoded data output path 2046 conveys duplex-encoded data for transmission or storage. Y-encoder system 2048 includes the one or more subsystems of duplex encoder 2042 that generate Y-encoded data for output. Z-encoder system 2050 includes the one or more subsystems of duplex encoder 2042 that generate Z-encoded data for output.

Frame data input path 2044 conveys video frame data to duplex encoder 2042. Eventually, possibly processed frame data reaches Y encoder system 2048 and Z encoder system 2050. Y encoder system 2048 completes the process of encoding frame data into a Y-encoded data stream and stores the encoded frame data in Y-encoded frame buffer 2054 over path 2052. Z encoder system 2050 completes the process of encoding the same frame data into a Z-encoded data stream and stores the encoded frame data in Z-encoded frame buffer 2060 over path 2058.

The duplex encoder architecture of FIG. 20C operates by alternately conveying Y-encoded data for a frame of video from Y-encoded frame buffer 2054 to encoded data output path 2046, next conveying Z-encoded data for a the same frame of video from Z-encoded frame buffer 2060 to encoded data output path 2046, then repeating the process for the next frame of video. At any given time, either Y-encoded frame buffer 2054 is receiving Y-encoded data over path 2052 from Y-encoder 2048 and Z-encoded frame buffer 2060 is sending Z-encoded data over path 2062 to duplex encoded data output stream 2046, or Z-encoded frame buffer 2060 is receiving Z-encoded data over path 2058 from Z-encoder 2050 and Y-encoded frame buffer 2054 is sending Y-encoded data over path 2056 to duplex encoded data output stream 2046. The latter is portrayed in FIG. 20C, as indicated by dashed paths 2056 and 2058, indicating paths unused at the moment.

The duplex encoder output architecture of FIG. 20C generates a single output stream of encoded frame data that includes a succession of frame-by-frame pairs of encodings of the same frame, a Y-encoded data stream of the frame followed by a Z-encoded data stream of the same frame. This is indicated on encoded data output path 2046, which shows the sequencing of output data: Y-encoded frame 2 data (y2), followed by Z-encoded frame 2 data (z2), followed by Y-encoded frame 3 data (y3), to be followed by Z-encoded frame 3 data (z3) currently being released by Z-encoded frame buffer 2060 over path 2062.

This interleaved duplex encoder output architecture is also readily extended to an interleaved triplex encoder architecture and generalized to encoder architectures for other multiplex encoders.

FIG. 20D illustrates another exemplary architecture for a duplex encoder with a single encoded data output stream. The output architecture of FIG. 20D merges Y-encoded data with Z-encoded data of the same frame. Encoded data can be merged in various ways to simplify decoding. For example, Y-encoded data and Z-encoded data may be placed on different data channels or in different positions of encoded-data vectors or in any other way that enables a decoder to distinguish Y-encoded data from Z-encoded data such as by inclusion of distinguishing data flags, headers, or parentheses.

Architecture 2070 includes duplex encoder 2072, frame data input path 2074, encoded data output path 2076, Y encoder system 2078, Z encoder system 2080, and merging unit 2082.

Duplex encoder 2072 processes and encodes video frame data using subsystems of at least two video codecs and produces a Y-encoded data stream and a Z-encoded data stream, each encoding the same sequence of video frames. Frame data input path 2074 conveys video frame data. Encoded data output path 2076 conveys duplex-encoded data for transmission or storage. Y encoder system 2078 includes one or more subsystems of duplex encoder 2072 that generate Y-encoded data. Z encoder system 2080 includes one or more subsystems of duplex encoder 2072 that generates Z-encoded data. Merging unit 2082 accepts Y-encoded frame data and Z-encoded frame data, and outputs a data stream that can later be separated into Y-encoded frame data and Z-encoded frame data.

For each frame, frame data input path 2074 conveys video frame data to duplex encoder 2072. Eventually, possibly-processed frame data reaches Y encoder system 2078 and Z encoder system 2080. Y encoder system 2078 completes the process of encoding frame data into a Y-encoded data stream and conveys Y-encoded frame data to merging unit 2082. Z encoder system 2080 completes the process of encoding same-frame data into a Z-encoded data stream and conveys Z-encoded frame data to merging unit 2082. Merging unit 2082 merges Y-encoded frame data and Z-encoded frame data into a suitable format for transmission. Encoded data output path 2076 conveys encoded frame data for transmission or storage.

This merged duplex encoder output architecture is also readily extended to a merged triplex encoder architecture and generalized to encoder architectures for other multiplex encoders.

As noted, any two codecs served by a common frame data input stream and supplemented with a duplex encoder output architecture may constitute a duplex encoder. In particular, any Y-to-Z encoder (or $\mathcal{Y}$-to-Z encoder with Y included in $\mathcal{Y}$) that produces the optional output stream of Y-encoded data, supplemented with a duplex encoder output architecture, even the trivial output architecture, constitutes a duplex encoder. Thus, any embodiment of FIG. 4, FIG. 8, or FIGS. 9A-9D that includes the optional encoded data output stream from an auxiliary codec and includes a duplex encoder architecture such as one illustrated FIGS. 20A-20D is an embodiment of a duplex encoder. Combined with an output architecture such as described in FIGS. 20A-20D, additional illustrative and specific examples of interacting encoders found in the section entitled Description of Some Implemented Embodiments also provide additional embodiments of a duplex encoder.

For purposes of clarity only, discussion and examples of multiplex encoders have focused on duplex encoders. Similarly, for purposes of clarity only, discussion and examples of multi-codec encoders have focused on multi-codec encoders with a single input stream. This should not be understood as limiting in any way.

For example, a four screen home or public theater system could be served by a single multiplex encoder, with four input streams and one or more output streams (depending on its output architecture). Each input stream might be from a single encoder or from multiple same-frame encodings (thus forming a single stream multiplex encoder subsystem of the overall multiplex encoder system).

Another example of a multiple input stream multi-codec encoder is that of a 3-D multiplex encoder. In this example, one of two input frame data streams may include video frame data for the left eye perspective, the other including video frame data for the right eye perspective. To achieve the kind of viewing quality possible with multi-codec encoding, each video perspective may be encoded using both of two codecs, say codecs Y and Z. The four data streams are streamed separately and independently (as in the trivial output architecture of FIG. 20A) or in accord with any other multiplex output architecture. There are many other ways of encoding and transmitting or storing 3-D video, most of which can be enhanced using a multi-codec encoder approach.

Description of Some Implemented Embodiments

Video multi-codec encoders constitute a very large class of encoders, with a wide variety of features, architectures, and implementations. Some exemplary architectures and embodiments have been described. One of ordinary skill in the art would recognize that other architectures and embodiments may be implemented using the teachings contained herein. In this section, specific examples are described, along with features that could give them utility. The following examples include non-limiting implementations of one or more embodiments described herein.

Various embodiments of multi-codec encoders described herein implement or otherwise relate to an H.264 codec. H.264 codecs constitute a very large variety of functionally distinct codecs that satisfy the H.264 standard. The principal property they share is that their encoded video output must be decodable by H.264 decoders. Because a codec is defined by the functionality of its encoder and decoder, distinct H.264 encoders may involve technically distinct codecs.

As used herein, "Vexa" refers to any of a family of wavelet-based and channel-based high definition video codecs. Vexa codecs are designed to interact with other codecs and their subsystems. Thus, Vexa codec subsystems can receive data directly from external sources and output data directly to external devices and systems. Vexa codecs include various features that enhance the Vexa encoded product and can enhance those of other encoders. One or more embodiments of Vexa include the use of efficient, high quality color spaces, image and frame sequence analysis, anti-blocking frame preparation, edge enhancement processes, efficient 3-D encoding, automatic de-interlacing, cross-codec iterative feature optimization, and other codec-enhancing capabilities.

With the exception of Vexa, codecs are not designed to be interacting. An encoder may include inputs that allow it to be configurable over a wide range of user specifications. There is usually no provision for direct external inputs to or outputs from internal subsystems. Even as software modules, subsystems of a codec are usually designed as part of a specific architecture, with no facility for use in a revised architecture and no ability to exchange data with an external system. For this reason, H.264 standard codecs and other codecs may be able to interact with another codec only as part of a basic interacting encoder.

Codecs may be modified and/or designed for use in an interacting video encoding, for example, by adding I/O inserts to one or more subsystems of the codec. Such I/O inserts extend the functionality of the codec by conditionally allowing an external input or output at that point in the codec. Vexa codecs are designed with many such I/O inserts. These additional entry and exit points do not affect codec function unless they are used, and when they are used they may support interacting encoders and other video multi-codec encoders. Some examples of non-basic interacting video encoders require the existence or addition of one or more such entry and/or exit points.

Unless otherwise indicated, reference to a wavelet-based codec may be to a Vexa codec. Vexa represents one or more embodiments of a wavelet and channel-based high definition video encoder, as described in U.S. patent application Ser. No. 13/007,670.

Some examples of basic interacting video encoders below involve the H.264 Intel Integrated Performance Primitives (IPP) codec. One familiar with the art will recognize that many such examples could be developed using other DCT-based codecs, including other H.264 standard codecs or WebM, in place of the IPP H.264 standard codec, as well as a wavelet-based codec, fractal based codec, and others. Also, it may be possible to use wavelet-based and other codecs in place of a Vexa codec in the examples below.

Each description below includes a figure showing an exemplary system architecture of one or more embodiments and a description of how the video data is processed at each stage in the non-limiting exemplary implementations that are described. A video flow diagram is a system architecture diagram that shows the video data flow through the system. Some figures depict video flow diagrams.

Basic Vexa-to-H.264 Interacting Video Encoders.

Figure 10:
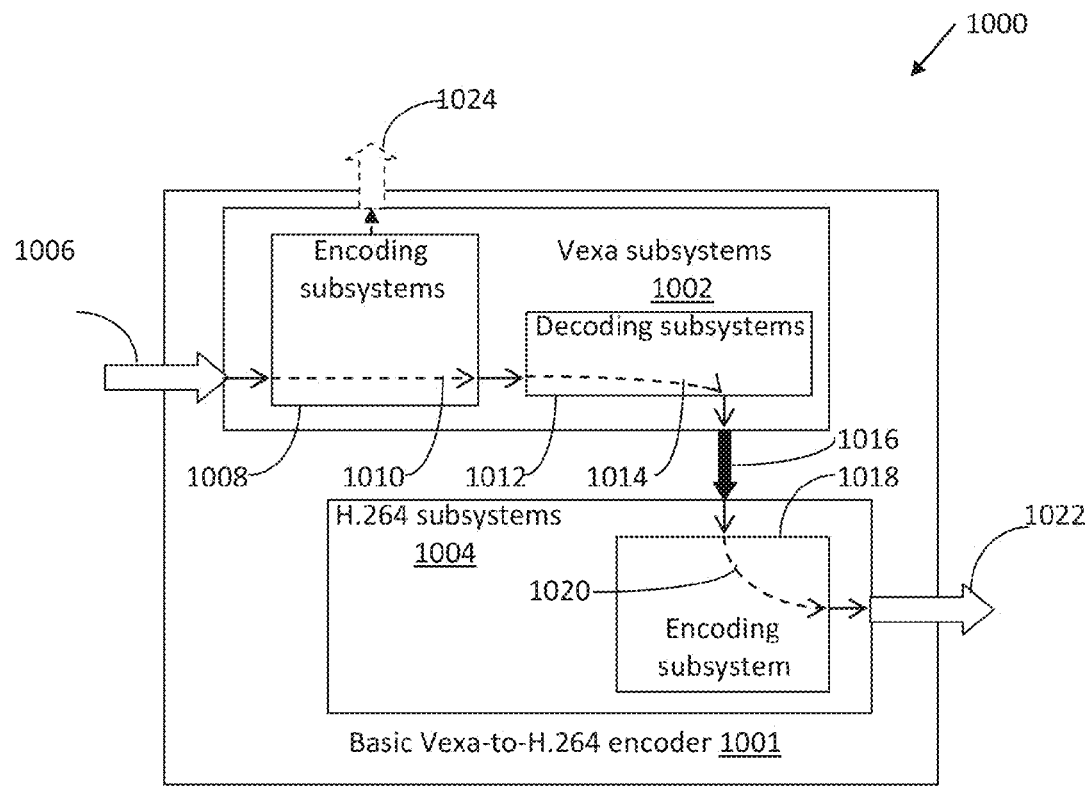
FIG. 10 illustrates an exemplary system for a basic W-to-DCT based encoder in accordance with one or more embodiments of video multi-codec encoders.

In one or more embodiments of a basic Y-to-Z encoder, Y is a wavelet-based codec Vexa and Z is an H.264 codec. Vexa-to-H.264 video encoders may improve certain features of the simple H.264 encoder: fewer artifacts, less blocking, and better subjective viewing quality, with no reduction in compression. Another distinctive feature of Vexa-to-H.264 interacting encoders is the ability of one or both systems to watermark any frame. FIG. 10 is a video flow diagram for a basic Vexa-to-H.264 encoder in accordance with one or more embodiments of video multi-codec encoders. FIG. 5 provides a flowchart overview of the process shown in FIG. 10. FIG. 4 and FIG. 9A represent the architecture of basic Y-to-Z encoders of which FIG. 10 illustrates one or more embodiments. In FIG. 4 and FIG. 9A, codec Y subsystems 404 and codec Y subsystems 906 may be Vexa subsystems 1002 or those of any codec, including wavelet-based, DCT-based, fractal-based, or any other codec. In FIG. 4 and FIG. 9A, codec Z subsystems 406 and codec Z subsystems 912 may be H.264 subsystems 1004 or those of any other codec, including wavelet-based, DCT-based, fractal-based, or any other kind of codec. Handoff product module 408 of codec Y subsystems 404 may be any subsystem or combination of subsystems of codec Y capable of generating data, including processed or unprocessed video data, for conveyance to codec Z subsystems. A handoff product module is included in subsystem 908 and, if Z is an H.264 codec, in subsystem 1012. Codec Z subsystem 406 and subsystem 914 include the ability to process the handoff product it receives and output Z-encoded video data, as does subsystem 1018 (where codec Z is the H.264 codec of FIG. 10).

System architecture 1000 includes basic Vexa-to-H.264 encoder 1001. Basic Vexa-to-H.264 encoder 1001 includes Vexa subsystems 1002, H.264 subsystems 1004, video frame data input 1006 and encoded data output path 1022.

Vexa subsystems 1002 include Vexa encoder 1008 and Vexa decoding subsystem 1012. Vexa encoding subsystems 1008 are configured to encode video frame data using one or more Vexa encoding processes, such as wavelet transforms, filtering operations, any other Vexa encoding process, and any combination thereof. Vexa decoding subsystem 1012 is configured to decode Vexa-encoded video data into video frame data.

H.264 subsystems 1004 include H.264 encoding subsystem 1018. H.264 encoding subsystem 1018 is configured to convert video frame data into H.264-encoded video data.

In one or more embodiments, Vexa encoding subsystems 1008 first convert input RGB color data to YCbCr as part of video data processing 1010.

In one or more embodiments, Vexa tests successive video frames to affect allocation and placement of certain kinds of H.264 frames and forwards control signals that instruct H.264 encoding subsystem 1018 accordingly.

Alternative embodiments vary with respect to nature and degree of compression applied during Vexa encoding process 1008. For example, Vexa may pass full HD 1920×1080 frames over handoff path 1016 to H.264 encoding subsystems 1018 or, if the application does not require full HD for display, Vexa may apply a wavelet transform to the image during Vexa video data encoding process 1010 and pass the wavelet-transformed image as reduced resolution imagery through Vexa decoding subsystems 1012 over handoff path 1016 to H.264 encoding subsystems 1018. In either case, but especially if the application requires full HD, depending on the required video bit rate, Vexa may apply some degree of lossy compression during Vexa encoding process 1010. Greater Vexa lossy compression is associated with fewer artifacts during H.264 encoding process 1020 but may increase softening of visible edges.

The unencoded data passed over handoff path 1016 from Vexa subsystems 1002 to H.264 subsystems 1004 is included in the handoff product described in FIG. 5, step 512. H.264 encoding subsystem 1018 then implements video data encoding process 1020. H.264-encoded data is output on encoded data output path 1022.

If optional Vexa-encoded data output path 1024 is included in system architecture 1000, then system architecture 1000 is also that of a duplex encoder with the trivial output architecture.

Non-Basic Interacting Vexa-to-H.264 Video Encoders with Iterated Blocking Reduction.

In one or more embodiments of a non-basic interacting Y-to-Z encoder like that of FIG. 9C, Y is the wavelet-based codec Vexa and Z is a modified Intel IPP H.264 codec. Other embodiments of a Y-to-Z encoder with iteration include but are not limited to those in which codec Y is wavelet-based, DCT-based, fractal-based, or any other kind of codec. In one or more embodiments of a Y-to-Z encoder with iteration, cross-codec iteration may be used to improve blocking, edge sharpness, color quality, compression, quality measure, quality/compression trade-offs, or any other feature of the performance or product of the Y-to-Z encoder. In one or more embodiments, the Y codec of a Y-to-Z encoder with iteration is wavelet-based codec Vexa. In those cases, codec Z of a Vexa-to-Z encoder may be wavelet-based, DCT-based, fractal based, or any other kind of codec.

Figure 12A:
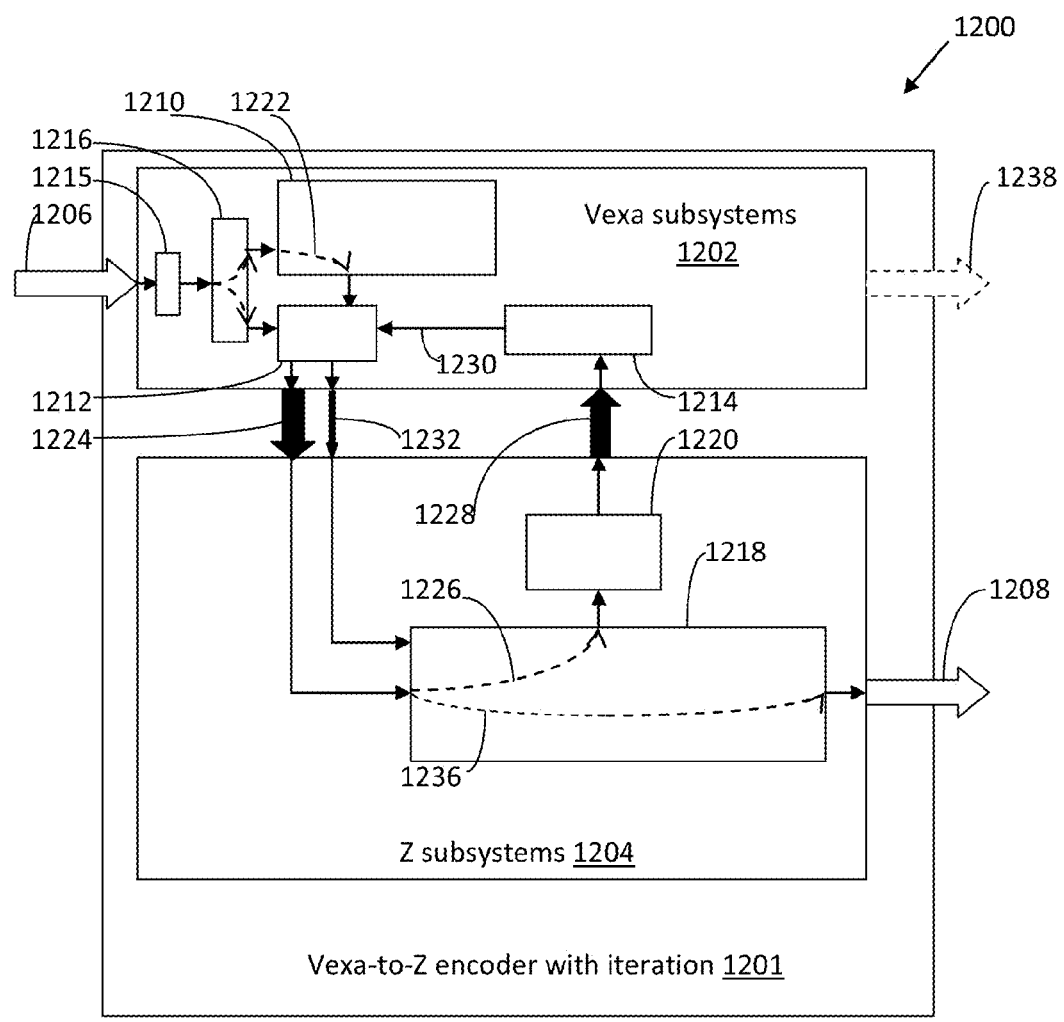
FIGS. 12A-12B illustrates exemplary systems for a W-to-Z encoder in accordance with one or more embodiments of video multi-codec encoders.

FIG. 12A is a video flow diagram for one or more embodiments of a Vexa-to-Z encoder with iteration, where Z is any wavelet-based, H.264 or other DCT-based (e.g., WebM), fractal-based, or any other kind of codec.

System 1200 includes Vexa-to-Z encoder with iteration 1201. Vexa-to-Z encoder with iteration 1201 includes Vexa subsystems 1202, codec Z subsystems 1204, input video frame input path 1206, and Z encoded data path 1208, and may include optional Vexa-encoded data output path 1238.

Vexa subsystems 1202 include at least one of the following subsystems: frame prescreening subsystem 1215, channel processing subsystem 1216, wavelet transform subsystem 1210, frame buffer subsystem 1212, or feature evaluation subsystem 1214.

In one or more embodiments, Vexa subsystems 1202 include frame prescreening subsystem 1215, which is configured to analyze a video frame to determine whether it is a candidate for iterative feature or quality improvement. In one or more embodiments, Vexa subsystems 1202 include channel processing subsystem 1216, which is configured to transform the input video frame into a color space suitable for Z processing and forward one or more channels for iterative feature or quality improvement. In one or more embodiments, Vexa subsystems 1202 include wavelet transform subsystem 1210, which is configured to apply a wavelet transform zero or more times to video frame data. In one or more embodiments, Vexa subsystems 1202 include frame buffer subsystem 1212, which is configured to store one or more channels of at least one input video frame and/or at least one wavelet-transformed video frame. In one or more embodiments, Vexa subsystems 1202 include feature evaluation subsystem 1214, which is configured to determine whether to iterate a process based on some feature or quality of a full size, reduced resolution, or otherwise processed video frame.

Codec Z subsystems 1204 include at least one of: Z encoder 1218 or Z decoder 1220. In one or more embodiments, codec Z subsystems 1204 include Z encoder 1218, which is configured to encode video and reduced resolution video data. In one or more embodiments, codec Z subsystems 1204 include Z decoder 1220, which is configured to decode Z-encoded video data.

Because iterative feature or quality evaluation and Z encoding and decoding require extra processing time, it may be desirable to select for such processing only those frames most likely to benefit from this process. In one or more embodiments, video frame data is input to Vexa subsystems 1202 on input path 1206 and on to frame prescreening subsystem 1215.

In one or more embodiments, frame prescreening subsystem 1215 tests one or more input frames for characteristics that would identify the frame(s) as a likely candidate for feature or quality improvement. If the input frame(s) is not identified as such a candidate, then frame data is sent to channel processing subsystem 1216 for color conversion, then through frame buffer subsystem 1212 and over Vexa-Z handoff path 1224 to Z encoder 1218; and signals are also sent over Vexa-Z handoff path 1232 instructing Z encoder 1218 to perform final encoding 1236 on processed frame(s) and output Z-encoded video data over encoded data output path 1208.

In one or more embodiments, if the input frame(s) is identified as a candidate for feature or quality improvement, then frame prescreening subsystem 1215 passes video frame data to channel processor subsystem 1216, possibly with instructions to send one or more color channels of the frame(s) to wavelet transform subsystem 1210. Frame prescreening subsystem 1215 may also signal frame buffer subsystem 1212 to store the transformed frame color data in a frame buffer until needed.

In one or more embodiments, channel processing subsystem 1216 transforms input frame color coordinates to a color space usable by codec Z for color processing. Channel processing subsystem 1216 sends transformed color channel data to frame buffer subsystem 1212, where they are stored or forwarded to Z encoder 1218 for final encoding, depending on the results of analysis previously performed by frame screening subsystem 1215. If the video frame(s) was identified as a candidate for feature or quality improvement by frame prescreening subsystem 1215, then channel processing subsystem 1216 may also send one or more data channels to wavelet transform subsystem 1210, after which the following operations occur:

Wavelet transform processing 1222 is applied to video frame data one or more times to produce processed image data, which is then stored in frame buffer subsystem 1212.

Processed image data is sent from frame buffer subsystem 1212 to codec Z subsystems 1204 on Vexa-Z handoff path 1224, and on to Z encoder 1218.

Z input configuration signals are sent from frame buffer subsystem 1212 on Vexa-Z handoff path 1232 to codec Z subsystems 1204, and on to Z encoder 1218. These signals ensure that the processed image data is further processed by Z encoder 1218 so as to improve the target feature or quality of Z-encoded or Z-decoded video.

Processing 1226 is applied to frame-based processed image data to produce a test stream of Z encoded video data. This test stream of Z-encoded video data is sent to Z decoder 1220, where it is decoded back to frame-based processed image data. In one or more embodiments, the measure of feature or quality of the Z-decoded frame-based processed image data corresponds to the measure of that feature or quality that would be present if these Z codec processes were applied to the partially processed original frame(s) stored in frame buffer subsystem 1212.

Frame-based processed image data is sent from Z decoder 1220 over Z-Vexa handoff path 1228 to feature evaluation subsystem 1214, where the target feature or quality of the frame is measured and compared to a value representing the minimum acceptable degree of that feature or quality. Feature evaluation subsystem 1214 sends a signal on path 1230 to Vexa frame buffer subsystem 1212 indicating whether an iteration stopping criterion has been met, such as that the frame-based processed image satisfies the minimum acceptable requirements.

If an iteration stopping criterion has not been met, then the signal on path 1230 instructs frame buffer subsystem 1212 to retransmit its frame-based processed image data across handoff path 1224 and on to Z encoder 1218, along with a signal on handoff path 1232 instructing Z encoder 1218 to improve the target feature or quality.

The above process is iterated until either the Z-decoded frame-based image data satisfies the minimum acceptable requirement or some value has been reach, such as predetermined maximum accommodation for the target feature or quality or a maximum amount of iterations or processing time. At that point, feature evaluation subsystem 1214 sends a signal on path 1230 to frame buffer subsystem 1212 instructing it to transmit the stored full-size color transformed frame over Vexa-Z handoff path 1224 to encoder 1218, along with control signals on handoff path 1232 instructing Z encoder 1218 to process the frame data as determined by the iterative process so as to produce encoded video data that possesses the desired feature or quality.

Processing 1236 is applied to the stored frame data as determined by the iterative process, and the resulting Z-encoded video data is then output from codec Z subsystems 1204 over encoded data output path 1208.

If Vexa-encoded data is also produced, then Vexa-encoded data is conveyed over optional encoded data output path 1238, and system 1200 is a duplex encoder with the trivial multi-encoder output architecture. Of course, any other duplex encoder output architecture could be incorporated into system 1200.

Figure 12B:
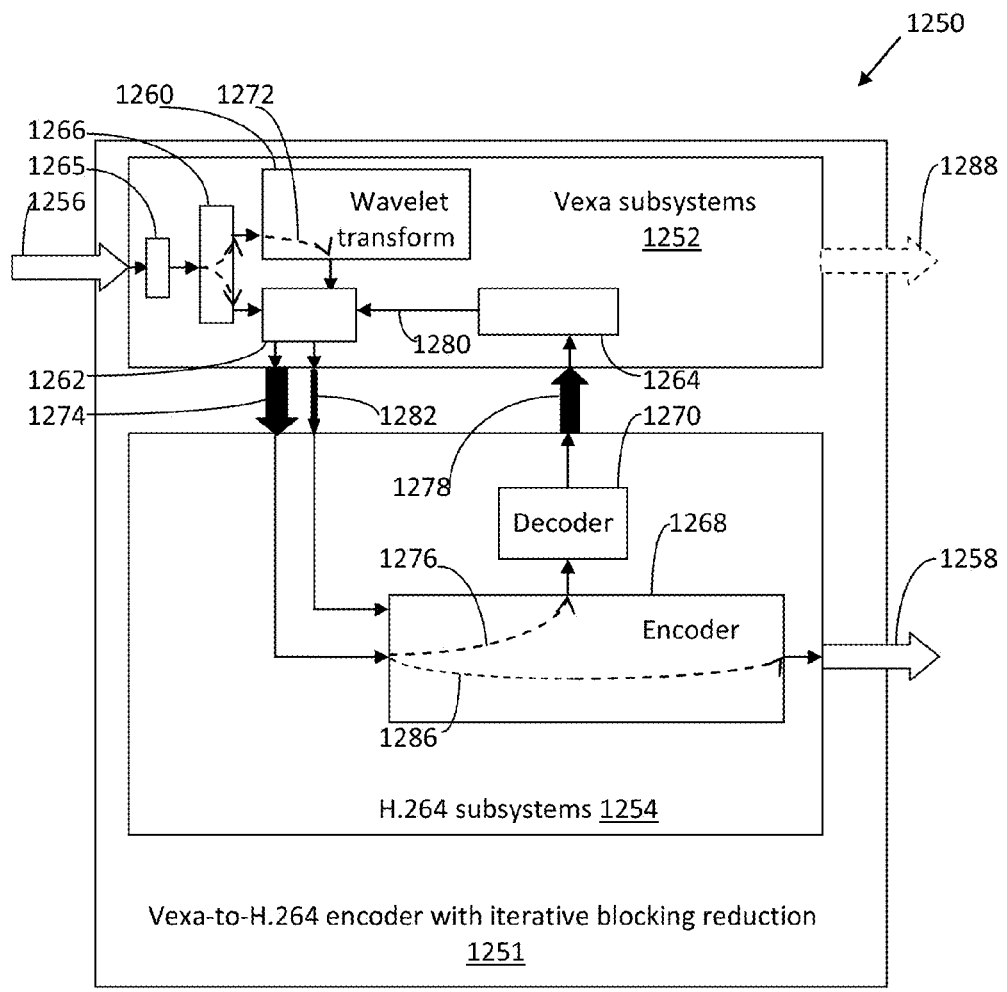

FIG. 12B is a video flow diagram for an embodiment of a Vexa-to-Z encoder with iterated blocking reduction, where Z is an IPP H.264 encoder.

Like other H.264 encoders, the IPP H.264 encoder has an internal H.264 decoder subsystem with no blocking reduction capability of its own. The IPP H.264 encoder of this embodiment has been modified slightly by making the output of its decoder subsystem available to support the interacting process described in this embodiment.

This embodiment of a Vexa-to-H.264 interacting video encoder improves the function of the H.264 encoder by eliminating or pre-reducing the amount of blocking encoded into the H.264 encoded video data stream. This embodiment achieves this by identifying video frames most subject to blocking, iteratively testing the luminance of their H.264 encoded video data products, and increasing quantization until blocking is evaluated as acceptable. To facilitate encoding performance, this embodiment may apply a wavelet transform to the luminance color channel to generate a low resolution version of the original frame for the blocking tests.

System 1250 includes Vexa-to-H.264 encoder with iterative blocking reduction 1251. Vexa-to-H.264 encoder with iterative blocking reduction 1251 includes Vexa subsystems 1252, H.264 subsystems 1254, video frame data input path 1256, and H.264-encoded data output path 1258, and may include optional Vexa-encoded data output path 1288.

Vexa subsystems 1252 include: complexity testing subsystem 1265, channel processing subsystem 1266, wavelet transform subsystem 1260, frame buffer subsystem 1262, and blocking evaluator subsystem 1264.

Complexity testing subsystem 1265 is configured to test an input video frame to determine whether its level of complexity makes it a candidate for iterative blocking prevention. Channel processing subsystem 1266 is configured to transform the input video frame into YCbCr color space and forward the luma (Y) channel for iterative blocking removal. Wavelet transform subsystem 1260 is configured to apply a wavelet transform zero or more times to video frame data. Frame buffer subsystem 1262 is configured to store at least one input video frame and at least one wavelet-transformed video frame. Blocking evaluator subsystem 1264 is configured to evaluate the amount of blocking present in a full size or reduced resolution video frame.

H.264 subsystems 1254 include H.264 encoder 1268 and H.264 decoder 1270. H.264 encoder 1268 is configured to encode both full frame video and reduced resolution video. H.264 decoder 1270 is configured to decode H.264-encoded video data.

Because iterative blocking tests and frame recoding require extra processing and time, it is desirable to avoid processing frames unlikely to pose risk of blocking. The Vexa complexity testing subsystem identifies over 90% of frames needing blocking reduction and passes on frames not in need of blocking reduction. Video frame data is input to Vexa subsystems 1252 on frame data input path 1256 and on to complexity testing subsystem 1265.

Complexity testing subsystem 1265 tests the input frame for characteristics that would identify this frame as a likely candidate for H.264 encoded blocking artifacts. If the input frame is identified as having low risk of blocking, then signals are sent to frame buffer subsystem 1262 and channel processing subsystem 1266 instructing color channel processing subsystem 1266 to convey the color channel processed video frame data to frame buffer subsystem 1262 and instructing frame buffer subsystem 1262 to forward the channel processed video frame data directly to H.264 encoder subsystem 1268 over handoff path 1274.

If the input frame is identified as having higher risk of blocking, then signals are sent to color channel processing subsystem 1266 instructing color channel processing subsystem 1266 to convey the color channel processed video frame data to wavelet transform subsystem 1260 and on to frame buffer subsystem 1262, and signals are sent to frame buffer subsystem 1262 instructing frame buffer subsystem 1262 to store the full video frame data it receives from channel processing subsystem 1266.

Channel processor subsystem 1266 transforms input color coordinates to the YCbCr color space required by H.264 for color processing. Channel processor subsystem 1266 sends luma (luminance data Y) and chroma (color data Cb and Cr) through Vexa frame buffer subsystem 1262 and over handoff path 1274 from Vexa subsystems 1252 to H.264 subsystems 1254, to H.264 encoder 1268 for H.264 encoding 1286 and output from H.264 subsystems 1254 on H.264-encoded data output path 1258.

Assume now that the input frame is identified as a blocking risk by complexity testing subsystem 1265. In that case, complexity testing subsystem 1265 passes the video frame data to channel processing subsystem 1266 with instructions to send the luminance data of this video frame on to wavelet transform subsystem 1260, and complexity testing subsystem 1265 also signals (1272) frame buffer subsystem 1262 to store the transformed frame color data in a frame buffer until needed.

Channel processing subsystem 1266 transforms input frame color coordinates to the YCbCr color space required by H.264 for color processing. Channel processing subsystem 1266 sends luma and chroma to Vexa frame buffer subsystem 1262, where they are stored or forwarded to H.264 subsystems 1254 for final encoding, depending on the results of the complexity test. If the video frame was identified as a blocking risk by the complexity test, then channel processing subsystem 1266 also sends luma data to wavelet transform subsystem 1260, and the following operations occur:

Wavelet transform processing 1272 is applied to video frame data one or more times to produce reduced resolution image data, which is then stored in frame buffer subsystem 1262.

Reduced resolution image data is sent from frame buffer subsystem 1262 to H.264 subsystems 1254 over handoff path 1274, and on to H.264 encoder 1268.

H.264 input configuration signals are sent from frame buffer subsystem 1262 on handoff path 1282 to H.264 subsystems 1254, and on to H.264 encoder 1268. These signals ensure that the reduced resolution image data is processed with the desired quantization by H.264 encoder subsystem 1268.

H.264 encoder processing 1276 is applied to reduced resolution image data to produce a test stream of H.264 encoded video data. This test stream of encoded video data is sent to H.264 decoder 1270, where it is decoded back to reduced resolution image data. Greater blocking in the reduced resolution luma frame corresponds to the greater blocking that would result from decoding the full size YCbCr video frame encoded by H.264 using a corresponding quantization.

Reduced resolution frame data is sent from H.264 decoder 1270 over path 1278 to Vexa blocking evaluation subsystem 1264, where the amount of blocking in the frame is measured and compared to a value representing the minimum acceptable level of blocking. Blocking evaluation subsystem 1264 sends a signal on path 1280 to Vexa frame buffer subsystem 1284 indicating whether the reduced resolution frame satisfies the minimum blocking requirement.

If the reduced resolution frame does not satisfy a minimum blocking requirement, then the signal on path 1280 instructs frame buffer subsystem 1262 to retransmit its reduced resolution frame data across handoff path 1274 and on to H.264 encoder 1268, along with a signal on handoff path 1282 instructing the H.264 encoder 1268 to increase quantization.

The above process is iterated until either the H.264-decoded reduced resolution luma frame satisfies the minimum blocking requirement, some predetermined maximum quantization, maximum allowable processing time, or maximum number of iterations has been reached. At that point, blocking evaluation subsystem 1264 sends a signal on path 1280 to frame buffer subsystem 1262 instructing it to transmit the full resolution YCbCr frame over handoff path 1274 to H.264 encoder subsystem 1268, along with a signal on handoff path 1282 instructing H.264 encoder subsystem 1268 to quantize the frame data as determined.

H.264 encoder processing 1286 is applied to the input frame data at the proper quantization and then conveyed from H.264 subsystems 1254 over H.264-encoded data output path 1258.

If Vexa-encoded data is also produced, then Vexa-encoded data is conveyed over optional Vexa-encoded data output path 1288, and system 1250 is a duplex encoder with the trivial multi-encoder output architecture. Of course, any other duplex encoder output architecture could be incorporated into system 1250.

FIGS. 11A-11D illustrate the effect of iterated blocking removal produced by the Vexa-to-H.264 encoder at four steps in the iteration processes represented in FIG. 12B. The original RGB frame was from a slow motion 1920×1280p high definition video clip called The Swimmer. This frame was passed to Vexa complexity testing 1265, which identified it as likely to result in a blocky video frame after H.264 encoding and decoding. For that reason, after transforming RGB color coordinates to YCbCr in Vexa channel processing subsystem 1266, the full frame was stored in frame buffer subsystem 1262, and the wavelet transformed luma channel was passed through Vexa wavelet transform subsystem 1260 and stored in another frame buffer in frame buffer subsystem 1262. This same reduced resolution image was re-encoded by the H.264 encoder 1268, then decoded and tested, each time at a higher level of quantization. This process was iterated fifteen times, after which the full frame stored in frame buffer 1262 was encoded with the required quantization and output as H.264-encoded video data on output path 1258.

Figure 11A:
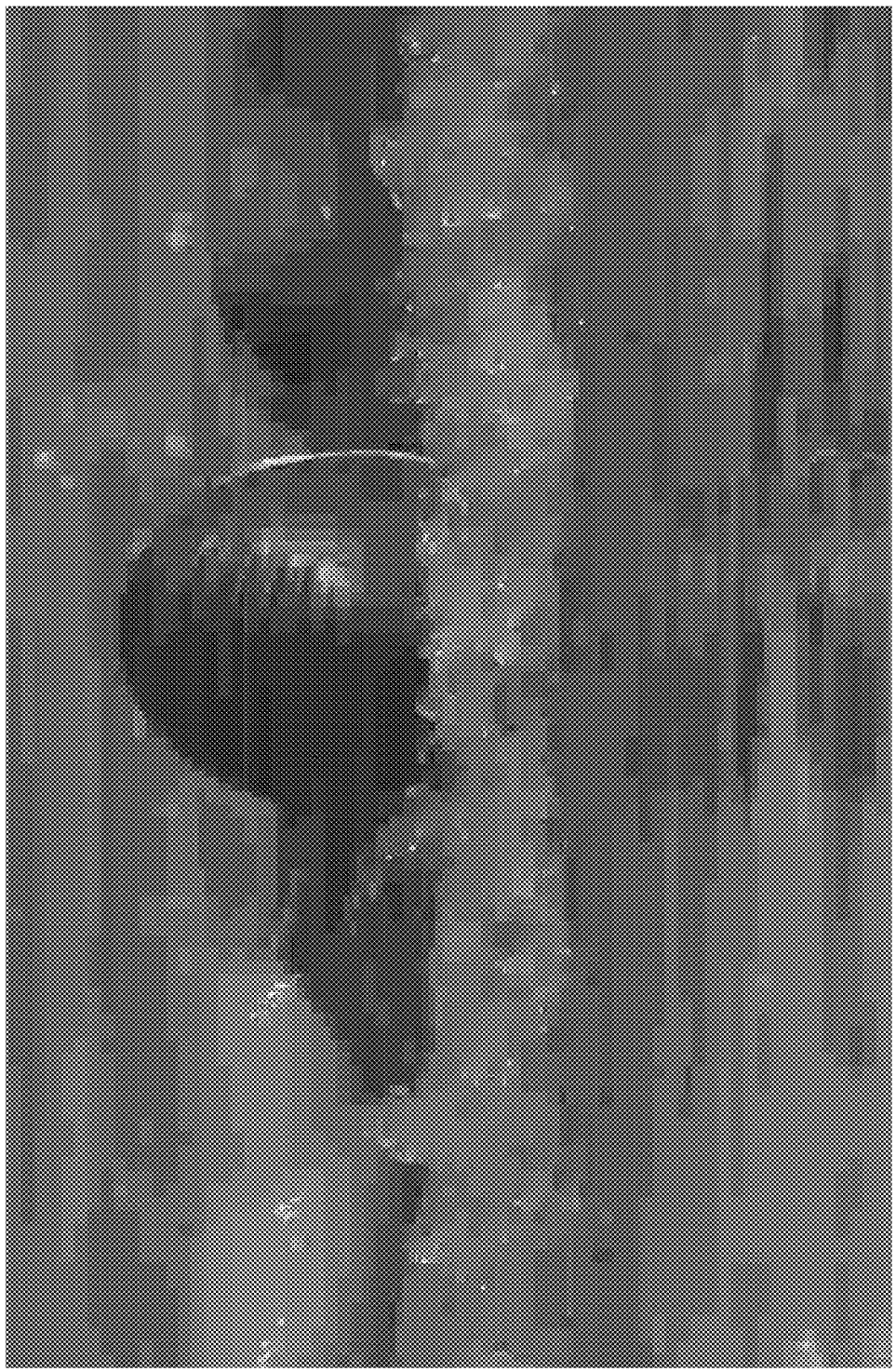
FIGS. 11A-11D are exemplary images representing four stages of blocking reduction by a Vexa-to-H.264 interacting encoder in accordance with one or more embodiments of video multi-codec encoders.
Figure 11B:
Figure 11C:
Figure 11D:

FIG. 11A is the decoded luma of the original H.264-encoded video frame without iteration. FIG. 11B shows the decoded luma that would have resulted if quantization corresponding to that of a single iteration were applied. The failure to pass the blocking evaluation test at this point resulted in further iterations. FIG. 11C shows the corresponding result after five iterations, still failing to satisfy the blocking evaluation test. FIG. 11D shows the result when iterations were allowed to continue until they passed the blocking evaluation test. H.264-encoded video carrying the degree of blocking shown in FIG. 11D needs no deblocking from the user's H.264 decoder.

In one or more embodiments, an iterative process could challenge time constraints and processing requirements built into H.264 and its processing platform. In this embodiment this problem was reduced in three ways. First, blocking artifacts usually present a problem in only a small fraction of H.264-decoded video frames. By using a blocking risk assessment test like that of Vexa complexity testing subsystem 1265, only small numbers of frames are singled out for iterative blocking evaluation and improvement. Second, only the luma color channel is iteratively encoded, decoded, and tested. This is sufficient because the luma carries the preponderance of the blocking data. Third, the use of wavelet-transformed reduced resolution imagery may significantly decrease processing time because the system is processing quarter-size images.

In one or more embodiments, the blocking evaluator used in the Vexa evaluation system 1264 may be replaced with another blocking evaluator found in the literature, such as that of Muijs and Kirenko, ('A No-Reference Blocking Artifact Measure for Adaptive Video Processing', Phillips Laboratories) and otherwise structure the blocking control multi-codec encoder as in FIG. 12B. System performance and the quality of the results may be affected by the choice of the blocking evaluator.

By replacing Vexa blocking evaluation subsystem 1264 with another feature evaluation subsystem, other embodiments can be implemented, each having the video flow diagram of FIG. 12B. Depending on the feature being measured and the ability to control H.264 encoder subsystem 1268 so as to improve that feature, many video characteristics can be iteratively improved to a desired degree before H.264 encoding of the original input frame for streaming. In principle, any characteristic of video that can be measured and affected may be similarly controlled.

A typical example of edge sharpness. A digital camera with auto-focusing may be equipped with a focus control system based on a digital subsystem for evaluating or comparing the edge sharpness of an image. Using a similar method, one could use an edge sharpness evaluator as the feature evaluator in feature evaluation subsystem 1214. The target criterion for edge sharpness would then be a target edge sharpness value. If codec Z of FIG. 12A is a wavelet-based codec, then the edge sharpness of the displayed image may be inversely related to the amount of lossy encoder compression. In that case, if the evaluated edge sharpness of the decoded test image produced by Z-decoder 1220 does not satisfy the target edge sharpness criterion, then compression parameters could be reset in feature evaluation subsystem 1214. (One such compression parameter found in certain wavelet-based systems is the threshold value below which support values may be replaced by zero.) These new compression parameters would then be transmitted to Z encoder 1218 over handoff path 1232, and the image re-encoded by Z encoder 1218 using the new, relaxed compression parameters. This process could then be iterated until a satisfactory degree of edge sharpness is achieved, as determined by the target edge sharpness criterion.

Preprocessing Vexa-to-H.264 Encoders

In one or more embodiments of a basic Y-to-Z encoder, Y is the wavelet-based codec Vexa and Z is the Intel IPP H.264 codec. The Vexa codec includes several processes that can improve encoding products of other codecs. Among them are channel processing functions that permit Vexa to operate with non-color channels (e.g., a 3-D pixel depth channel) as well as any color space, and convert input channel data for use by a Z encoder. One application of the channel processor is conversion of input colors to the best color space for the target codec in order to produce color quality that may be exceptional for that codec. In addition, the Vexa codec includes image analysis processes that help Vexa identify the kind of image being processed and the best processing parameters for that image. Vexa can convert these data into configuration inputs or other control instructions that improve the efficiency and effectiveness of the output codec.

If the output codec of a Y-to-H.264 encoder is unmodified, the only inputs to the H.264 encoder may be those associated with its video frame data input and its configuration control inputs. If the H.264 codec is modified to allow inputs directly to one or more internal systems, then there is a much greater variety and degree to which processes of codec Y may improve the quality and features of the simple H.264 codec product.

Figure 13A:
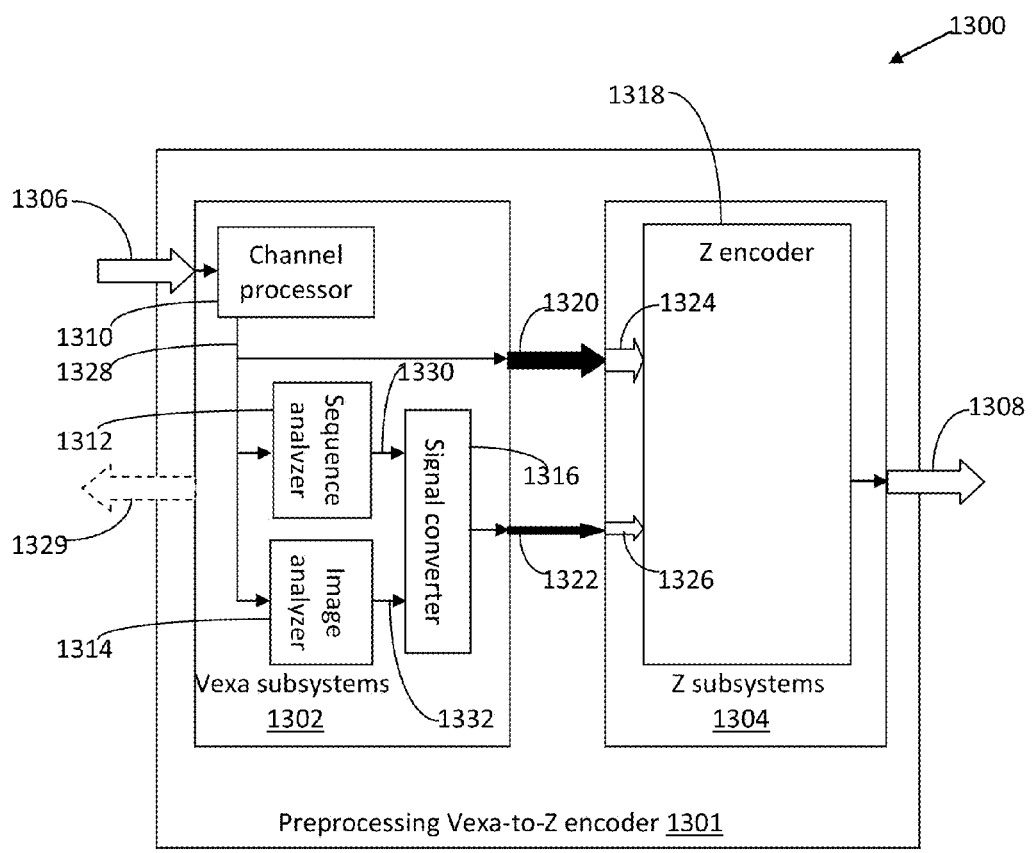
FIGS. 13A-13C illustrates exemplary systems for a W-to-Z encoder in accordance with one or more embodiments of video multi-codec encoders.
Figure 13B:
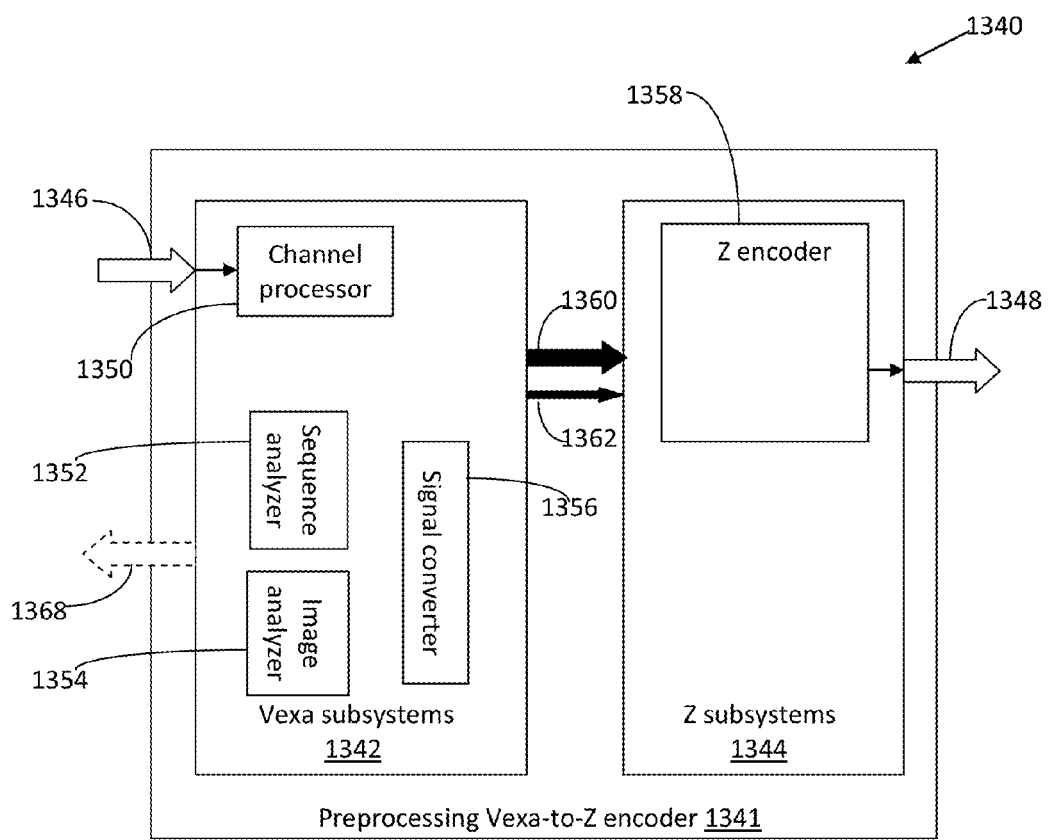
Figure 13C:
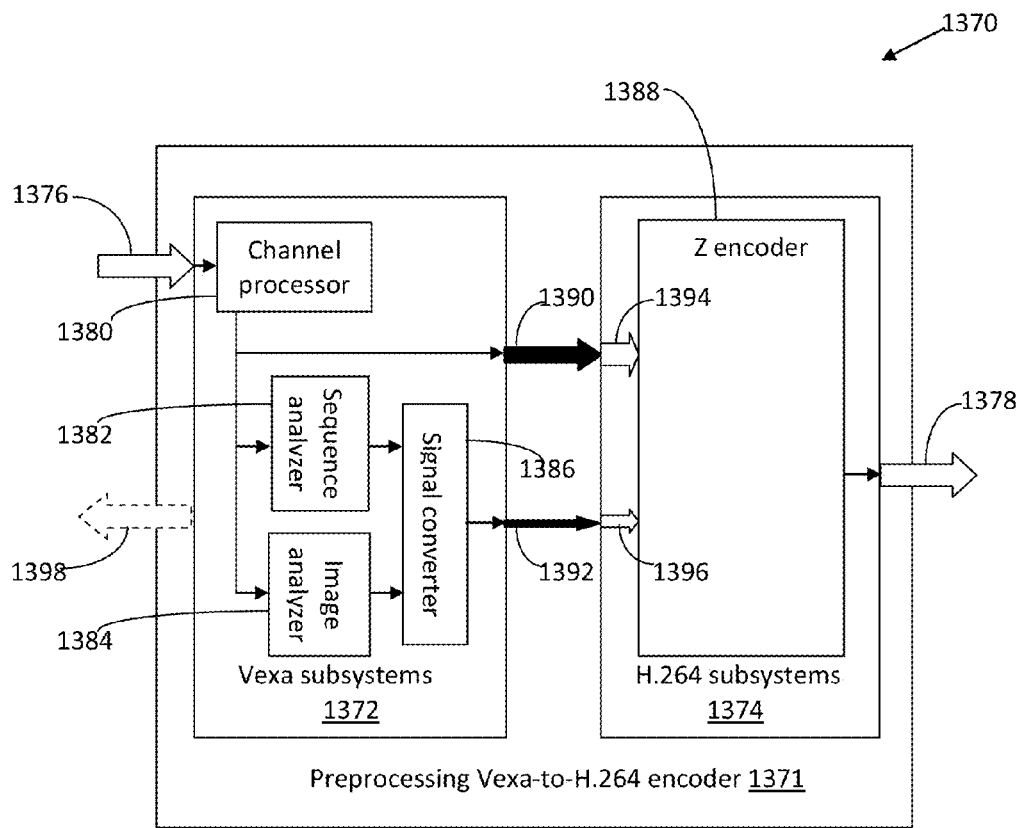

FIG. 13A illustrates an exemplary Vexa-to-Z encoder, where Z is an unmodified simple encoder. FIG. 13B illustrates one or more embodiments of a Vexa-to-Z encoder, where one or more codec Z subsystems are modified to accept external inputs to and/or provide external outputs from one or more internal subsystems. FIG. 13C illustrates an embodiment of a Vexa-to-Z encoder, where Z is an unmodified simple IPP H.264 encoder. In each case, Vexa processes are used to improve one or more features or qualities of the product of the simple Z encoder. One or more Vexa processes may preprocess video image data to effect a superior Z-encoded video data product. One or more Vexa processes may be combined to cause the Z encoder to further improve its encoded video data product.

FIG. 13A illustrates an exemplary Vexa-to-Z encoder in accordance with one or more embodiments of video multi-codec encoders, where Z is an unmodified simple encoder.

In one or more embodiments Z is a WebM codec, an H.264 codec, and H.265 codec, or some other DCT-based codec. In one or more embodiments, Z is a wavelet-based codec, a fractal-based codec, or some other video codec.

System 1300 illustrates one or more embodiments of preprocessing Y-to-Z encoder 1301, where Y is an embodiment of a Vexa codec and Z is an embodiment of an unmodified Z encoder. In one or more embodiments, basic Y-to-Z encoder 1301 includes Vexa subsystems 1302, codec Z subsystems 1304, input video frame data path 1306, and Z-encoded data output path 1308, and may include optional Vexa-encoded data output path 1329.

Vexa subsystems 1302 include at least one of channel processor subsystem 1310, sequence analyzer subsystem 1312, image analyzer subsystem 1314, or signal converter subsystem 1316. Codec Z subsystems 1304 include Z encoder 1318.

In one or more embodiments of a preprocessing Vexa-to-Z encoder, Vexa subsystems 1302 include channel processor subsystem 1310, which is configured to transform frame data from one color system to the same or another color system. In one or more embodiments of a preprocessing Vexa-to-Z encoder, Vexa subsystems 1302 include sequence analyzer subsystem 1312, which is configured to analyze sequences of video frames and provide processing signals that improve the performance or product of a Z encoder. In one or more embodiments of a preprocessing Vexa-to-Z encoder, Vexa subsystems 1302 include image analyzer subsystem 1314, which is configured to analyze individual frames and provide signals that can be used to improve the performance of a Z encoder. In one or more embodiments of a preprocessing Vexa-to-Z encoder, Vexa subsystems 1302 include signal converter subsystem 1316, which is configured to receive signals from Vexa subsystems and produce signals that modify the performance or product of a Z encoder. In one or more embodiments of a preprocessing Vexa-to-Z encoder, codec Z subsystems 1302 include Z encoder 1318, which is configured to process video frames and produce Z-encoded video data.

Path 1324 represents the video frame data input path of Z encoder 1318 when used as a simple Z encoder. In system 1300, as part of a preprocessing Vexa-to-Z encoder, Z encoder 1318 receives video frame data from Vexa subsystems 1302 on Vexa-Z handoff path 1320 over Z frame data input path 1324. Similarly, path 1326 represents the external input path for one or more Z configuration signals when encoder 1318 is a simple Z encoder. As part of a Vexa-to-Z encoder, simple Z encoder 1318 may receive one or more configuration signals from Vexa subsystems 1302 over handoff path 1322 over Z configuration input path 1326.

Video frame data is input to Vexa subsystems 1302 on video frame data input path 1306. In one or more embodiments of a preprocessing Vexa-to-Z encoder, channel processor 1310 transforms input channel coordinates to another channel space. In one or more embodiments, channel data may be output on path 1328 as one or more frame data streams. In one or more embodiments, video frame data is conveyed to path 1328.

In one or more embodiments of a preprocessing Vexa-to-Z encoder, video data is conveyed from path 1328 to Vexa-Z handoff path 1320 to codec Z subsystems 1304. In one or more embodiments, video data is conveyed to sequence analyzer subsystem 1312. In one or more embodiments, video data is conveyed to image analyzer subsystem 1314.

In one or more embodiments of a preprocessing Vexa-to-Z encoder, sequence analyzer subsystem 1312 computes and outputs signals on path 1330. In one or more embodiments, image analyzer subsystem 1314 computes and outputs signals on path 1332. In one or more embodiments, at least one of path 1330 data or path 1332 data are conveyed to signal converter 1316 and converted to signals that help configure Z encoder 1318.

In one or more embodiments of a preprocessing Vexa-to-Z encoder, data on one or both of path 1330 and path 1332 are conveyed directly to Vexa-Z handoff path 1322. In one or more embodiments, signals from signal converter subsystem 1316 are conveyed to Vexa-Z handoff path 1322. In one or more embodiments, signals from Vexa-Z handoff path 1322 are input to Z encoder 1318 over path 1326.

In one or more embodiments of a preprocessing Vexa-to-Z encoder, video data on handoff path 1320 are conveyed to encoder 1318 over encoder frame data input path 1324. In one or more embodiments, signals on Vexa-Z handoff path 1322 are conveyed to encoder 1318 over Z configuration path 1326.

In one or more embodiments, encoder 1318 Z-encodes input video frame data and outputs Z-encoded data on Z-encoded data output path 1308. In one or more embodiments, Vexa-encoded data is also produced and Vexa-encoded data is conveyed over optional Vexa-encoded data output path 1329, in which case system 1300 is a duplex encoder with the trivial duplex encoder output architecture.

FIG. 13B illustrates an exemplary preprocessing Vexa-to-Z encoder in accordance with one or more embodiments of video multi-codec encoders, where at least one Z-codec subsystem is modified to accept external inputs to and/or provide external outputs from one or more internal subsystems. These modifications may allow one or more subsystems of the Z codec to receive data and instructions from one another and/or from Vexa subsystems.

In one or more embodiments Z is a WebM codec, an H.264 codec, an H.265 codec, or any other DCT-based codec. In one or more embodiments, Z is a wavelet-based codec, a fractal-based codec, or any other video codec.

System 1340 illustrates one or more embodiments of preprocessing Vexa-to-Z encoder 1341. Preprocessing Vexa-to-Z encoder 1341 includes Vexa subsystems 1342, codec Z subsystems 1344, input video frame data path 1346, and Z-encoded video data output path 1348, and may include optional Vexa-encoded data output path 1368.

Vexa subsystems 1342 include at least one of channel processor subsystem 1350, scene analyzer subsystem 1352, image analyzer subsystem 1354, or signal converter subsystem 1356. Codec Z subsystems 1344 include Z encoder 1358.

In one or more embodiments of a preprocessing Vexa-to-Z encoder, Vexa subsystems 1342 include channel processor subsystem 1350, which is configured to transform frame data from one channel space to the same or another channel space. In one or more embodiments, Vexa subsystems 1342 include sequence analyzer subsystem 1352, which is configured to analyze sequences of video frames and provide processing signals that affect the processing of a Z encoder. In one or more embodiments, Vexa subsystems 1342 include image analyzer subsystem 1354, which is configured to analyze individual frames and provide signals that can be used to affect the performance of a Z encoder. In one or more embodiments of a preprocessing Vexa-to-Z encoder, Vexa subsystems 1342 include image analyzer subsystem 1356, which is configured to receive signals from Vexa subsystems and produce signals that affect the processing of a Z encoder. In one or more embodiments, codec Z subsystems 1342 include Z encoder 1358, which is configured to process video frames and produce Z encoded video data.

The video frame data input path of Z encoder 1358 and the Z configuration control data path are not shown in FIG. 13B. Z encoder 1358 may receive some or all input video frame data from one or more of the following sources: one or more Vexa subsystems 1342 over Vexa-Z handoff path 1360, one or more codec Z subsystems 1344, external frame data sources over video frame data path 1346, or any combination of these or other sources. Z encoder 1358 may receive some or all configuration control signals from one or more of the following sources: one or more Vexa subsystems 1342 over Vexa-Z handoff path 1362, one or more codec Z subsystems 1344, external sources over video frame data path 1346, configuration control signals from external sources, or any combination of these or other sources. Codec Z subsystems 1344 receives data from at least one subsystem of Vexa subsystems 1342 over at least one of Vexa-Z handoff path 1360 or Vexa-Z handoff path 1362.

Video frame data is input to Vexa subsystems 1342 on input video frame data path 1346. In one or more embodiments of a preprocessing Vexa-to-Z encoder, channel processor subsystem 1350 transforms channel coordinates to another channel space. In one or more embodiments, channel processor subsystem 1350 transforms input color coordinates to another color space. In one or more embodiments, color channel data is output as one or more frame data streams. In one or more embodiments, video frame data is conveyed from color channel processor subsystem 1350 to one or more of: sequence analyzer subsystem 1352, image analyzer subsystem 1354, signal converter subsystem 1356, one or more Vexa subsystems 1342 not explicitly displayed in FIG. 13B, or over Vexa-Z handoff path 1360 to a subsystem of Z subsystems 1344.

In one or more embodiments of a preprocessing Vexa-to-Z encoder, sequence analyzer subsystem 1352 computes and outputs signals. In one or more embodiments, image analyzer subsystem 1354 computes and outputs signals. In one or more embodiments, signals from sequence analyzer subsystem 1352 and/or Vexa image analyzer subsystem 1354 are input to signal converter subsystem 1356. In one or more embodiments, data from signal converter subsystem 1356 are conveyed from to Vexa-Z handoff path 1362. In one or more embodiments, signals from handoff path 1362 are conveyed to codec Z subsystems 1344.

In one or more embodiments of a preprocessing Vexa-to-Z encoder, some data from channel processor subsystem 1350 are input to codec Z subsystems 1344 over Vexa-Z handoff path 1360. In one or more embodiments, one or more data from signal converter subsystem 1356 are conveyed to codec Z subsystems 1344 over Vexa-Z handoff path 1362.

In one or more embodiments of a preprocessing Vexa-to-Z encoder, codec Z subsystems 1344 interact with one another as may be directed by signals on path 1362 to further prepare video frame data for Z encoder 1358.

In one or more embodiments of a preprocessing Vexa-to-Z encoder, video data on handoff path 1360, possibly modified by codec Z subsystems 1344, are conveyed to Z encoder 1358. In one or more embodiments, Vexa-encoded data is also produced, and Vexa-encoded data is conveyed over optional Vexa-encoded data output path 1368, in which case system 1340 is a duplex encoder with the trivial multi-encoder output architecture.

In one or more embodiments, signals on path 1362, as may be modified by codec Z subsystems 1344, are conveyed to Z encoder 1358. Z encoder 1358 may further interact with one or more codec Z subsystems 1344 while processing video frame data. Z encoder 1358 encodes video frame data and outputs Z-encoded data on encoded data output path 1348.

FIG. 13C illustrates an exemplary basic preprocessing Vexa-to-Z encoder in accordance with one or more embodiments of video multi-codec encoders, where Z is an unmodified simple IPP H.264 encoder.

System 1370 illustrates one or more embodiments of basic preprocessing Vexa-to-H.264 encoder 1371. Basic preprocessing Vexa-to-H.264 encoder 1371 includes Vexa subsystems 1372, H.264 subsystems 1374, video frame data input path 1376, and H.264-encoded data output path 1378, and may include optional Vexa-encoded data output path 1398.

Vexa subsystems 1372 include channel processor subsystem 1380, sequence analyzer subsystem 1382, image analyzer subsystem 1384, and signal converter subsystem 1386. H.264 subsystems 1374 include H.264 encoder 1388.

Vexa channel processor 1380 is configured to transform input frame data to YCbCr luma and chroma frame data. Vexa sequence analyzer subsystem 1382 is configured to analyze sequences of video frames to determine signals and/or settings that can be used to improve the performance of H.264 encoder 1388. Vexa image analyzer subsystem 1384 is configured to analyze individual frames to determine signals and/or settings that can be used to improve the performance of H.264 encoder 1388. H.264 subsystems 1374 include H.264 encoder 1388, which is configured to process YCbCr video frames and produce H.264-encoded video data.

Video frame data is conveyed to Vexa subsystems 1372 on video frame data input path 1376 and on to Vexa channel processor subsystem 1380. Channel processor subsystem 1380 transforms input color coordinates to YCbCr coordinates because YCbCr (luma and chroma) is the required video data input to an H.264 encoder. YCbCr data is transmitted to other Vexa subsystems internally and to H.264 subsystems 1374 on handoff path 1390.

This embodiment of the Vexa-to-Intel IPP H.264 codec is not modified to allow external inputs to internal systems. Handoff path 1390 conveys video frame data to H.264 subsystems 1374 and directly to video frame data input path 1394 of the simple H.264 encoder 1388. Configuration control signals from signal converter subsystem 1386 are conveyed over handoff path 1392 are to configuration control input path 1396 to help configure the simple H.264 encoder 1388.

In this embodiment of a basic preprocessing Vexa-to-H.264 video encoder, YCbCr video frame data is processed by scene analyzer subsystem 1382. Scene analyzer subsystem 1382 analyzes groups of frames to help improve H.264 performance when processing these frames. Based on the frame sequence analyses, sequence analyzer subsystem 1382 outputs one or more signals or values to signal converter subsystem 1386.

YCbCr video frame data is also processed by image analyzer subsystem 1384. Image analyzer subsystem 1384 has available processing algorithms that help in configuring H.264 encoder 1388 for superior processing of YCbCr frames. For example, Vexa's blocking estimation process estimates a good quantization for H.264 to use for a frame. Based on image analyzer subsystem 1384 analyses, image analyzer subsystem 1384 outputs one or more signals or values to signal converter subsystem 1386.

Signal converter subsystem 1386 collects signals and values from sequence analyzer 1382 and image analyzer subsystem 1384. Signal converter subsystem 1386 uses these data to generate signals that cause encoder H.264 encoder 1388 to improve its processing of the YCbCr video frames and groups of frames. Inputs to signal converter subsystem 1386 are usable individually or in combination for this purpose.

If an individual input can be used directly as an external configuration input to H.264 encoder 1388, then signal converter subsystem 1386 may apply that input across handoff path 1392 directly to the appropriate external configuration input of H.264 encoder 1388. Otherwise, signal converter subsystem 1386 evaluates configuration input values required to improve H.264 encoder 1388 processing from the input data received from sequence analyzer subsystem 1382 and image analyzer subsystem 1384.

Video frame data on Vexa-H.264 handoff path 1390 are input to H.264 encoder 1388 over path 1394. Configuration control signals H.264 for encoder 1388 are input externally and from Vexa-H.264 handoff path 1392 to configuration control path 1396.

H.264 encoder 1388 encodes possibly-preprocessed YCbCr image frame data received on handoff path 1390 or preprocessed YCbCr image frame data in accord with its current configuration as modified by signals received on handoff path 1392 and generates H.264 encoded video data that is conveyed to H.264-encoded data output path 1378. If Vexa-encoded data is also produced, then Vexa-encoded data is conveyed over optional output path 1398, and system 1370 is also an embodiment of a duplex encoder with the trivial multiplex encoder output architecture.

Basic Vexa-to-H.264 Interacting Video Encoders with Edge-Enhancing Vexa Processes.

In one or more embodiments of a basic Y-to-Z encoder with edge enhancement processes, Y is the wavelet-based codec Vexa with edge-enhancing processes. In one or more embodiments, Z is an unmodified IPP H.264 codec. One or more embodiments of the Vexa codec include several operations that enhance edge preservation for the overall interacting encoder system. One or more embodiments of the Vexa codec are designed to keep H.264 artifacts to a minimum. The viewing quality of the decoded video is typical of or superior to conventional H.264-processed video. One or more embodiments include a duplex encoder.

Figure 14A:
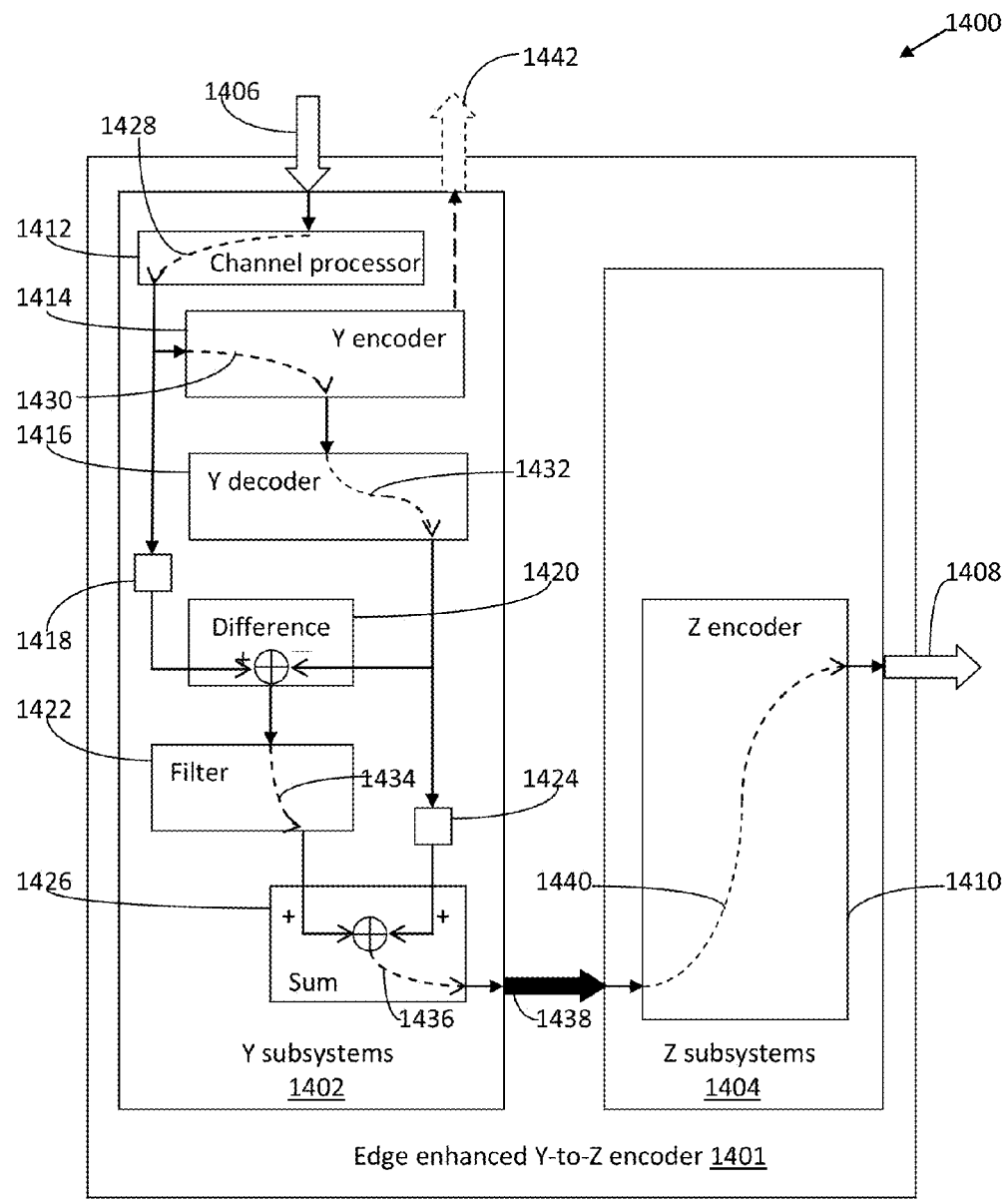
FIGS. 14A-14B illustrates an exemplary system for a Y-to-Z encoder in accordance with one or more embodiments of video multi-codec encoders.

FIG. 14A presents an exemplary video flow diagram of one or more embodiments of a Y-to-Z encoder with edge enhancement in accordance with one or more embodiments of video multi-codec encoders. System 1400 represents one or more embodiments of edge enhanced Y-to-Z encoder 1401. System 1400 includes edge-enhanced Y-to-Z encoder 1401.

Edge enhanced Y-to-Z encoder 1401 includes codec Y subsystems 1402, codec Z subsystems 1404, video frame data input path 1406, and encoded data output path 1408, and may include optional Vexa-encoded video data output path 1442.

In one or more embodiments of a Y-to-Z encoder with edge enhancement, codec Z subsystems 1404 include Z encoder 1410, configured to accept video frame data and produce Z-encoded video data.

Codec Y subsystems 1402 include at least one of channel processor subsystem 1412, Y encoder 1414, Y decoder 1416, frame buffer system 1418, difference subsystem 1420, filter subsystem 1422, frame buffer subsystem 1424, or summation subsystem 1426.

In one or more embodiments of a Y-to-Z encoder with edge enhancement, Z encoder 1410 is configured to accept video frame data and produce Z-encoded video data.

In one or more embodiments of a Y-to-Z encoder with edge enhancement, channel processor subsystem 1412 is configured to convert input frame data to another color space. In one or more embodiments, Y encoder 1414 is configured to Y-encode video data and may use lossy compression. In one or more embodiments, Y decoder 1416 is configured to decode Y-encoded video data. In one or more embodiments of a Y-to-Z encoder with edge enhancement, frame buffer subsystem 1418 is configured to store one or more channels of a video frame. In one or more embodiments of a Y-to-Z encoder with edge enhancement, difference operation subsystem 1420 is configured to produce a difference frame from a pair of input frames. In one or more embodiments, filter subsystem 1422 is configured to filter a video frame. In one or more embodiments, frame buffer subsystem 1424 is configured to store a video frame. In one or more embodiments, summation operation subsystem 1426 is configured to produce the sum of two input video frames.

In one or more embodiments of a Y-to-Z encoder with edge enhancement, video frame data is conveyed to codec Y subsystems 1402 on video frame data input path 1406 and on to channel processor subsystem 1412. In one or more embodiments, channel processor subsystem 1428 transforms input frame data to another color space.

In one or more embodiments of a Y-to-Z encoder with edge enhancement, frame data is stored in frame buffer subsystem 1418 and is also sent to Y encoder 1414.

In one or more embodiments of a Y-to-Z encoder with edge enhancement, Y encoder processing 1430 includes at least partial encoder processes and may subject video data to lossless or lossy compression.

In one or more embodiments of a Y-to-Z encoder with edge enhancement, processed frame data is sent to Y decoder 1416 where decoder processing 1432 includes decoding video data. In one or more embodiments, decoded frame data is sent to frame buffer subsystem 1424 and/or to difference operation subsystem 1420.

In one or more embodiments of a Y-to-Z encoder with edge enhancement, difference operation subsystem 1420 is applied to frame data from frame buffer subsystem 1418 and frame data from Y decoder 1416 and outputs difference frame data.

In one or more embodiments of a Y-to-Z encoder with edge enhancement, the difference frame is sent to filter operation subsystem 1422. In one or more embodiments, filter processing subsystem 1434 selectively replaces difference data to eliminate noise data and/or unhelpful edge data. In one or more embodiments, non-zero values that emerge from filter operation subsystem 1422 include edge data.

In one or more embodiments of a Y-to-Z encoder with edge enhancement, summation operation subsystem 1426 combines the output data of filter operation 1422 with the frame data stored in frame buffer subsystem 1424. In one or more embodiments, data resulting from summation processing subsystem 1436 is sent from codec Y subsystems 1402 on handoff path 1438 to codec Z subsystems 1404.

In one or more embodiments of a Y-to-Z encoder with edge enhancement, video data is processed by one or more subsystems in codec Z subsystems 1404. In one or more embodiments, video data is Z-encoded by Z encoder 1410 and conveyed to Z-encoded data output path 1408. In one or more embodiments, Y-encoded data is produced by Y encoder 1414 and conveyed over optional Y-encoded data output path 1442, in which case system 1400 is also a duplex encoder using the trivial multi-codec encoder output architecture. Of course, any other duplex encoder output architecture could replace the trivial multi-codec encoder output architecture in a duplex encoder included in system 1400.

In one or more embodiments of a Y-to-Z encoder with edge enhancement, Y is a DCT-based codec, wavelet-based codec, fractal-based codec, or some other codec. In one or more embodiments, Z is a DCT-based codec, wavelet-based codec, fractal-based codec, or some other codec. In one or more embodiments of a Y-to-Z encoder with edge enhancements, Y is a wavelet-based codec and Z is a WebM or H.264 codec.

One or more embodiments of a Vexa-to-H.264 encoder with edge enhancement are now described. The H.264 encoder in these embodiments is the Intel IPP H.264 encoder. This is an embodiment of a basic interacting video encoder with edge-enhancing Vexa processes. The Vexa codec includes several processes that enhance edge preservation for the overall interacting encoder system. The Vexa codec is also designed to keep H.264 artifacts to a minimum.

When applied to raw video data or to mezzanine video data, the Vexa-to-H.264 encoder creates an encoded video product comparable to that of the simple H.264. Video decoded from the Vexa-to-H.264 product presents sharp edges, fewer artifacts, and distinctly better color than the decoded product of the simple H.264 codec. The two systems provide similar compression, and the interacting system produces video with as good or better viewing quality than that of the simple H.264 codec.

Figure 14B:
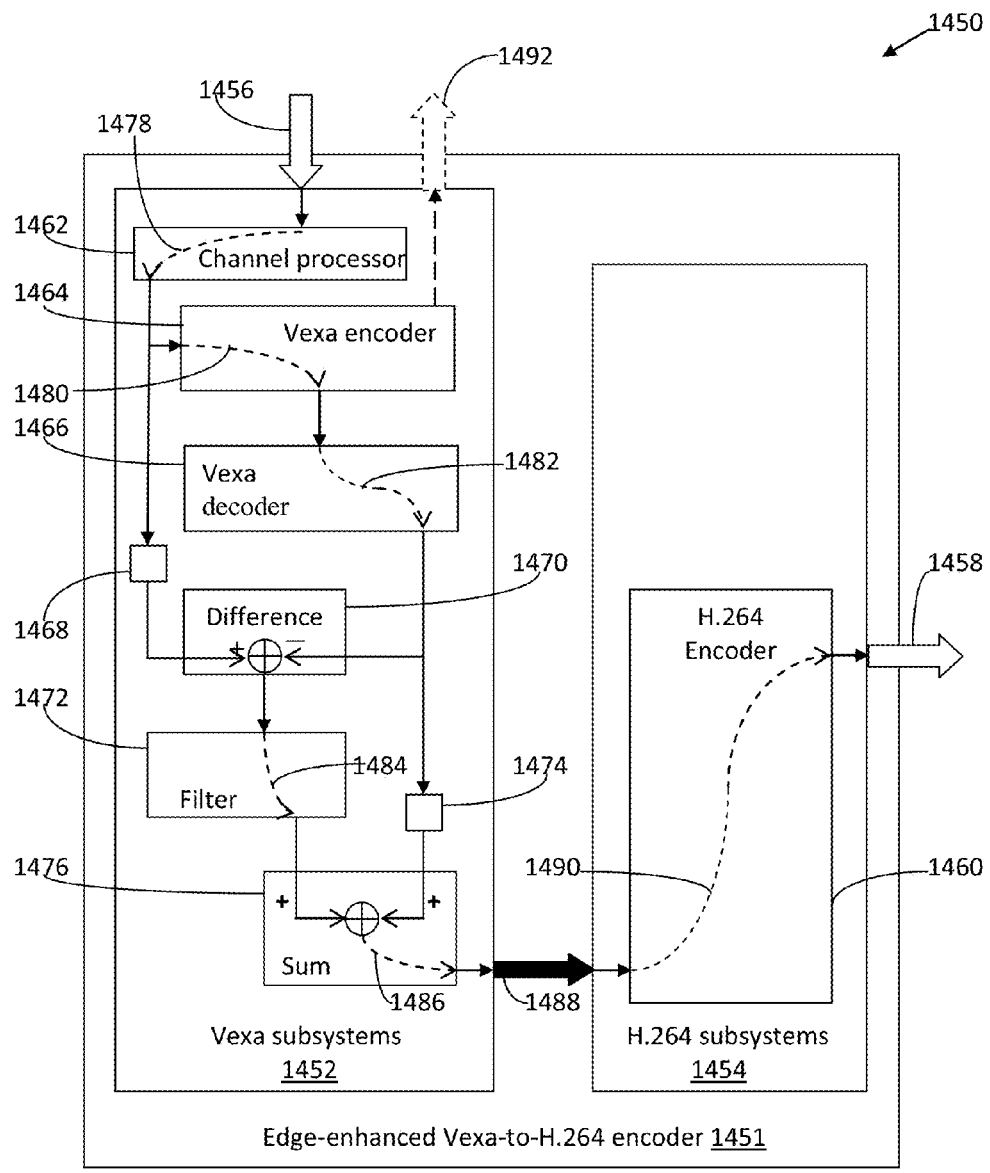

FIG. 14B presents an exemplary video flow diagram of an embodiment of basic Vexa-to-H.264 encoder with edge enhancement in accordance with one or more embodiments of video multi-codec encoders. System 1450 illustrates one or more embodiments of edge enhanced Vexa-to-H.264 encoder 1451.

Edge enhanced Vexa-to-H.264 encoder 1451 includes Vexa subsystems 1452, H.264 subsystems 1454, video frame data input path 1456, and H.264 encoded data output path 1458, and may include optional Vexa-encoded data output path 1492.

Vexa codec subsystems 1452 include: channel processor subsystem 1462, which is configured to convert input frame data to YCbCr and distribute channel data as needed; Vexa encoder 1464, which is configured to apply wavelet transforms to video data and compress data; Vexa decoder 1466, which is configured to apply an inverse wavelet transforms and/or otherwise decode Vexa-encoded data; frame buffer subsystem 1468, which is configured to store one or more channels of video frame data; difference operation subsystem 1470, which is configured to produce difference frame data from multiple frame input data; filter subsystem 1472, which is configured to filter video frame data; frame buffer subsystem 1474, which is configured to store one or more channels of video frame data; and summation operation 1476, which is configured to combine the data of multiple input video frames.

H.264 subsystems 1454 include H.264 encoder 1460, which is configured to accept video frame data and produce H.264-encoded video data.

Video frame data is conveyed to Vexa subsystems 1452 on frame data input path 1456 and on to channel processor subsystem 1462. Channel processing 1478 transforms input frame data to YCbCr luma/chroma color space. YCbCr frame data is stored in frame buffer subsystem 1468 and is also sent to Vexa encoder 1464.

Vexa encoder processing 1480 includes the application of a wavelet transform one or more times to video data and may result in lossless or lossy compression. Transformed frame data is then sent to Vexa decoder 1466, where processing 1482 includes the application of the inverse wavelet transform. Resulting frame data is sent to frame buffer subsystem 1474 and to difference operation subsystem 1470.

Difference operation subsystem 1470 is applied to frame data from frame buffer subsystem 1468 and frame data from Vexa decoder 1466 and outputs difference frame data. The purpose of difference operation subsystem 1470 is to isolate higher frequency data lost in the wavelet encoding/decoding process. This includes desirable edge data.

The difference operation is carried out pixel by pixel over the frame, and differences data are sent to filter operation subsystem 1472. Filter processing 1484 filters frame data so that values that emerge from filter operation subsystem 1472 include needed edge data.

Summation operation subsystem 1476 performs pixel by pixel combining of the output of filter operation subsystem 1472 with the frame data stored in frame buffer subsystem 1474. The data resulting from summation processing 1486 is sent from Vexa subsystems 1452 on handoff path 1488 to H.264 encoder 1460.

H.264 processing 1490 encodes frame data received over handoff path 1488 and conveys the resulting H.264-encoded data to encoded data output path 1458.

If Vexa-encoded data is conveyed from Vexa encoder 1462 over optional output path 1492, then system 1250 also includes a duplex encoder with the trivial multiplex encoder output architecture.

When applied to raw video data or to mezzanine video data, the basic Vexa-to-H.264 encoder system creates an encoded video product with edge quality comparable to that of the simple H.264 alone. Video decoded from the Vexa-to-H.264 product presents fewer artifacts and distinctly better color than the decoded product of the simple H.264 codec. The two systems provide similar compression, and the interacting system produces video with as good or better viewing quality than the simple H.264 codec.

Serial X-to-Y-to-Z Encoders, where Y Accepts Interlaced Video Frame Data as Input and Outputs Encoded Same-Resolution Progressive Video Data.

One or more embodiments of the Vexa encoder accepts interlaced video frame data as input and outputs Vexa-encoded progressive video data with the same aspect ratio and resolution. For example, 1920×1080i becomes 1920×1080p and 1080×720i becomes 1080×720p. If Y is a Vexa codec, then a serial X-to-Y-to-Z encoder accepts interlaced video frame data as input and outputs same-resolution progressive video. A serial X-to-Y-to-Z encoder has been defined as an X-to-(Y-to-Z) encoder. One or more embodiments of a Vexa-to-Z encoder accept interlaced video frame data and output Z-encoded same-resolution progressive video data, and one or more embodiments of an X-to-(Vexa-to-Z) encoder accept interlaced video frame data and output (Vexa-to-Z)-encoded (that is, Z-encoded) same-resolution progressive video data. In one or more embodiments, serial encoder X-to-Vexa-to-Z encoder accepts interlaced video frame data and outputs Z-encoded same-resolution progressive video data. In one or more embodiments, serial Z-to-Vexa-to-Z encoder accepts interlaced video frame data and outputs Z-encoded same-resolution progressive video data. Interlaced video data includes video data in accord with most interlaced formats or standards, including 1080i, 720i, and any other interlaced format and/or standard, whether conventional or unconventional (e.g., vertically interlaced or interlaced at any other angle and/or in any alternating bar pattern).

Figure 15:
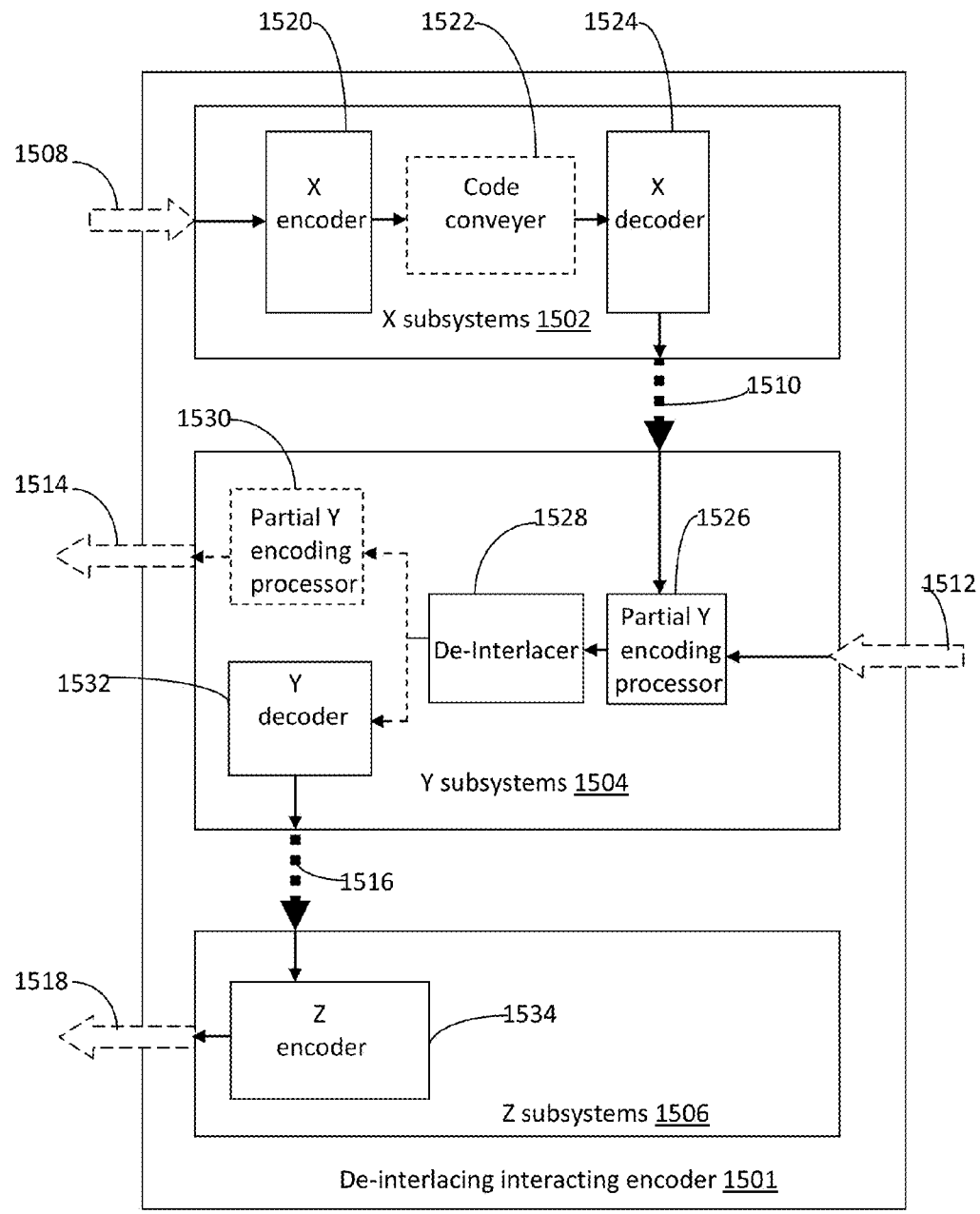
FIG. 15 illustrates exemplary systems for a de-interlacing interacting encoder in accordance with one or more embodiments of video multi-codec encoders.

FIG. 15 illustrates an exemplary serial X-to-Y-to-Z encoder with several optional input, output, and handoff paths in accordance with one or more embodiments of video multi-codec encoders. The use or non-use of such optional paths allows FIG. 15 to exemplify one or more embodiments of a Y-to-Z encoder with or without a Y-encoded video data output, an X-to-Y encoder, and a serial X-to-Y-to-Z encoder that may also output Y-encoded video data. FIG. 15 also illustrates one or more embodiments in which X encoder subsystems are distributed over multiple geographical locations and communicate by any method, including electronic transmission, electromagnetic transmission, movable storage methods, immovable storage methods, or any other method. In one or more embodiments, one or more other data paths shown in this and other exemplary figures are implemented by one or more of such methods.

FIG. 15 displays a system diagram for a de-interlacing interacting encoder. System 1500 represents one or more embodiments of de-interlacing interacting encoder 1501. In one or more embodiments, de-interlacing interacting encoder 1501 is an X-to-Y encoder and includes video frame data input path 1508, codec X subsystems 1502, XY handoff path 1510, codec Y subsystems 1504, and Y-encoded data output path 1514. In one or more embodiments, de-interlacing interacting encoder 1501 is a Y-to-Z encoder and includes video frame data input path 1512, codec Y subsystems 1504, YZ handoff path 1516, codec Z subsystems 1506, and Z-encoded data path 1518. In one or more embodiments, de-interlacing interacting encoder 1501 is a serial X-to-Y-to-Z encoder and includes video frame data input path 1508, codec X subsystems 1502, XY handoff path 1510, codec Y subsystems 1504, YZ handoff path 1516, codec Z subsystems 1506, and Z-encoded data path 1518.

In one or more embodiments, codec X subsystems 1502 are present and include at least one of X encoder 1520, code conveyer 1522, or X decoder 1524. In one or more embodiments, codec X subsystems 1502 include X encoder 1520, which is configured to accept video frame data as input and output X-encoded video data. In one or more embodiments, codec X subsystems 1502 include code conveyer 1522, which conveys data from a place and/or time to one or more places and/or later times. If code conveyer 1522 is not present in codec X subsystems 1502, then it is replaced with a path that carries data from X encoder 1520 to X decoder 1524. In one or more embodiments, codec X subsystems 1502 include X decoder 1524, which is configured to accept X-encoded video data as an input and outputs X-decoded video frame data. In one or more embodiments, video frame data input path 1508 conveys video frame data to codec X subsystems 1502. In one or more embodiments, XY handoff path 1510 conveys data from codec X subsystems 1502 to codec Y subsystems 1504.

In one or more embodiments, codec Y subsystems 1504 are present and include at least one of partial Y encoding processor 1526, de-interlacer 1528, partial Y encoding processor 1530, or Y decoder 1532. In one or more embodiments, codec Y subsystems 1504 include partial Y encoding processor, which is configured to accept video frame data as input and output at least partially processed video data. In one or more embodiments, codec Y subsystems 1504 include de-interlacer 1528, which is configured to convert at least partially processed interlaced video data to at least partially processed same-resolution progressive video data. Codec Y subsystems 1504 include X decoder 1524, which is configured to accept X-encoded video data as an input and output video frame data. In one or more embodiments, partial Y encoding processor 1530 is configured to complete the encoding process and output Y-encoded video data. In one or more embodiments, Y decoder 1532 is configured to accept partially Y encoded video data and output decoded video data. In one or more embodiments, XY handoff path 1510 conveys video frame data to codec Y subsystems 1504. In one or more embodiments, input path 1512 conveys video frame data to codec Y subsystems 1504. In one or more embodiments, output path 1514 conveys Y-encoded video data from codec Y subsystems 1504. In one or more embodiments, YZ handoff path 1516 conveys data from codec Y subsystems 1504 to codec Z subsystems 1506.

In one or more embodiments, codec Z subsystems 1506 are present and include Z encoder 1534, which is configured to accept video frame data and output Z-encoded video data. In one or more embodiments, YZ handoff path 1516 conveys video frame data from codec Y subsystems 1504 to codec Z subsystems 1506. In one or more embodiments, output path 1518 conveys Z-encoded video data from codec Z subsystems 1506.

In one or more embodiments of a de-interlacing interacting encoder, de-interlacing interacting encoder 1501 is a serial X-to-Y-to-Z encoder, and video frame data is input to de-interlacing interacting encoder 1501 on video frame data input path 1508 and conveyed to X encoder 1520, where video frame data are X-encoded. In one or more embodiments, X-encoded video data is then conveyed to X decoder 1524 by code conveyer 1522. In one or more embodiments, code conveyer 1522 may be a broadcasting methodology, a point-to-point conveyance, a wireless conveyance, a conveyable intermediate storage device, a combined storage and transmission system, or any other method for communicating or conveying data. In one or more embodiments, X decoder 1524 decodes X-encoded video data and outputs video frame data over XY handoff path 1510 to codec Y subsystems 1504.

In one or more embodiments, video frame data reaching codec Y subsystems 1504 over path YZ handoff path 1510 is conveyed to partial Y encoding processor 1526, where video frame data is partially processed. In one or more embodiments, partially processed video data is conveyed from partial Y encoding processor to de-interlacer 1528, where partially processed interlaced video input data is converted to partially processed same-resolution progressive video output data. In one or more embodiments, de-interlaced video data is conveyed from de-interlacer 1528 to Y-decoder 1532, which generates progressive video frame data. In one or more embodiments, progressive video frame data is conveyed from codec Y subsystems 1504 to codec Z subsystems 1506 over YZ handoff path 1516.

In one or more embodiments, partially encoded progressive video data is conveyed to partial Y encoding processor 1530, which generates Y-encoded progressive video data. In one or more embodiments, Y-encoded progressive video data is output from codec Y subsystems 1504 over external output path 1514.

In one or more embodiments, codec Z subsystems 1506 receive progressive video frame data over YZ handoff path 1516. In one or more embodiments, Z encoder receives progressive video frame data from YZ handoff path 1516 and outputs Z-encoded progressive video data over Z-encoded data path 1518.

In one or more embodiments, system 1500 is a duplex encoder, with Y-encoded video data on path 1514 and Z-encoded data on path 1518.

Figures 18A, 18B:
FIGS. 18A-18B are exemplary images illustrating same-resolution interlace-to-progressive conversion in a serial X-to-Y-to-Z encoder in accordance with one or more embodiments of video multi-codec encoders.

FIGS. 18A-18B shows a gray-scale rendition of a video frame from Ballerina. FIG. 18A shows the superposition of two successive oppositely interlaced 1920×1080i video frames. At first glance, this video image has the appearance of a double exposure. This appearance arises from the fact that the relationship between the camera and the video image has changed during the passage of time between the pair of successive, oppositely interlaced frames. If a pair of successive interlaced video frames is input to a serial X-to-Y-to-Z encoder, where Y is a Vexa codec, then in one or more embodiments the serial interacting encoder processes each frame separately, producing a pair of encoded progressive frames. In one or more embodiments, the serial interacting encoder outputs superimposed frames from oppositely interlaced frames. The video image shown in FIG. 18A is typical of such a superposition when significant motion is involved. In one or more embodiments, the Vexa codec processes these overlays to produce full-resolution video frames and introduce them to codec Z subsystems for final Z-encoding.

FIG. 18A shows the decoded output of the interlaced frames before being input to a serial X-to-Y-to-Z encoder, where Y is a Vexa codec. Interlacing is obvious, especially parts of the image that are moving horizontally with respect to the camera. Close examination of the image just above the point where the tree trunk branches, reveals that the interlace bars to the right of the left hand branch and the interlace bars to the left of the right hand branch are from two successive interlaced frames—that is, the first set of bars is complementary to the second set of bars. The frame-to-frame regularity of these bars can create persistent, visible artifacts to the video viewer, including visual twitter.

This is to be compared with the video image shown in FIG. 18B, the non-interlaced image that replaces the superimposed pair of frames of FIG. 18A. The experience of a viewer seeing this image as part of a video is identical to that of seeing the successive interlaced video images except that the formerly visible horizontal bar artifacts have been eliminated along with all interline twitter.

This highlights a major difference between viewing individual images and viewing a sequence of frames shown at a suitable frame rate.

Because Vexa has a high quality, same-resolution de-interlacer subsystem, one or more embodiments of interacting encoders that include Vexa convert interlaced video to good quality progressive video of the same resolution. For example, one or more embodiments of a serial Z-to-Vexa-to-Z encoder replace what would have been Z-encoded interlaced video data with Z-encoded progressive video.

In one or more embodiments of a serial X-to-Vexa-to-Z encoder, X-encoded interlaced video is transmitted to a destination for X-decoding, its X-decoded frame data product is input to a Vexa-to-Z encoder, and the Z-encoded product is Z-encoded progressive video data. As a whole, this system is a serial X-to-Vexa-to-Z encoder.

If an X encoder is processing interlaced video, one or more embodiments of an X-to-Vexa encoder process the interlaced video input to the X encoder and output Vexa-encoded progressive video data.

Suppose a video distributor prefers to convey video using codec Z but also wants to provide end users with progressive video, in spite of the fact that the distributor's video is in interlaced format. One or more embodiments of a Vexa-to-Z encoder convert interlaced video frame data to Z-encoded progressive video data as shown in FIGS. 18A-18B.

Serial DIVX-to-Vexa-to-H.264 Encoders, where Vexa Anti-Blocking Processes Improve a Video Product.

In one or more embodiments of a serial X-to-Y-to-Z encoder, where X is DIVX codec DX50, Y is wavelet and channel based codec Vexa, and Z is the Intel IPP H.264 codec. One or more embodiments of the Vexa codec include edge enhancement processes, as described in FIGS. 14A-B, as well as a non-iterative anti-blocking process. DIVX is a DCT-based codec and is subject to introducing blocking artifacts into its video product. Such artifacts are faithfully preserved if the DIVX video product is re-encoded using an H.264 codec. By using a serial DIVX-to-Vexa-to-H.264 encoder, any blocky frames created by DIVX can be improved through Vexa processing. At the same time, edge enhancement processes in Vexa help preserve edge quality present in the DIVX output for final H.264 encoding.

Figure 16:
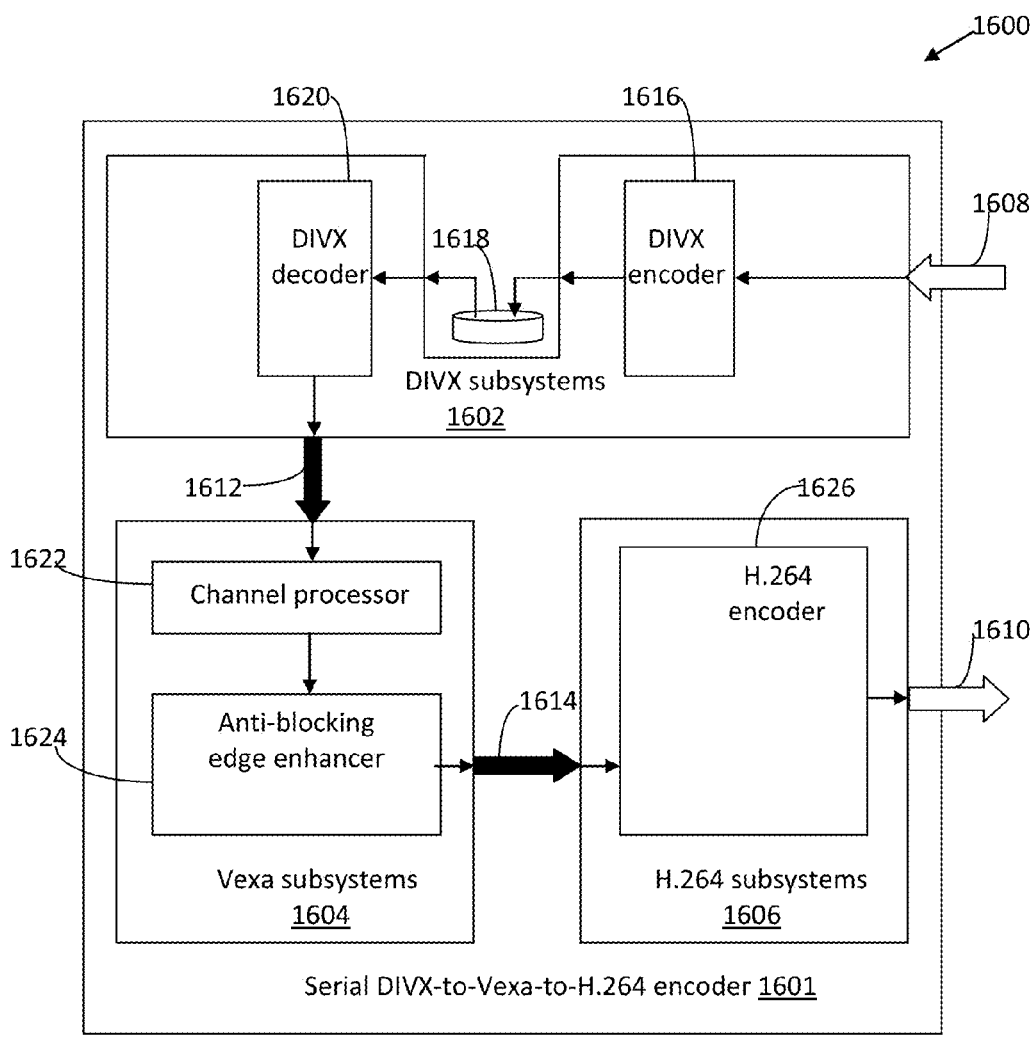
FIG. 16 illustrates a serial DCT-based X-to-wavelet based Y-to-DCT-based Z encoder with edge enhancement and anti-blocking in accordance with one or more embodiments of video multi-codec encoders.

FIG. 16 illustrates one or more embodiments of a serial X-to-Y-to-Z encoder with anti-blocking edge-enhancement properties. FIG. 16 illustrates one or more such embodiments with system 1600 diagram for a serial DIVX-to-Vexa-to-H.264 encoder 1601. Serial DIVX-to-Vexa-to-H.264 encoder 1601 includes DIVX subsystems 1602, Vexa subsystems 1604, and H.264 subsystems 1606, memory storage system 1618, video frame data input path 1608, and H.264-encoded data output path 1610.

In these embodiments, DIVX subsystems 1602 include DIVX encoder subsystem 1616 and DIVX encoder subsystem 1620. Vexa subsystems 1604 include channel processor subsystem 1622 and anti-blocking edge enhancer 1624. H.264 subsystems 1606 include H.264 encoder subsystem 1626.

DIVX encoder subsystem 1616 is configured to accept video frame data and output DIVX-encoded video data. DIVX decoder subsystem 1620 is configured to accept DIVX-encoded video data and output decoded video frame data.

Channel processor subsystem 1622 is configured to convert input frame data to YCbCr. Anti-blocking edge enhancer subsystem 1624 is configured to reduce blocking artifacts while applying edge enhancement processes 1466-1476 described in FIGS. 14A-B.

H.264 encoder subsystem 1626 is configured to encode video frames and produce H.264-encoded video data.

Memory storage subsystem 1618 is configured to store data and output stored data on demand and at bit rates as required.

DIVX subsystems 1602 receive video frame data over frame data input path 1608. Video frame data is conveyed to DIVX encoder 1616, where DIVX encoder 1616 encodes video frame data and stores it on memory storage system 1618. Later, DIVX-encoded video data is accessed on memory storage subsystem 1618 and input to DIVX decoder subsystem 1620. Decoded video frame data is conveyed over DIVX-Vexa handoff path 1612 from DIVX subsystems 1602 to Vexa subsystems 1604.

Video frame data is conveyed from DIVX-Vexa handoff path 1612 to channel processor subsystem 1622, where input color data is converted to YCbCr if necessary. Channel processor subsystem 1622 transmits color channel data to anti-blocking edge enhancer subsystem 1624. In the course of processes 1466-1476, edge data is recovered and much blocking and other artifact data is discarded. The result is that blocking and other artifacts in the frame data received over handoff path 1612 are reduced while essential edge data present in the DIVX output is preserved for H.264 processing. Video frame data output from anti-blocking edge enhancer subsystem 1624 is conveyed over Vexa-H.264 handoff path 1614 to H.264 subsystems 1606.

H.264 encoder 1626 receives video frame data from handoff path 1614, encodes the data, and sends the encoded data to encoded video data output path 1610. H.264-encoded video data is then output on H.264-encoded data output path 1610 for transmission or storage.

Figures 19A, 19B:
FIGS. 19A-19B are exemplary images showing an application of anti-blocking in a serial X-to-Y-to-Z encoder in accordance with one or more embodiments of video multi-codec encoders.

The blocking reduction that can result from this process is illustrated in a 1080×720p video frame from a 2005 trailer for the movie Madagascar that was processed in two ways and shown in FIGS. 19A-19B. Negative imagery is used in this figure to enable the viewer to see blocking artifacts on paper that are much more apparent on a display or screen. FIG. 19A shows the Captain, an animated character in the movie. The blocking artifacts are most visible on the left cheek (from the viewer's point of view), extending over the bridge of his nose, with smaller blocks along the top and left edge of his mustache. This image has the appearance of the video frame handed off to the Vexa codec and is how it would have appeared if it had been displayed at that point. If the video had been re-encoded by an H.264 codec, these artifacts would have been faithfully preserved, possibly with additional blocking artifacts. In the course of Vexa processing, the Vexa reduced the artifacts to those of FIG. 19B. With reduced severity of input artifacts, the H.264-encoded product is able to display better video quality.

Multi-Featured Vexa-to-H.264 Encoders.

In one or more embodiments of a Y-to-Z interacting video encoder, Y includes one or more subsystems designed to enhance the encoded video product. One or more embodiments of wavelet-based, channel based high definition video codec, Vexa, include working subsystems as described. Each of these subsystems is described in a previous example. Any codec Y that includes one or more subsystems with similar functionality and any codec Z capable of interacting with Y give rise to one or more embodiments of a Y-to-Z encoder with such functionality.

Figure 17:
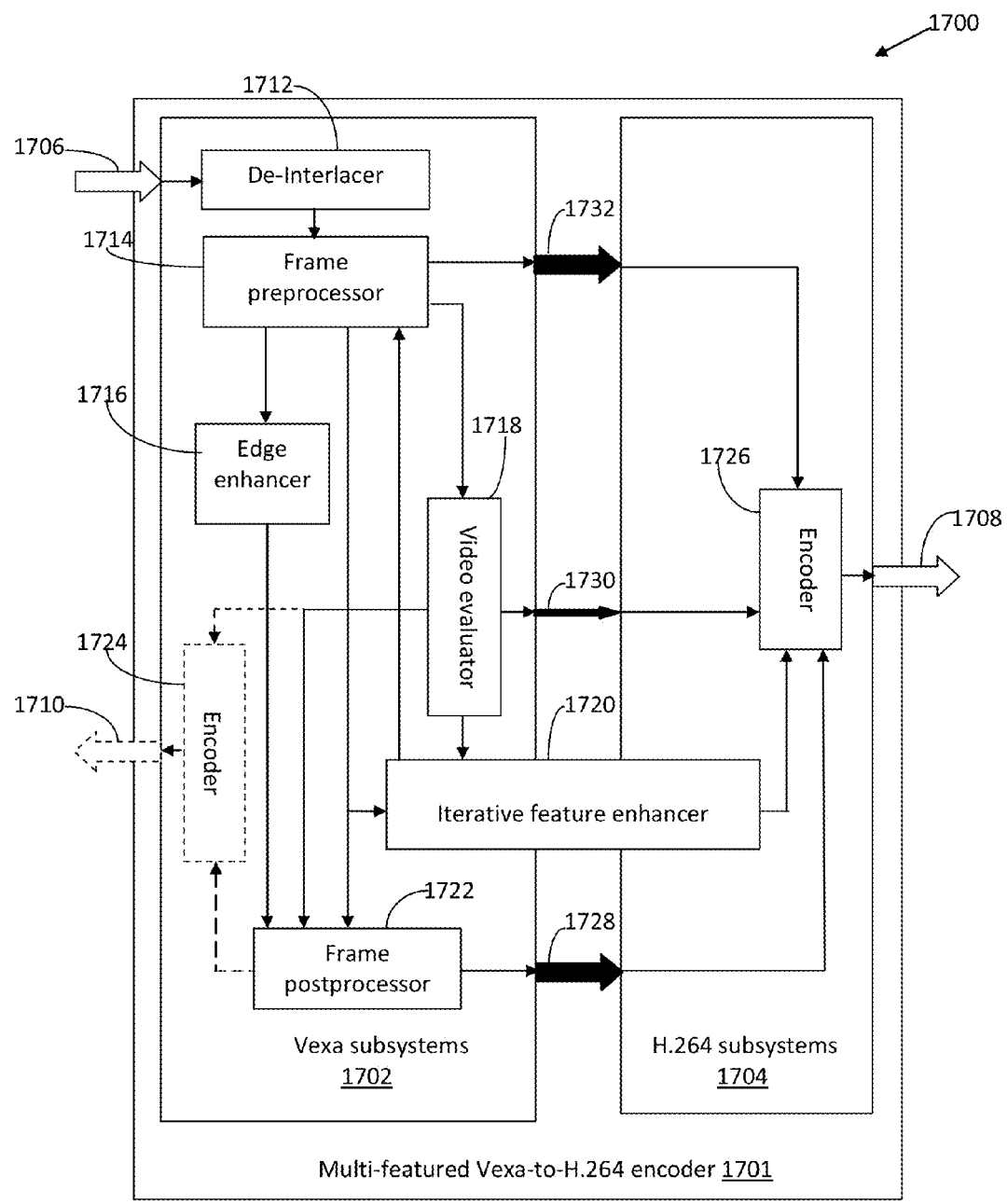
FIG. 17 illustrates a multi-featured W-to-DCT based encoder in accordance with one or more embodiments of video multi-codec encoders.

FIG. 17 represents an exemplary Y-to-Z interacting encoder in accordance with one or more embodiments of video multi-codec encoders, where Y is a Vexa codec and Z is an Intel IPP H.264 codec. Vexa provides same-resolution de-interlacing if needed, frame preprocessing that includes channel conversion as needed and frame-screening for blocking risk, edge enhancement to ensure sharp edges in the viewable video product, single and multiple frame analyses to optimize encoding processes and products, the ability to carry out iterative processes involving multiple codecs until target feature criteria are met, and final frame preparation processes to ensure high quality encoding by the Z encoder. (See FIGS. 11A-14B.)

FIG. 17 illustrates one or more embodiments of a Vexa-to-H.264 encoder with the features just described. System 1700 represents one or more embodiments of multi-featured Vexa-to-H.264 encoder 1701. Multi-featured Vexa-to-H.264 encoder 1701 includes Vexa subsystems 1702, H.264 subsystems 1704, video frame data input path 1706, and H.264-encoded data output path 1708.

Vexa subsystems 1702 include de-interlacer subsystem 1712, frame preprocessor subsystem 1714, edge enhancer subsystem 1716, video evaluator subsystem 1718, Vexa subsystems included in iterative feature enhancer system 1720, and possibly Vexa encoder 1724. De-interlacer subsystem 1712 is configured to test for interlaced video and, if interlaced, to create superimposed pairs of successive frames as appropriate and process each superimposed pair to produce a single same-resolution progressive video frame. Frame processor subsystem 1714 is configured to perform channel processing (including color conversion as needed, separate or joint transmission of data channels, and any other channel-based operation), testing frames for blocking risk, and storage of frame channel data. Edge enhancer subsystem 1716 is configured to apply Vexa compression and decompression, compare the resulting frame to the original to recover lost data, extract edge data from recovered data, and package edge data with compressed data for later processing. Video evaluator subsystem 1718 is configured to analyze individual frame and groups of frames and produce control signals that facilitate improved processing by H.264 and Vexa. Frame postprocessor subsystem 1722 is configured to process and assemble video data inputs and output video frame data. If in use, optional Vexa encoder subsystem 1724 is configured to receive video frame data and processing control signals and settings and to output Vexa-encoded video data.

H.264 subsystems 1704 include H.264 encoder 1726 and H.264 subsystems included in iterative feature enhancer 1720. H.264 encoder subsystem 1726 is configured to accept video frame data and processing control signals and settings and to output H.264-encoded video data.

Iterative feature enhancer system 1720 includes one or more subsystems of Vexa subsystems 1702 and/or H.264 subsystems 1704, together with unspecified communication paths between Vexa subsystems 1702 and H.264 subsystems 1704. Iterative feature enhancer system 1720 is configured to provide iterative processing services that involve one or both codecs, with the goal of satisfying one or more criteria as specified by control signals, configuration signals, frame features, or any other kind of criteria.

Vexa-H.264 handoff path 1728 conveys data, including video frame data, from Vexa subsystems 1702 to H.264 subsystems 1704. Vexa-H.264 handoff path 1730 conveys control signals and/or settings from Vexa subsystems 1702 to H.264 subsystems 1704. Vexa-H.264 handoff path 1732 conveys data, possibly including video data, from Vexa subsystems 1702 to H.264 subsystems 1704.

Video processing steps of multi-featured Vexa-to-H.264 encoder 1701 are now described. Video frame data enters system 1700 and is conveyed to Vexa subsystems 1702 over frame data input path 1706. Frame data is conveyed to de-interlacer subsystem 1712. If video frames are progressive, they are passed to frame preprocessor 1714. If video frames are presented in interlaced format, de-interlacer subsystem 1712 alternately saves and superimposes video frames. De-interlacer subsystem 1712 converts each superimposed pair of interlaced frames into a single same-resolution progressive frame and passes the frame to frame processor subsystem 1714.

Frame preprocessor subsystem 1714 performs any color or other channel conversion required, whether for Vexa, H.264, or an encoder application such as for 3-D viewing. If a luma channel is created, luma and chroma channels are sent to some Vexa subsystems, including video evaluator subsystem 1718, frame postprocessor subsystem 1722 and, possibly, iterative feature enhancer subsystem 1720. Luma data may be provided with or without chroma data to other subsystems, such as edge enhancer subsystem 1716 and, if only blocking reduction is involved, to iterative feature enhancer subsystem 1720. Frame preprocessor subsystem 1714 retains a copy of one or more preprocessed channels if needed for later use. For example, if iterative blocking reduction is in use for a frame, a copy of the original luma channel may be released by frame processor subsystem 1714 and sent over Vexa-H.264 handoff path 1732 to H.264 encoder 1726.

Edge enhancer subsystem 1716 receives video frame data from frame preprocessor subsystem 1714 and stores a copy of preprocessed frame data for later use. Edge enhancer subsystem 1716 continues processing as described in FIG. 14B until the final data summation step 1476 is reached. Instead of summing edge data and decoded Vexa-compressed data as in summation subsystem 1476, the two inputs to summation subsystem 1476 are conveyed from edge enhancer subsystem 1716 to frame postprocessor subsystem 1722.

Video evaluator subsystem 1718 receives channel data from frame preprocessor subsystem 1714. Video evaluator subsystem 1718 processes each frame, evaluating selected metrics and computing control signals that improve the processing of that frame by Vexa subsystems 1702 and H.264 subsystems 1704. Video evaluator subsystem 1718 includes a frame sequence analyzer that processes sequences of frames, evaluates selected metrics, and computes control signals that improve the processing of sequences of frames by H.264 subsystems 1704 and Vexa subsystems 1702. Control signals and other data pertinent to H.264 processing that are developed by video evaluator 1718 are conveyed over Vexa-H.264 handoff path 1730 to H.264 subsystems 1704 and on to H.264 encoder 1726.

Depending on control signals from video evaluator subsystem 1718, iterative feature enhancer system 1720 may or may not be engaged to optimize one or more features of a frame, to satisfy compression or bandwidth requirements, to facilitate decoding performance, or for any other objective. For example, if frame preprocessor subsystem 1714 and/or video evaluator subsystem 1718 have determined that the current frame requires iterative blocking reduction, then iterative feature enhancer would receive frame luma data from frame preprocessor subsystem 1714. The process would be iterated as described in FIG. 12B. When iterative feature enhancer system 1720 satisfied its completion criteria, the required quantization determined by the process would be sent from iterative feature enhancer system 1720 to H.264 encoder 1726, and iterative feature enhancer system 1720 would signal frame preprocessor subsystem 1714 to release its stored frame to H.264 subsystems 1704. H.264 encoder 1726 would then accept frame data from frame preprocessor subsystem 1714 over Vexa-H.264 handoff path 1732 and encode the luma channel with the quantization required to reduce or eliminate blocking.

Frame postprocessor subsystem 1722 receives Vexa-compressed and decoded frame data and edge data from edge enhancer subsystem 1716, control and other data from video evaluator subsystem 1718, and processed video data including channel data from frame preprocessor subsystem 1714. From these inputs, frame postprocessor subsystem 1722 assembles high quality input frames and optimizing control signals and other data for H.264 subsystems and conveys that data to H.264 subsystems 1704 over Vexa-H.264 handoff path 1728.

If H.264 encoder 1726 receives instructions from iterative feature enhancer system 1720, for example, to process video frame data received over handoff path 1732, then H.264 encoder 1726 encodes as instructed and outputs encoded video data over H.264-encoded data output path 1708. Otherwise, H.264 encoder 1726 processes video frame data received over Vexa-H.264 handoff path 1728 in accord with signals and instructions received over Vexa-H.264 handoff paths 1730 and 1728. H.264 encoder 1726 outputs H.264-encoded video data on encoded video data output path 1708.

If Vexa-encoded video data is desired, then frame preprocessor subsystem 1722 also assembles video frame data along with optimizing control data, and other operations, for Vexa encoding. This data is conveyed from frame processor subsystem 1722 to Vexa encoder 1724. Vexa encoder 1724 processes the video data it receives in accord with the control and other received data and outputs Vexa-encoded video data on optional Vexa-encoded data output path 1710. In that case, system 1700 also includes a duplex encoder with the trivial output architecture.

Complementary Duplex Encoder Systems.

Several varieties of interacting encoder systems have been illustrated, and most were shown as extensible to a duplex encoder system. Complementary duplex encoder systems represent a class of duplex encoders for which the pair of output encoders may possess differing strengths and weaknesses. For example, codec Y may well preserve low spatial frequencies of a video, while codec Z handles high spatial frequencies better. Or codec Y may better preserve the full range and depth of color imagery, while codec Z handles luma data especially well. Or, in a 3-D application, codec Y may handle RGB color data quite well, while codec Z is especially efficient in handling depth data. A complementary duplex encoder is a duplex encoder that combines two dissimilar codecs such that the resulting displayed video possesses the best features of each. There are many dozens of different codecs, each designed to handle a certain range of applications well. Each of numerous complementary pairings could be advantageously integrated as a complementary duplex encoder.

A sample architecture for a complementary duplex encoder is described. Then more specific embodiments are presented in detail. In one or more embodiments, the merged output architecture is replaced by any other multiplex encoder output architecture. The data preparation subsystems shown in the figures may be enhanced, modified, eliminated, or replaced, as appropriate for specific codecs X and Y.

In one or more embodiments, encoder X outputs a data stream of lossy X-encoded video. The X-encoded data stream is then decoded back into video frame data by an X-decoder. Because the X encoding process is lossy, the X-decoded video differs from the original. The frame-by-frame difference between the original and decoded frames represents original frame data that will not be displayed to the viewer. If that difference data includes edge data, for example, X-decoded video may not appear as sharp as the original.

If codec Y has strengths and weaknesses that differ from those of codec X, for example, if codec Y is especially effective in preserving edge data, then the difference frames, which contain edge data missing from X-decoded video, may be processed by codec Y and edge data may then be captured in the Y-encoded data stream. If X-encoded data streams and Y-encoded data streams are now synchronized and decoded, two versions of each video frame are available for display. The X-decoded version may lack only the data required for sharp edges, while the Y-decoded version provides the missing edge data. If these two versions are digitally combined and displayed, the resulting video provides the advantageous qualities of each.

Figure 21A:
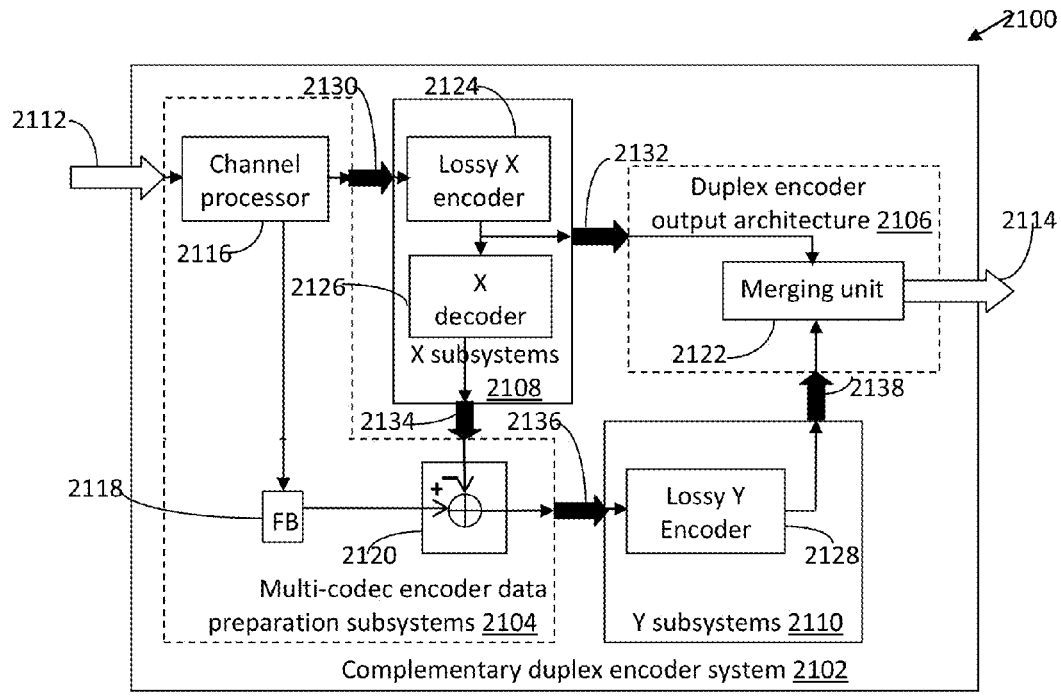
FIGS. 21A-21B illustrates exemplary complementary duplex encoder systems in accordance with one or more embodiments of video multi-codec encoders.

FIG. 21A displays an architecture for a complementary duplex encoder system. Architecture 2100 illustrates one or more embodiments of complementary duplex encoder system 2102. In one or more embodiments, complementary duplex encoder system 2102 includes duplex encoder output architecture 2104, duplex encoder output architecture 2106, codec X subsystems 2108, codec Y subsystems 2110, video frame data input path 2112, and duplex encoded data path 2114.

In one or more embodiments, duplex encoder output architecture 2104 includes one or more of: channel processor subsystem 2116, frame buffer subsystem 2118, and frame differencing subsystem 2120. In one or more embodiments, channel processor subsystem 2116 conveys unprocessed input data to its output paths. In one or more embodiments, channel processor subsystem 2116 is configured to transform color space coordinates, separate and deliver one or more data channels appropriately, and/or perform other channel-related operations. Frame buffer subsystem 2118 is configured to store one or more channels of video data. Differencing subsystem 2120 is configured to calculate and generate frame data representing the difference between two frame data input sources.

In one or more embodiments, duplex encoder output architecture 2106 includes merging unit 2122. Merging unit 2122 is configured to synchronize and merge two encoded video data streams into a single data stream for transmission or storage.

In one or more embodiments, codec X subsystems 2108 include lossy X encoder 2124 and/or X decoder 2126. Lossy X encoder 2124 is configured to compress and encode one or more channels of frame data into an X-decodable data stream. X decoder 2126 is configured to decode X-decodable data into video frame data.

In one or more embodiments, codec Y subsystems 2110 include lossy Y encoder 2128. Lossy Y encoder 2128 is configured to compress and encode one or more channels of video frame data into a Y-decodable data stream.

The processing of video frame data by complementary duplex encoder system 2102 is now described. In one or more embodiments, video frame data is input to complementary duplex encoder system 2102 on video frame data input path 2112 and conveyed to channel processor subsystem 2116 of duplex encoder output architecture 2104. In one or more embodiments, channel processor subsystem 2116 processes, separates, and distributes channel-based frame data as needed by duplex encoder output architecture 2104, codec X subsystems 2108, and codec Y subsystems 2110. For example, different subsystems may process different data channels and/or require color transformations. In particular, one or more frame data channels may be conveyed from channel processor subsystem 2116 to frame buffer subsystem 2118, where frame data is stored. One or more data channels may be conveyed from channel processor subsystem 2116 over handoff path 2130 to codec X subsystems 2108 and on to lossy X encoder 2124, where frame data is compressed and X-encoded. In one or more embodiments, X-encoded data is conveyed to duplex encoder output architecture 2106 over handoff path 2132 and on to merging unit 2122. In one or more embodiments, X-encoded data is also conveyed to X decoder 2126, which converts one or more channels of X-encoded data back to video frame data. In one or more embodiments, decoded channel data is conveyed over handoff path 2134 to differencing subsystem 2120 of duplex encoder output architecture 2104. In one or more embodiments, frame buffer subsystem 2118 and X-decoder 2126 feed same-frame data to differencing subsystem 2120. In one or more embodiments, differencing subsystem 2120 compares X-decoded frame data to corresponding pre-encoded frame data originally from channel processing subsystem 2116 and stored in frame buffer subsystem 2118, and computes difference frame data. Differencing subsystem 2120 outputs difference frame data which, in one or more embodiments, is conveyed over handoff path 2136 to lossy Y encoder 2128 of codec Y subsystems 2110. In one or more embodiments, lossy Y encoder 2128 Y-encodes difference frames and conveys Y-encoded data over handoff path 2138 to merging unit 2122 of duplex encoder output architecture 2106. In one or more embodiments, merging unit 2122 synchronizes arriving Y-encoded data with corresponding X-encoded data and merges them into a single data stream for transmission or storage. In one or more embodiments, merging unit 2122 outputs merged X- and Y-encoded data streams over duplex encoder system encoded data output path 2114.

Figure 21B:
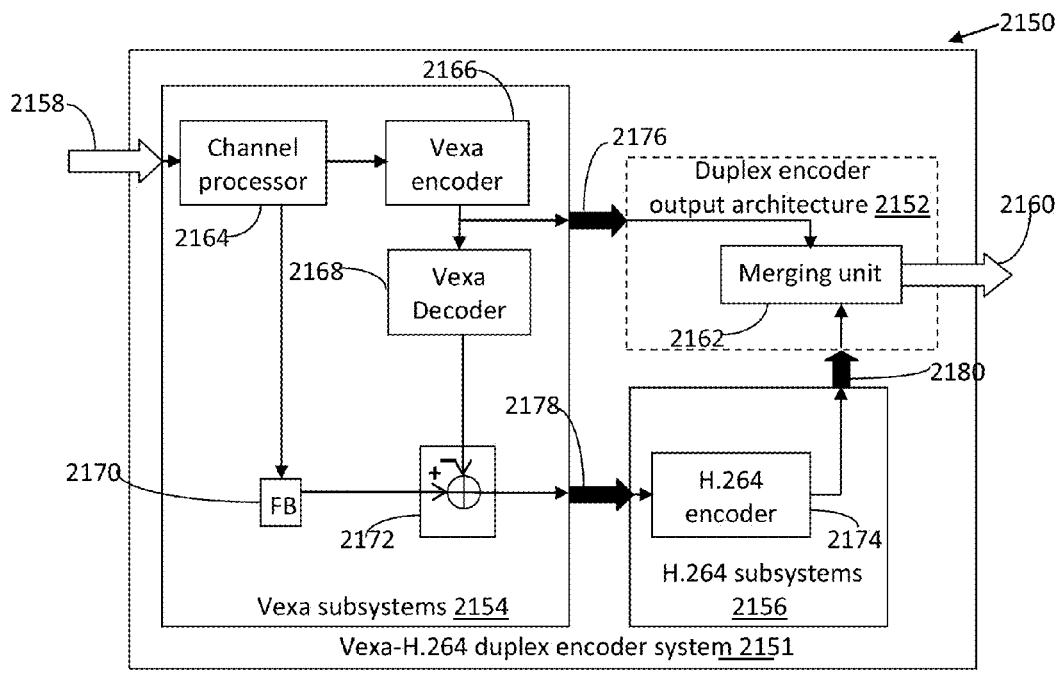

FIG. 21B illustrates a Vexa-H.264 duplex encoder system. There are several high quality DCT-based codecs, including WebM, VC-1, and H.264 codecs, that preserve image edges very well. In one or more embodiments, any of these or other edge-preserving codecs could readily be substituted for codec Y of FIG. 21A, replacing the Intel IPP H.264 codec without significantly changing the architecture or description below. Vexa is substituted for the X encoder of FIG. 21A because, as a wavelet-based codec, Vexa well-complements the edge-preserving strengths of its partner codec. Furthermore, Vexa subsystems include a wide variety of data preparation subsystems, including channel processors, frame buffers, and differencing devices. Other Vexa subsystems mentioned previously may be used to further improve the quality of the DCT encoder product but are omitted for simplicity.

Creating a duplex encoder system by combining Vexa with a high quality edge-preserving codec has additional merit. A major limitation of wavelet-based codecs is loss of sharp edges under high, lossy compression. A duplex encoder system that includes a high quality edge-preserving encoder makes it possible for the wavelet-based encoder to engage in unprecedented levels of compression without compromising the system output.

Duplex encoder system 2150 illustrates one or more embodiments of Vexa-H.264 duplex encoder system 2151. In one or more embodiments, Vexa-H.264 duplex encoder system 2151 includes duplex encoder output architecture 2152, Vexa subsystems 2154, H.264 subsystems 2156, video frame input data path 2158, and duplex encoded data path 2160.

In one or more embodiments, Vexa-H.264 duplex encoder output architecture 2152 includes merging unit 2162. Merging unit 2162 is configured to synchronize and merge two encoded video data streams into a single data stream for transmission or storage.

In one or more embodiments, Vexa subsystems 2154 include channel processor subsystem 2164, Vexa encoder 2166, Vexa decoder 2168, frame buffer subsystem 2170, and frame differencing subsystem 2172. Channel processor subsystem 2164 is configured to transform color space coordinates to the YCbCr color space and to separate and deliver data channels appropriately. Vexa encoder 2166 is configured to compress and encode frame data into a Vexa-decodable data stream. Vexa decoder 2168 is configured to decode the Vexa-encoded luma channel into luma frame data. Frame buffer 2170 is configured to store one or more frames of luma data. Differencing device 2172 is configured to calculate and generate frame data representing the difference between two luma channel input sources.

In one or more embodiments, H.264 subsystems 2156 include H.264 encoder 2174. H.264 encoder 2174 is configured to compress and encode one or more channels of video frame data into a decodable data stream.

The processing of video frame data by duplex encoder system 2150 is now described. Video frame data is input to Vexa-H.264 duplex encoder system 2151 on video frame data input path 2158 and conveyed to channel processing subsystem 2164 of Vexa subsystems 2154. Channel processing subsystem 2164 transforms input channel data to YCbCr and forwards this data to Vexa encoder 2166. Channel processor subsystem 2164 also sends luma channel data to frame buffer subsystem 2170. Vexa encoder 2166 compresses and encodes frame data. Vexa-encoded data is conveyed to duplex encoder output architecture 2152 over handoff path 2176, and on to merging unit 2162. Vexa-encoded luma channel data is also conveyed to Vexa decoder 2168, which converts Vexa-encoded luma data back to frame luma data. Frame luma data is conveyed to differencing subsystem 2172. Differencing subsystem 2172 compares Vexa-decoded frame luma data to corresponding pre-encoded frame luma data from channel processing subsystem 2164 and stored in frame buffer subsystem 2170, and computes difference frame luma data. Differencing subsystem 2172 outputs difference frame luma data that is conveyed over handoff path 2178 to H.264 encoder 2174 of H.264 subsystems 2156. H.264 encoder 2174 encodes difference luma frames and conveys H.264-encoded data over handoff path 2180 to merging unit 2162 of duplex encoder output architecture 2152. Merging unit 2162 synchronizes arriving H.264-encoded data with corresponding Vexa-encoded data and merges them into a single data stream for transmission or storage. Merging unit 2162 outputs merged Vexa and H.264-encoded data streams over duplex encoder system encoded data output path 2160.

FIGS. 24A-24D suggest the video quality produced by the duplex encoder described in FIG. 21B. 1080×1920p high definition video, Gamer, was processed by the Vexa-H.264 duplex encoder system. Vexa video compression averaged about 400:1.

Figure 24A:
FIGS. 24A-24D are exemplary images showing the development of a duplex encoded video frame in accordance with one or more embodiments of video multi-codec encoders.

FIG. 24A shows a frame of this video before it enters Vexa-H.264 duplex encoder system 2151 on video frame input data path 2158. FIG. 24B shows the same video frame after very high compression by Vexa encoder 2166 and decoding by Vexa decoder 2168. The difference between the luma channel of original image in FIG. 24A and that of the Vexa decoded image in FIG. 24B is conveyed over handoff path 2178 to H.264 encoder 2174. H.264-encoded luma data is conveyed over handoff path 2180 to merging unit 2162. Merging unit 2162 transmits the Vexa-encoded image and the H.264-encoded image over encoded data output path 2160. When the H.264-encoded luma data is decoded, the resulting image is that of FIG. 24C. The edge features, notably absent from FIG. 24B, are emphasized in FIG. 24C. When FIGS. 24B and 24C are combined, the result is the image of FIG. 24D.

It is instructive to compare original image FIG. 24A to decoded Vexa product FIG. 24B. First, it is obvious that the crisp detail of brick edges on the front and side of the building has been lost in the wavelet-based high-compression process. Second, the reader will observe the face of the structure in the lower left corner of FIG. 24A. Some letters in white and what looks like arcs of spray paint are visible on the surface of this small structure with the appearance of a stovepipe smokestack. In FIG. 24B none of this detail is discernable. Third, the reader will observe the railings atop the building, just above the word 'KABLE'. In FIG. 24A each horizontal bar is smooth and continuous. In FIG. 24B these same bars reveal typical slant periodic in-and-out linear artifacts.

Figure 24D:
Figure 24B:
Figure 24C:
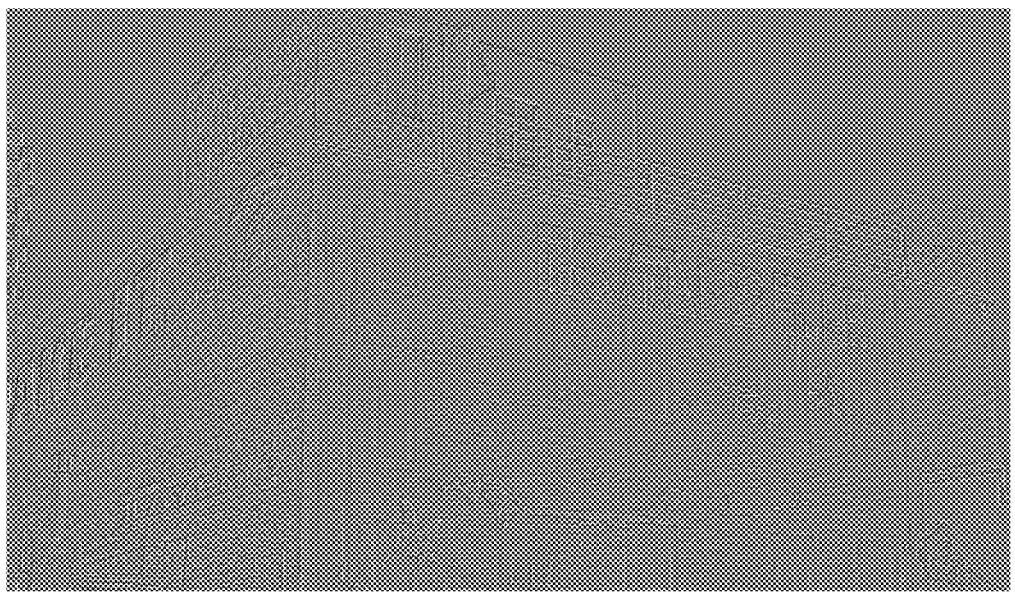

If we now compare FIG. 24C to FIG. 24B with respect to each of these issues, we first notice that the H.264 luma has captured the detailed edge features of the bricks in both building walls. Next, we find that the lettering and especially the spray paint on the face of the small structure in the lower left corner are discernable in FIG. 24C. Interestingly, the railing bars in FIG. 24C also shows the periodic in-and-out pattern found in FIG. 24B.

Finally, we consider FIG. 24D, the reproduced image from the displayed video after decoding the data transmitted from the Vexa-H.264 duplex encoding system. Perhaps the most striking observation is that the wall details, brick edges, and other features, are virtually indistinguishable from those of the original, FIG. 24A. The edges found in FIG. 24C were all that was needed to turn FIG. 24B into FIG. 24D. The reason is that, in spite of its 'soft' appearance, the image in FIG. 24B is not blurred at all—there is no spill-over of image data from one side of the almost non-existent edge to the other. What is missing from FIG. 24B is the edge data itself. With respect to the structure on the lower left, it is clear that the spray paint detail lost in FIG. 24B was restored, thanks to its preservation in FIG. 24C. Lastly, consider the railings atop the building in FIG. 24D. They are virtually perfect reproductions of those of the original in FIG. 24A. This occurred because the regular in-and-out artifact of FIG. 24C is precisely complementary to that of FIG. 24B. Neither high-compression Vexa nor H.264 satisfactorily captured the original railing. However, applied to the difference image, H.264 captured the complementary detail that was missing from FIG. 24B, so that the combined the reproduction is virtually perfect. This is a good example of the complementary aspect of a complementary duplex encoder.

Triplex Encoder Systems.

One or more embodiments include certain enhancements of duplex encoders described in FIGS. 21A-B that can result in triplex encoding systems. One potential enhancement adds a third encoder that may be used for a special purpose, such as 3-D depth channel encoding. Another potential enhancement introduces multi-encoder data preparation subsystems that enable complementary triplex encoders. Finally, one or more embodiments of a complementary triplex encoder are described that are complementary with respect to spatial frequency.

Figure 22:
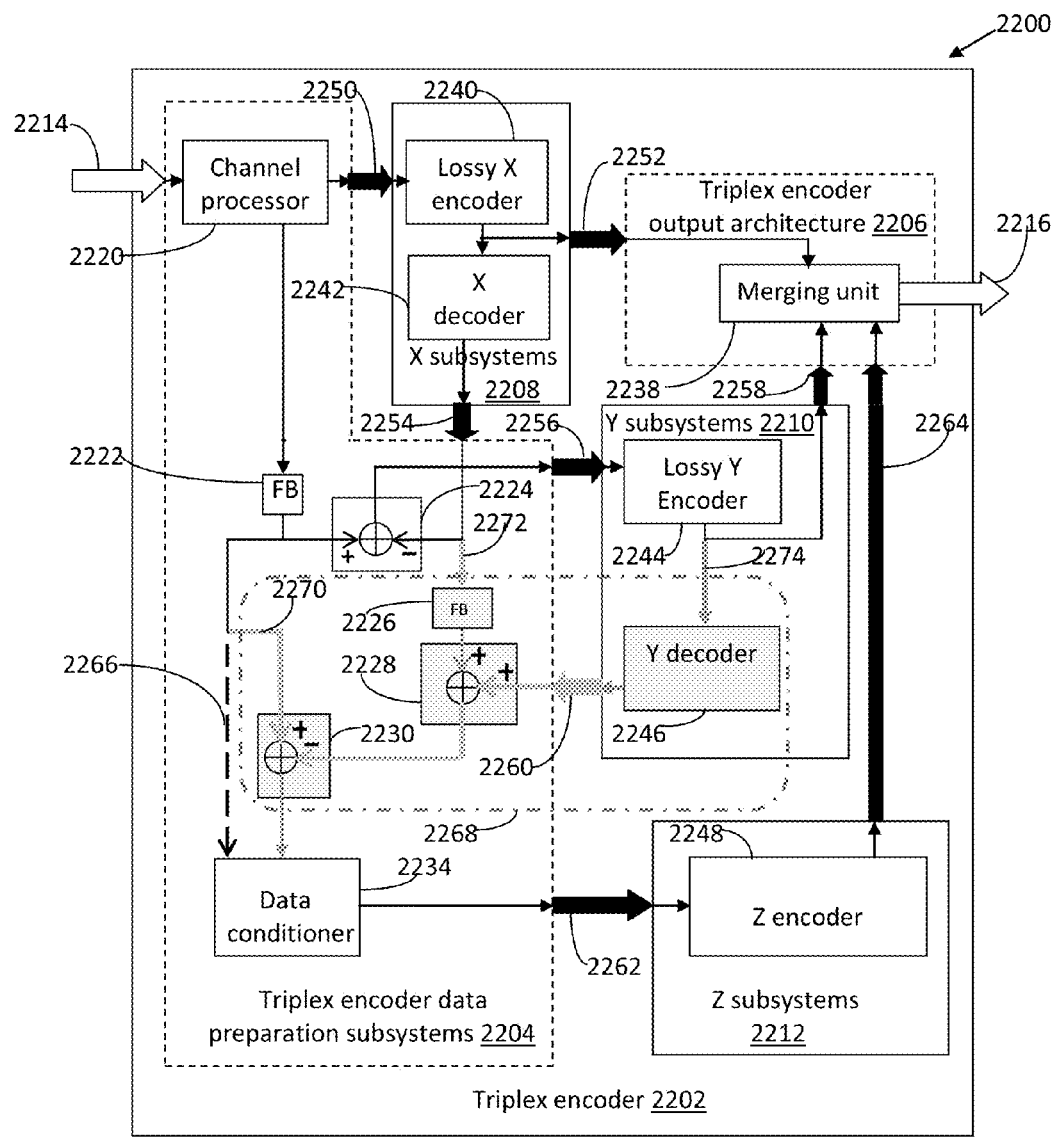
FIG. 22 illustrates exemplary triplex encoder systems in accordance with one or more embodiments of video multi-codec encoders.

FIG. 22 illustrates exemplary triplex encoder architectures in accordance with one or more embodiments of video multi-codec encoders, each of which represents one or more embodiments of a triplex encoder. FIG. 22 includes alternate path 2266. This option is an extension of FIG. 21A that results by adding data conditioner 2234 and Z-subsystems 2212. In one or more embodiments, alternate path 2266 is replaced by special subsystem architecture 2268 (including all subsystems and paths partially or completely within the indicated area). Each of these triplex encoder architectures is now discussed.

FIG. 22 illustrates triplex encoder architecture 2200 with alternate path 2266. Triplex encoder architecture 2200 includes triplex encoder 2202 with alternate path 2266. One or more embodiments of triplex encoder 2202 include triplex encoder data preparation subsystems 2204, triplex encoder output architecture 2206, codec X subsystems 2208, codec Y subsystems 2210, codec Z subsystems 2212, video frame data input path 2214, and triplex encoded data output path 2216.

In one or more embodiments, triplex encoder data preparation subsystems 2204 include at least one of: channel processor subsystem 2220, frame buffer subsystem 2222, frame differencing subsystem 2224, and data conditioner subsystem 2234. In one or more embodiments, channel processor subsystem 2220 is configured to transform color space coordinates, separate and deliver one or more data channels appropriately, and/or perform other channel-related processes. Frame buffer subsystem 2222 may be configured to store one or more channels of video frame data for later delivery. Frame differencing subsystem 2224 may be configured to calculate and generate frame data representing the difference between two frame data input sources. Data conditioner subsystem 2234 may be configured to process, filter, and/or minimize incoming frame data.

In one or more embodiments, triplex encoder output architecture 2206 includes merging unit 2238. In one or more embodiments, triplex encoder output architecture 2206 includes a single stream frame interleaving unit, includes a three-stream synchronizing unit, or allows an unsynchronized two-or-more stream output.

In one or more embodiments, codec X subsystems 2208 include lossy X encoder 2240 and/or X decoder 2242. Lossy X encoder 2240 may be configured to compress and encode one or more channels of frame data and output one or more X-decodable data streams. X decoder 2242 may be configured to decode one or more channels of X-encoded frame data.

In one or more embodiments, codec Y subsystems 2210 include lossy Y encoder 2244. Lossy Y encoder 2244 may be configured to compress and encode one or more channels of frame data and output one or more Y-decodable data streams.

In one or more embodiments, codec Z subsystems 2208 include Z encoder 2248. Z encoder 2248 may be configured to compress and encode one or more channels of frame data and output one or more Z-decodable channel data streams.

The processing of video frame data by one or more embodiments of triplex encoder architecture 2200 with alternate path 2266 is now described. In one or more embodiments, video frame data is input to triplex encoder 2202 on video frame data input path 2214 and conveyed to channel processor subsystem 2220 of data preparation subsystems 2204. In one or more embodiments, channel processor subsystem 2220 processes, separates, and distributes channel-based frame data as needed by data preparation subsystems 2204, codec X subsystems 2208, codec Y subsystems 2210, and codec Z subsystems 2212. For example, different subsystems may process different data channels and/or require special channel transformations. In particular, one or more frame data channels may be conveyed from channel processor subsystem 2220 to frame buffer subsystem 2222, where frame data is stored. One or more data channels may be conveyed from channel processor subsystem 2220 over hand-off path 2250 to codec X subsystems 2208 and on to lossy X encoder 2240, where frame data is compressed and X-encoded. In one or more embodiments, X-encoded data is conveyed to triplex encoder output architecture 2206 over hand-off path 2252 and on to merging unit 2238. In one or more embodiments, X-encoded data is conveyed to X decoder

2242, which converts one or more channels of X-encoded data back to video frame data. In one or more embodiments, decoded channel data is conveyed over handoff path 2254 to differencing subsystem 2224 of data preparation subsystems 2204. In one or more embodiments, frame buffer subsystem 2222 and X-decoder 2242 feed same-frame data to differencing subsystem 2224. In one or more embodiments, differencing subsystem 2224 compares X-decoded frame data to corresponding pre-encoded frame data originally from channel processor subsystem 2220 and stored in frame buffer subsystem 2222, and computes difference frame data.

Differencing subsystem 2224 outputs difference frame data which may be conveyed over handoff path 2256 to lossy Y encoder 2244 of codec Y subsystems 2210. In one or more embodiments, lossy Y encoder 2244 Y-encodes difference frames and conveys Y-encoded data over handoff path 2258 to merging unit 2238 of triplex encoder output architecture 2206.

Frame data from frame buffer subsystem 2222 may be sent to data conditioner subsystem 2234, where this data may be processed, filtered, and/or reduced. The frame data resulting from processing by data conditioner subsystem 2234 may be conveyed to over handoff path 2262 to Z encoder 2248 of codec Z subsystems 2212. Z encoder 2248 may Z-encode frame data received from data preparation subsystems 2204 and output Z-encoded data over handoff path 2264 to merging unit 2238 of triplex encoder output architecture 2206.

In one or more embodiments, merging unit 2238 synchronizes Z-encoded data arriving on handoff path 2264 and Y-encoded data arriving on handoff path 2258 with corresponding X-encoded data arriving on handoff path 2252, and merges them into a single data stream for transmission or storage. In one or more embodiments, merging unit 2238 outputs merged X-, Y-, and Z-encoded data streams over triplex encoder 2202 encoded data output path 2216.

Embodiments of triplex encoder architecture 2200 with optional path 2266 serve many purposes. In one or more embodiments, Z-encoded data encode a third frame for image reconstruction, to display still higher quality video. In one or more embodiments, data conditioner subsystem 2234 processes certain channels not processed or not completely processed by codec X subsystems or codec Y subsystems. Such channels may include one or more color channels, hyper spectral channels, infra spectral channels, or non-spectral image data.

In one or more embodiments, codec Z may be optimized for efficient, high quality processing of a depth channel of a 3-D video. In such applications, the triplex encoded data stream 2216 may provide high quality HD video (from two data streams) without incurring a 3-D processing load on users not equipped for 3-D while, at the same time, providing high quality 3-D HD viewing (using all three data streams) to 3-D equipped users.

Aspects of embodiments of a complementary duplex encoder described in FIG. 21A apply to one or more embodiments of the merged X- and Y-encoded components of data streams of the triplex encoded data stream.

In one or more embodiments, special subsystem architecture 2268 is substituted for alternate path 2266. In one or more embodiments of a triplex encoder, special subsystem architecture 2268 makes triplex encoder 2100 a complementary triplex encoder architecture. This architecture supports sophisticated frame data separation methodologies and highly tailored data compression techniques, as well as many embodiments of a triplex encoder.

One or more embodiments of triplex encoder 2202 include triplex encoder data preparation subsystems 2204, triplex encoder output architecture 2206, codec X subsystems 2208, codec Y subsystems 2210, codec Z subsystems 2212, video frame data input path 2214, and triplex encoded data path 2216.

In one or more embodiments, triplex encoder data preparation subsystems 2204 include at least one of channel processor subsystem 2220, frame buffer subsystem 2222, frame differencing subsystem 2224, special frame buffer subsystem 2226, special frame summing subsystem 2228, special frame differencing subsystem 2230, and data conditioner subsystem 2234. In one or more embodiments, channel processor subsystem 2220 is configured to transform color space coordinates, separate and deliver one or more data channels appropriately, and/or perform other channel-related processes. Frame buffer subsystem 2222 may be configured to store one or more channels of video frame data for later delivery. Frame differencing subsystem 2224 may be configured to calculate and generate frame data representing the difference between two frame data input sources. Special frame buffer subsystem 2226 may be configured to store one or more channels of video frame data for later delivery. Special frame summing subsystem 2228 may be configured to calculate and generate frame data representing the sum of two frame data input sources. Special frame differencing subsystem 2230 may be configured to calculate and generate frame data representing the difference between two frame data input sources. Data conditioner subsystem 2234 may be configured to process, filter, minimize and/or otherwise condition incoming frame data.

In one or more embodiments, triplex encoder output architecture 2206 includes merging unit 2238. In one or more embodiments, triplex encoder output architecture 2206 includes a single stream frame interleaving unit, includes a two or more stream synchronizing unit, or provides an unsynchronized two-or-more stream output.

In one or more embodiments, codec X subsystems 2208 include lossy X encoder 2240 and/or X decoder 2242. Lossy X encoder 2240 may be configured to compress and encode one or more channels of frame data and output one or more X-decodable data streams. X decoder 2242 may be configured to decode one or more channels of X-encoded frame data.

In one or more embodiments, codec Y subsystems 2210 include lossy Y encoder 2244 and/or Y decoder 2246. Lossy Y encoder 2244 may be configured to compress and encode one or more channels of frame data and output one or more Y-decodable data streams. Y decoder 2246 may be configured to decode one or more channels of Y-encoded frame data.

In one or more embodiments, codec Z subsystems 2212 include Z encoder 2248. Z encoder 2248 may be configured to compress and encode one or more channels of frame data and output one or more Z-decodable data streams.

The processing of video frame data by one or more embodiments of triplex encoder 2202 is now described. In one or more embodiments, video frame data is input to multi-encoder system 2202 on video frame data input path 2214 and conveyed to channel processor subsystem 2220 of data preparation subsystems 2204. In one or more embodiments, channel processor subsystem 2220 processes, separates, and distributes channel-based frame data as needed by data preparation subsystems 2204, codec X subsystems 2208, codec Y subsystems 2210, and codec Z subsystems 2212. For example, different subsystems may process different data channels and/or require special channel transformations. In particular, one or more frame data channels may be conveyed from channel processor subsystem 2220 to frame buffer subsystem 2222, where frame data is stored. One or more data channels may be conveyed from channel processor subsystem 2220 over handoff path 2250 to codec X subsystems 2208 and on to lossy X encoder 2240, where frame data is compressed and X-encoded. In one or more embodiments, X-encoded data is conveyed to triplex encoder output architecture 2206 over handoff path 2252 and on to merging unit 2238. In one or more embodiments, X-encoded data is also conveyed to X decoder 2242, which converts one or more channels of X-encoded data back to video frame data. In one or more embodiments, decoded channel data is conveyed over handoff path 2254 to differencing subsystem 2224 of data preparation subsystems 2204. In one or more embodiments, frame buffer 2222 and X-decoder 2242 feed same-frame data to differencing subsystem 2224. In one or more embodiments, differencing subsystem 2224 compares X-decoded frame data to corresponding pre-encoded frame data originally from channel processor subsystem 2220 and stored in frame buffer subsystem 2222, and computes difference frame data.

Differencing subsystem 2224 outputs difference frame data which, in one or more embodiments, is conveyed over handoff path 2256 to lossy Y encoder 2244 of codec Y subsystems 2210. In one or more embodiments, lossy Y encoder 2244 Y-encodes difference frames and conveys Y-encoded data over handoff path 2258 to merging unit 2238 of triplex encoder output architecture 2206.

In one or more embodiments, X decoder 2242 also conveys one or more channels of decoded frame data over handoff path 2254 and special path 2272, and stores the frame data in special frame buffer subsystem 2226. Lossy Y encoder 2244 may also convey one or more channels of Y-encoded data over special path 2274 to Y decoder 2246, which may then decode Y-encoded data into frame data and convey decoded frame data over special handoff path 2260 to data preparation subsystems 2204, and on to special frame summing subsystem 2228. Special frame summing subsystem 2228 may then digitally sum or otherwise merge channel data from special frame buffer subsystem 2226 with Y-decoded channel data from Y-subsystems 2210. The resulting summation frame data may be conveyed to special frame differencing subsystem 2230. Special frame differencing subsystem 2230 may compute the difference between channel data stored in frame buffer subsystem 2222 and frame data from special frame summation subsystem 2228. Difference frame data from special frame differencing device 2230 may be sent to data conditioner subsystem 2234, where this data may be processed, filtered, reduced, or otherwise conditioned.

In one or more embodiments, frame data resulting from processing by data conditioner subsystem 2234 may be conveyed to codec Z subsystems 2212 over handoff path 2262 and on to Z encoder 2248. Z encoder 2248 may Z-encode frame data received from data preparation subsystems 2204 and output Z-encoded data over handoff path 2264 to triplex encoder output architecture 2206 and on to merging unit 2238.

In one or more embodiments, merging unit 2238 synchronizes arriving Y- and Z-encoded data with corresponding X-encoded data and merges them into a single data stream for transmission or storage. In one or more embodiments, merging unit 2238 outputs merged X-, Y-, and Z-encoded data streams over triplex encoder system encoded data output path 2216.

Compared to the complementary duplex encoders of FIG. 21A, applications of the full triplex encoder architecture of FIG. 22 introduce a third data stream that includes data supplementary to that of encoder X and encoder Y. This data is produced by removing the data of encoders X and Y from one or more channels of the data presented to them for processing. This removal starts with frame data in frame buffers 2222 and 2226. Frame buffer 2222 contains pre-X-encoded data C from channel processor 2220. Special frame buffer 2226 contains same-frame data ready for display after X encoding and decoding. Let X represent the X-decoded frame, and let $E_X$ represent the error in frame X, that is C−X. (The difference operation in C−X is assumed to be a pixel-by-pixel differencing operation for simplicity and convenience, but any of several differencing operations may be used to more accurately represent the actual qualitative difference in video viewing from that of the original.) If Y represents the Y-decoded frame arriving from Y decoder 2246 over special handoff path 2260, then define $E_Y$ as (C−Y), the frame of error data representing the error in frame Y. Special summation subsystem 2228 combines X and Y and produces frame (X+Y) as input to differencing subsystem 2230. Frame (X+Y) is the video frame that would be reproduced after decoding the output of the triplex encoder if there were no third input—in other words, (X+Y) represents the video frame that would be reproduced by a duplex encoder like that of FIG. 21A. Special differencing subsystem 2230 outputs the difference frame D, defined as (C−(X+Y)), and sends frame D data to data conditioner subsystem 2234. Difference frame D includes data in frame C that is missing from both frame X and frame Y. This data may include the error data $E_X$ and $E_Y$ of frame (X+Y), noise data that is best eliminated from display, and redundant data that interferes with compression without adding anything to the viewing experience. The job of data conditioner subsystem 2234 is to preserve from data D as much of the significant error data as possible for Z-encoding while avoiding wasteful data. This allows Z encoder 2248 to add a minimal amount of encoded data to merging unit 2206, just the data that can further improve the final displayed video.

As seen in the previous paragraph, when the full triplex encoder architecture is used in this way, Z-encoded data may supplement X-encoded data and Y-encoded data to produce a superlative viewing experience. Such a triplex encoder is therefore a complementary triplex encoder in the same sense that the duplex encoders of FIGS. 21A-21B are complementary duplex encoders. In one or more embodiments, multiplex encoder architectures may be designed with four or more complementary output encoders.

Figure 23:
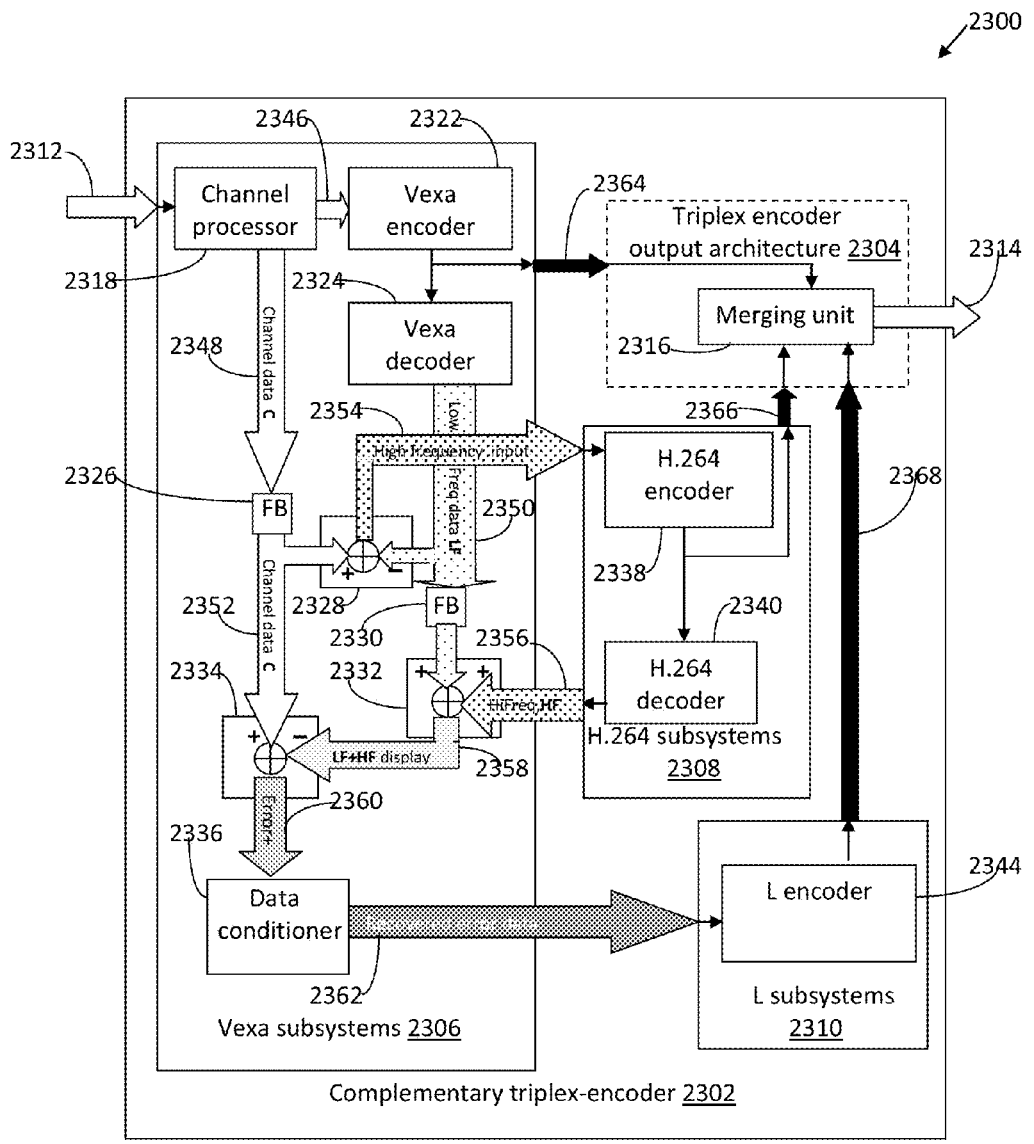
FIG. 23 illustrates a triplex encoder system in accordance with one or more embodiments of video multi-codec encoders.

FIG. 23 illustrates a Vexa-H.264-L complementary triplex encoder. Codec L replaces codec Z of FIG. 22, where L is any of several efficient lossless encoders, such as an entropy encoder. There are several high quality DCT-based codecs, including WebM, VC-1, and various H.264 codecs, that preserve image edges very well. In one or more embodiments, any of these or other edge-preserving codecs is substituted for codec Y of FIG. 22, replacing the Intel IPP H.264 codec, without significantly changing the architecture or description below. Vexa is selected to substitute for codec X of FIG. 22 because, as a wavelet-based codec, Vexa well-complements the edge-preserving strengths of its partner codec. Furthermore, Vexa subsystems include a wide variety of data preparation subsystems, including channel processors, frame buffers, summing devices, differencing devices, and other data conditioning subsystems. In one or more embodiments, other Vexa subsystems are used to further improve the quality of the DCT encoder product but are omitted here for simplicity.

FIG. 23 presents triplex encoder system 2300. Triplex encoder system 2300 illustrates one or more embodiments of complementary triplex encoder 2302. One or more embodiments of triplex encoder 2302 include triplex encoder output architecture 2304, Vexa subsystems 2306, codec Z subsystems 2310, video frame input data path 2312, and triplex encoded data output path 2314.

In one or more embodiments, triplex encoder output architecture 2304 includes merging unit 2316. Merging unit 2316 is configured to merge three encoded data streams into a single data stream that can later be separated into their original data streams, decoded into synchronized video frames. In one or more embodiments, triplex encoder output architecture 2204 includes a single stream frame interleaving unit, includes a three-stream synchronizing unit, allows an unsynchronized two-or-more encoded data stream output, or any other suitable triplex encoder output architecture.

In one or more embodiments, Vexa subsystems 2306 include channel processor subsystem 2318, Vexa encoder 2322, Vexa decoder 2324, frame buffer subsystem 2326, frame differencing subsystem 2328, frame buffer 2330, frame summing subsystem 2332, frame differencing subsystem 2334, and data conditioner subsystem 2336. In one or more embodiments, channel processor subsystem 2318 is configured to transform channel coordinates, separate and deliver one or more data channels appropriately, and/or perform other channel-related processes. Vexa encoder 2322 is configured to convert frame data to a Vexa-encoded data stream. Vexa decoder 2324 is configured to decode Vexa-encoded data to video frame data. Frame buffer subsystem 2326 may be configured to store one or more channels of video frame data for later delivery. Frame differencing subsystem 2328 may be configured to calculate and generate frame data representing the difference between two frame data input sources. Frame buffer subsystem 2330 may be configured to store one or more channels of video frame data for later delivery. Frame summing subsystem 2332 may be configured to calculate and generate frame data representing the sum of two frame data input sources. Frame differencing subsystem 2334 may be configured to calculate and generate frame data representing the difference between two frame data input sources. Data conditioner subsystem 2336 may be configured to process, filter, reduce, and/or otherwise select incoming frame data.

In one or more embodiments, codec H.264 subsystems 2308 include H.264 encoder 2338 and H.264 decoder 2340. H.264 encoder 2338 may be configured to transform frame data into a H.264-encoded data stream. H.264 decoder 2340 is configured to transform H.264-encoded data into video frame data.

In one or more embodiments, codec L subsystems 2310 include L encoder 2344. L encoder 2344 is configured to transform frame data into an L-encoded data stream.

The processing of frame data by complementary triplex encoder system 2300 is now described. Video frame data is conveyed to channel processor subsystem 2318 of Vexa subsystems 2306 over frame input data path 2312. Channel processor subsystem 2318 transforms input color channel data to YCbCr for the benefit of H.264 luma (channel Y) processing. Channel processor subsystem 2318 sends one or more frame channels on path 2348 for temporary storage by frame buffer subsystem 2326. Channel processor subsystem also sends channel data to Vexa encoder 2322 over path 2346. Vexa encoder 2322 compresses and encodes channel data and transmits Vexa-encoded data over handoff path 2364 to merging unit 2316 of triplex encoder output architecture 2304. Vexa encoder 2322 also sends one or more encoded data channels to Vexa decoder 2324.

Vexa decoder 2324 decodes Vexa-encoded data into one or more channels of video frame data. The nature of the Vexa codec is to provide very high fidelity rendition of low spatial frequency imagery. Vexa decoder 2324 forwards this low frequency (LF) frame data over path 2350 for temporary storage in frame buffer subsystem 2330. Vexa decoder 2324 also forwards the low frequency frame data over path 2350 to differencing subsystem 2328. Differencing subsystem 2328 receives channel frame data C from frame buffer subsystem 2326 and low frequency frame data LF from Vexa decoder 2324, removes LF frame data from same frame channel data C, and outputs difference data on path 2354. With LF frame data removed, difference data on path 2354 includes mostly high frequency frame data. Difference data on path 2354 is input to H.264 encoder 2338 of H.264 subsystems 2308. H.264 encoder 2338 compresses and encodes difference data from differencing subsystem 2328 and conveys H.264-encoded difference data over handoff path 2366 to merging unit 2316 of triplex encoder output architecture 2304. H.264 encoder 2338 also sends H.264-encoded data to H.264 decoder 2340. H.264 decoder 2340 decodes H.264 encoded data back to video frame data and returns frame data over path 2356 to summing subsystem 2332 of Vexa subsystems 2306.

Summing subsystem 2332 combines incoming H.264 decoded high spatial frequency data HF with low spatial frequency data LF from frame buffer subsystem 2330 and outputs the combined frame data (LF+HF) on path 2358. Summing subsystem 2332 conveys combined frame data (LF+HF) over path 2358 to differencing subsystem 2334. Differencing subsystem 2334 receives channel data C from frame buffer 2326 over path 2352 and removes (LF+HF) data received over path 2358. The resulting data includes low frequency data missing from LF, high frequency data missing from HF, noise data purposely filtered from LF and HF, and redundant image data also filtered from LF and HF. This data, referred to on path 2360 as Error+ data, is conveyed from differencing subsystem 2334 to data conditioner subsystem 2336.

Data conditioner subsystem 2336 is configured to filter out high frequency data, including noise data. (Because H.264 encoder 2338 is providing edge data to merging unit 2316, it is easy to devise a highly effective high frequency filter.) Data conditioner subsystem 2336 is also configured to threshold mid-range and low spatial frequency data based on magnitude. Data conditioner subsystem 2336 is further configured to quantize remaining mid-range and low frequency data. Filter threshold and quantization are determined on the basis of bandwidth still available for the current frame. This quantized data output by data conditioner 2336, represents a best-effort recapture of as much useable LF and HF error data as possible to perfect the final video display. Data conditioner subsystem 2336 conveys this recovered error data over path 2362 to L encoder 2344 of L subsystems 2310.

L encoder 2344 losslessly encodes recovered error data from data conditioner subsystem 2336 and conveys the resulting L-encoded data stream over handoff path 2368 to merging unit 2316 of triplex encoder output architecture 2304. Merging unit 2316 combines the L-encoded data stream received on path 2368 with the H.264-encoded data stream received on path 2366 and the Vexa-encoded data stream received on path 2364. Merging unit 2316 conveys merged data streams over encoded data output data path 2314 for storage or transmission.

What is claimed is:

1. A computer-readable non-transitory medium comprising computer-readable instructions for a video multi-codec encoder, wherein execution of said computer-readable instructions by one or more processors causes said one or more processors to carry out steps comprising:
   accepting an original video input data comprising a plurality of unencoded video frames;

generating at least one handoff product by applying at least one codec Y subsystem to said original video input data, wherein said at least one codec Y subsystem comprises a Y evaluation subsystem, a Y encoder and a Y decoder, where Y is at least one codec selected from a set of video codecs $\mathcal{Y} = \{Y_1, \ldots, Y_n\}$, where n is an integer greater than or equal to 1;

generating video output data comprising Z-encoded video data by applying at least one codec Z subsystem to said at least one handoff product, wherein said at least one codec Z subsystem comprise a Z encoder, wherein said codec Z is unlike said codec Y, wherein said at least one handoff product is a codec Y to codec Z (i.e. YZ) handoff product comprising processed image from said codec Y and at least one Z encoder control parameter from said Y evaluation subsystem; and iteratively feeding back a codec Z to codec Y (i.e. ZY) handoff product from said codec Z to said Y evaluation subsystem by applying a Z decoder to said Z-encoded video data to generate said ZY handoff product, wherein said Y evaluation subsystem evaluates at least one selected video quality from said ZY handoff product and adjusts one or more of said at least one Z encoder control parameter until a desired value for said at least one selected video quality is achieved.

2. The computer-readable non-transitory medium comprising computer-readable instructions for video multi-codec encoder of claim 1, wherein said at least one codec Y subsystem further comprises a channel processor, wherein said channel processor converts said original video input data from a first color space to a second color space usable by said codec Z for color processing.

3. The computer-readable non-transitory medium comprising computer-readable instructions for a video multi-codec encoder of claim 1, wherein said Y encoder comprises a wavelet transform.

4. The computer-readable non-transitory medium comprising computer-readable instructions for a video multi-codec encoder of claim 1, wherein said Z-encoded video data comprises at least one encoded video data stream.

5. The computer-readable non-transitory medium comprising computer-readable instructions for a video multi-codec encoder of claim 1, wherein said at least one selected video quality comprises satisfying an edge preservation or enhancement requirement.

6. The computer-readable non-transitory medium comprising computer-readable instructions for a video multi-codec encoder of claim 1, wherein said at least one selected video quality comprises one or more of compression, resolution, blocking, channel characteristics, geolocation sensitivity, and content protection.

7. The computer-readable non-transitory medium comprising computer-readable instructions for a video multi-codec encoder of claim 1, wherein $\mathcal{Y}$ comprises at least one wavelet-based video codec W, wherein said at least one codec Y subsystem comprises at least one codec W subsystem configured to provide wavelet-based video codec functionality.

8. The computer-readable non-transitory medium comprising computer-readable instructions for a video multi-codec encoder of claim 1, wherein $\mathcal{Y}$ comprises at least one wavelet-based video codec W, wherein said at least one codec Y subsystem comprises at least one codec W subsystem configured to provide wavelet-based video codec functionality, and wherein said at least one YZ handoff product comprises at least one WZ handoff product generated by applying at least one codec W subsystem.

9. The computer-readable non-transitory medium comprising computer-readable instructions for a video multi-codec encoder of claim 8, wherein generating said WZ handoff product further comprises:

applying said at least one codec W subsystem to said original video input data to generate at least one W-processed original, wherein said at least one codec W subsystem comprises a W encoder followed by a W decoder;

generating difference frame data between said original video input data and said at least one W-processed original, wherein said difference frame data is generated by a difference subsystem of said codec W; and applying a filter subsystem of said codec W on said difference frame data to generate a filtered difference frame data, wherein said at least one WZ handoff product is generated in a summation subsystem of said codec W from said filtered difference frame data and said at least one W-processed original.

10. The computer-readable non-transitory medium comprising computer-readable instructions for a video multi-codec encoder of claim 1, wherein said at least one selected video quality is compression.

11. The computer-readable non-transitory medium comprising computer-readable instructions for a video multi-codec encoder of claim 1, wherein said at least one selected video quality is resolution.

12. The computer-readable non-transitory medium comprising computer-readable instructions for a video multi-codec encoder of claim 1, wherein said steps further comprise:

generating a second output comprising Y-encoded video data by applying said Y encoder subsystem to said original video input data.

13. The computer-readable non-transitory medium comprising computer-readable instructions for a video multi-codec encoder of claim 1, wherein said codec Z is a DCT-based codec.

14. The computer-readable non-transitory medium comprising computer-readable instructions for a video multi-codec encoder of claim 1, wherein said codec Z is a wavelet-based codec.

15. The computer-readable non-transitory medium comprising computer-readable instructions for a video multi-codec encoder of claim 1, wherein said Z-encoded video data comprises two or more related encoded video data streams, wherein each of said two or more related encoded video data streams comprises an encoded semblance of said original video input data.

16. The computer-readable non-transitory medium comprising computer-readable instructions for a video multi-codec encoder of claim 15, wherein said two or more related encoded video data streams encode same-frame images that, together, comprise a distinct same-frame image.

17. The computer-readable non-transitory medium comprising computer-readable instructions for a video multi-codec encoder of claim 15, further comprising merging said two or more related encoded video data streams to produce an enhanced video stream.

18. A video multi-codec encoder system comprising:

at least one codec Y subsystem configured to receive original video input data comprising a plurality of unencoded video frames, wherein each of said at least one codec Y subsystem comprises a Y evaluation subsystem, a Y encoder and a Y decoder, where Y is at least one codec selected from a set of video codecs $\mathcal{Y} = \{Y_1, \ldots, Y_n\}$, where n is an integer greater that or equal to 1, wherein said codec Y generates a YZ handoff product comprising a codec Y processed image;

at least one codec Z subsystem comprising a Z encoder subsystem coupled to said YZ handoff product of said at least one codec Y subsystem and to said Y evaluation subsystem to generate video output data comprising Z-encoded video data and a Z decoder subsystem coupled to said Z-encoded video data to generate a ZY handoff product that is coupled to said Y evaluation subsystem in said codec Y, wherein said Y evaluation subsystem generates control parameters for said Z encoder subsystem, and wherein said codec Y is unlike said codec Z, and iteratively feeding back a codec Z to codec Y (i.e. ZY) handoff product from said codec Z to said Y evaluation subsystem by applying a Z decoder to said Z-encoded video data to generate said ZY handoff product, wherein said Y evaluation subsystem evaluates at least one selected video quality from said ZY handoff product and adjusts one or more of said at least one Z encoder control parameter until a desired value for said at least one selected video quality is achieved.

19. The video multi-codec encoder system of claim 18, wherein said at least one codec Y subsystem further comprises a channel processor coupled to said original video input data.

20. The video multi-codec encoder system of claim 18, wherein said at least one codec Y subsystem further comprises a frame differencing or summing subsystem.

21. The video multi-codec encoder system of claim 18, wherein said at least one codec Y subsystem further comprises a de-interlacer coupled to said original video input data.

22. The video multi-codec encoder system of claim 18, wherein said Y evaluation subsystem comprises an iterative feature enhancer.

23. The video multi-codec encoder system of claim 18, wherein said at least one codec Y subsystem further comprises a merging unit.

24. The video multi-codec encoder system of claim 18, wherein at least one of said at least one codec Y subsystem and said at least one codec Z subsystem comprises a hardware subsystem.

25. The video multi-codec encoder system of claim 18, wherein said at least one codec Z subsystem is further configured to generate said Z-encoded video data based on said at least one YZ handoff product.

26. The video multi-codec encoder system of claim 25, wherein said $\{Y_1, \ldots, Y_n\}$ and Z-encoded video data comprise an interacting video encoder system.

27. The video multi-codec encoder system of claim 18, wherein $\mathcal{Y}$ comprises at least one wavelet-based video codec W, and wherein said at least one codec Y subsystem comprises at least one codec W subsystem configured to provide wavelet-based video codec functionality.

28. The video multi-codec encoder system of claim 25, wherein $\mathcal{Y}$ comprises at least one wavelet-based video codec W, wherein said at least one codec Y subsystem comprises at least one codec W subsystem configured to provide wavelet-based video codec functionality, and wherein said at least one YZ handoff product comprises at least one WZ handoff product generated by applying said at least one codec W subsystem.

29. The video multi-codec encoder system of claim 28, wherein said at least one codec W subsystem is configured to generate said at least one WZ handoff product by:

applying said at least one codec W subsystem to said original video input data to generate at least one W-processed original;

generating at least one difference frame between said original video input data and said at least one W-processed original; and applying a filter operation on said at least one difference frame to generate a filtered difference frame data, wherein said at least one WZ handoff product is based on summation of said filtered difference frame data and said at least one W-processed original.

30. The video multi-codec encoder system of claim 18, wherein said at least one codec Z subsystem is configured to generate said at least one ZY handoff product for processing by said Y evaluation subsystem of said at least one codec Y subsystem until at least one target criterion is met.

31. The video multi-codec encoder system of claim 25, wherein said at least one codec Y subsystem is further configured to generate Y-encoded video data.

32. The video multi-codec encoder system of claim 25, wherein codec Z is a DCT-based codec.

33. The video multi-codec encoder system of claim 25, wherein codec Z is a wavelet-based codec.

34. The video multi-codec encoder system of claim 25, wherein said video output data comprises two or more related encoded video data streams, wherein each of said two or more related encoded video data streams comprises an encoded semblance of said at least one selected video frame.

35. The video multi-codec encoder system of claim 34, wherein said two or more related encoded video data streams encode same-frame images that together, comprise a distinct same-frame image.

36. The video multi-codec encoder system of claim 34, further comprising merging said two or more related encoded video data streams to produce an enhanced video stream.

37. A computer-readable non-transitory medium comprising computer-readable instructions for a video multi-codec encoder, wherein execution of said computer-readable instructions by one or more processors causes said one or more processors to carry out steps comprising:

obtain original video input data comprising a plurality of unencoded video frames;

generating a handoff product by applying at least one codec Y subsystem to said original video input data, wherein said handoff product comprises a summation of a Y error data and a Y processed video data, wherein said Y processed video data is generated by processing said original video input data through a Y encoder subsystem and a Y decoder subsystem, and wherein said Y error data is a difference between said original video input data and said Y processed video data;

generating Z-encoded video data by applying at least one codec Z subsystem to said handoff product, wherein said at least one codec Z subsystem comprise a Z encoder, wherein said codec Z is unlike said codec Y, wherein said at least one handoff product is a codec Y to codec Z (i.e. YZ) handoff product comprising Y processed video data and at least one Z encoder control parameter from a Y evaluation subsystem within said at least one codec Y subsystem; and iteratively feeding back a codec Z to codec Y (i.e. ZY) handoff product from said codec Z to said Y evaluation subsystem by applying a Z decoder to said Z-encoded video data to generate said ZY handoff product, wherein said Y evaluation subsystem evaluates at least one selected video quality from said ZY handoff product and adjusts one or more of said at least one Z encoder control parameter until a desired value for said at least one selected video quality is achieved.

38. The computer-readable non-transitory medium comprising computer-readable instructions for video multi-codec encoder of claim 37, wherein said steps further comprise processing the original video input data with a channel processor.

39. A video multi-codec encoder system comprising:
   at least one Y codec subsystem configured to receive original video input data comprising a plurality of unencoded video frames and generate a handoff product, said at least one Y codec subsystem comprising:
      a Y encoder subsystem for encoding the original video input data to generate a Y encoded video data;
      a Y decoder subsystem for decoding said Y encoded video data to generate a processed video data;
      a frame difference subsystem for generating an error data between said original video input data and said processed video data;
      a filter subsystem for processing said error data to generate filtered error data; and
      a summing subsystem for generating said handoff product by summing said filtered error data and said processed video data;
   at least one codec Z subsystem, where said at least one codec Z subsystem comprises a Z encoder subsystem, wherein said at least one codec Z subsystem is configured to accept said handoff product as input and generate video output comprising Z-encoded video data, wherein said codec Z is unlike said codec Y, wherein said at least one handoff product is a codec Y to codec Z (i.e. YZ) handoff product comprising Y processed video data and at least one Z encoder control parameter from a Y evaluation subsystem within said at least one codec Y subsystem; and
   iteratively feeding back a codec Z to codec Y (i.e. ZY) handoff product from said codec Z to said Y evaluation subsystem by applying a Z decoder to said Z-encoded video data to generate said ZY handoff product, wherein said Y evaluation subsystem evaluates at least one selected video quality from said ZY handoff product and adjusts one or more of said at least one Z encoder control parameter until a desired value for said at least one selected video quality is achieved.

40. The video multi-codec encoder system of claim 39, further comprising a channel processor.

41. The video multi-codec encoder system of claim 39, said at least one Y codec subsystem further comprising a frame buffer subsystem.

42. The video multi-codec encoder system of claim 39, further comprising a de-interlacer.

43. The video multi-codec encoder system of claim 39, further comprising an iterative feature enhancer.

44. A method for generating a multi-codec video data with duplex encoders comprising:
   accepting an original video input data comprising a plurality of unencoded video frames;
   a codec Y generating a Y-encoded frame data by applying at least one codec Y subsystem to each frame of said plurality of unencoded video frames, wherein said at least one codec Y subsystem comprises a Y encoder;
   said codec Y generating a Y processed video data by applying at least one additional codec Y subsystem to said Y-encoded frame data, wherein said additional codec Y subsystem comprises a Y decoder;
   a differencing subsystem generating a handoff product comprising a difference between said each frame of said plurality of unencoded video frames and said Y processed video data;
   a coded Z generating Z-encoded farms data by applying at least one codec Z subsystem to said handoff product, wherein said at least one codec Z subsystem comprises a Z encoder, and wherein said codec Z is unlike said codec Y, wherein said at least one handoff product is a codec Y to codec Z (i.e. YZ) handoff product comprising Y processed video data and at least one Z encoder control parameter from a Y evaluation subsystem within said at least one codec Y subsystem; and
   iteratively feeding back a codec Z to codec Y (i.e. ZY) handoff product from said codec Z to said Y evaluation subsystem by applying a Z decoder to said Z-encoded video data to generate said ZY handoff product, wherein said Y evaluation subsystem evaluates at least one selected video quality from said ZY handoff product and adjusts one or more of said at least one Z encoder control parameter until a desired value for said at least one selected video quality is achieved; and
   a merging unit merging said Y-encoded frame data and said Z-encoded frame data into an output video stream.

45. The method of claim 44, further comprising processing said original video input data with a channel processor.

46. The method of claim 44, wherein at least one of said codec Y subsystem and said codec Z subsystem comprises a hardware subsystem.

47. The method of claim 44, wherein said Y-encoded frame data and said Z-encoded frame data comprise related encoded video data streams, wherein each of said Y-encoded frame data and said Z-encoded frame data comprises an encoded semblance of said each frame of said plurality of unencoded video frames.

48. The method of claim 47, wherein said Y-encoded frame data and said Z-encoded frame data comprises encoded same frame images that together comprise a distinct same frame image.

49. The method of claim 44, wherein codec Z is a wavelet-based codec.

50. A duplex encoder system comprising:
   a Y encoder subsystem of a codec Y for receiving a plurality of unencoded video frames and generating a Y-encoded frame data for each one of said plurality of unencoded video frames;
   a Y decoder subsystem of said codec Y receiving said Y-encoded frame data and generating a Y processed video data;
   a data preparation subsystem for generating a handoff product comprising a difference between said each one of said plurality of unencoded video frames and said Y processed video data
   a Z encoder subsystem of a codec Z for receiving said handoff product and generating a Z-encoded frame data, wherein said codec Z is unlike said codec Y, wherein said at least one handoff product is a codec Y to codec Z (i.e. YZ) handoff product comprising Y processed video data and at least one Z encoder control parameter from a Y evaluation subsystem within said at least one codec Y subsystem; and
   iteratively feeding back a codec Z to codec Y (i.e. ZY) handoff product from said codec Z to said Y evaluation subsystem by applying a Z decoder to said Z-encoded video data to generate said ZY handoff product, wherein said Y evaluation subsystem evaluates at least one selected video quality from said ZY handoff product and adjusts one or more of said at least one Z encoder control parameter until a desired value for said at least one selected video quality is achieved; and a merging unit for generating an output video stream comprising said Y-encoded frame data and said Z-encoded frame data.

51. The system of claim 50, further comprising a channel processor for processing said plurality of unencoded video frames.

52. The system of claim 50, wherein at least one of said codec Y subsystem and said codec Z subsystem comprises a hardware subsystem.

53. The system of claim 50, wherein said Y-encoded frame data and said Z-encoded frame data comprise related encoded video data streams, wherein each of said Y-encoded frame data and said Z-encoded frame data comprises an encoded semblance of said each frame of said plurality of unencoded video frames.

54. The system of claim 53, wherein said Y-encoded frame data and said Z-encoded frame data comprises encoded same frame images that together comprise a distinct same frame image.

55. The system of claim 50, wherein codec Z is a DCT-based codec.

* * * * *